(12) United States Patent
Fujii et al.

(10) Patent No.: US 11,332,160 B2
(45) Date of Patent: *May 17, 2022

(54) ON-DEMAND PREDEFINED ROUTE AUTOMATED DRIVING VEHICLE

(71) Applicant: YAMAHA HATSUDOKI KABUSHIKI KAISHA, Iwata (JP)

(72) Inventors: Hokuto Fujii, Iwata (JP); Hitoshi Watanabe, Iwata (JP); Makoto Yoshida, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,045

(22) Filed: Jun. 19, 2020

(65) Prior Publication Data

US 2020/0317229 A1    Oct. 8, 2020

Related U.S. Application Data

(63) Continuation-in-part of application No. PCT/JP2018/047190, filed on Dec. 21, 2018.
(Continued)

(51) Int. Cl.
*B60W 60/00* (2020.01)
*B60W 10/04* (2006.01)
(Continued)

(52) U.S. Cl.
CPC ...... *B60W 60/00253* (2020.02); *B60W 10/04* (2013.01); *B60W 10/18* (2013.01);
(Continued)

(58) Field of Classification Search
CPC ....... B60W 60/00253; B60W 60/0024; B60W 10/04; B60W 10/18; B60W 10/20;
(Continued)

(56) References Cited

U.S. PATENT DOCUMENTS

| 2012/0303202 A1 | 11/2012 | Durkos et al. |
| 2015/0286219 A1 | 10/2015 | Reichel et al. |

(Continued)

FOREIGN PATENT DOCUMENTS

| JP | 2000-233751 A | 8/2000 |
| JP | 2003-006784 A | 1/2003 |

(Continued)

OTHER PUBLICATIONS

"6 things to watch out for when taking a taxi in Thailand", Oversea lab of HITSUJI editor chief!, Jan. 17, 2017, all pages, URL: https://www.thaislife.com/entry2017/01/17/090000_1.
(Continued)

*Primary Examiner* — Hussein Elchanti
(74) *Attorney, Agent, or Firm* — Rabin & Berdo, P.C.

(57) ABSTRACT

An on-demand predefined route automated driving vehicle comprising a vehicle-mounted controller configured to cause the vehicle to run toward a planned riding location such that the vehicle automatically runs along a predefined route which is determined in advance and in a runnable area. The vehicle-mounted controller communicates with an on-demand predefined route automated driving vehicle fleet controller. Based on route information and an in-advance vehicle dispatch command signal received from the vehicle fleet controller, the vehicle-mounted controller controls the vehicle so that the vehicle runs toward an anticipated riding location based on the in-advance vehicle dispatch command signal.

8 Claims, 17 Drawing Sheets

Related U.S. Application Data

(60) Provisional application No. 62/609,779, filed on Dec. 22, 2017.

(51) Int. Cl.
| | |
|---|---|
| *B60W 10/18* | (2012.01) |
| *B60W 10/20* | (2006.01) |
| *B60W 30/095* | (2012.01) |
| *B60W 40/08* | (2012.01) |
| *G08G 1/123* | (2006.01) |
| *H04W 4/40* | (2018.01) |
| *G05D 1/02* | (2020.01) |
| *G06Q 10/02* | (2012.01) |
| *G06Q 50/30* | (2012.01) |
| *G08G 1/00* | (2006.01) |
| *H04W 4/021* | (2018.01) |

(52) U.S. Cl.
CPC ........ *B60W 10/20* (2013.01); *B60W 30/0956* (2013.01); *B60W 40/08* (2013.01); *B60W 60/0024* (2020.02); *G05D 1/0291* (2013.01); *G06Q 10/02* (2013.01); *G06Q 50/30* (2013.01); *G08G 1/123* (2013.01); *G08G 1/202* (2013.01); *H04W 4/021* (2013.01); *H04W 4/40* (2018.02)

(58) Field of Classification Search
CPC .... B60W 30/0956; B60W 40/08; H04W 4/40; G05D 1/0291; G06Q 10/02; G06Q 50/30; G08G 1/123
See application file for complete search history.

(56) References Cited

U.S. PATENT DOCUMENTS

| | | | | |
|---|---|---|---|---|
| 2015/0324718 | A1* | 11/2015 | Lord | G06Q 10/047 705/7.13 |
| 2015/0339928 | A1 | 11/2015 | Ramanujam | |
| 2016/0209220 | A1* | 7/2016 | Laetz | G08G 1/202 |
| 2017/0080806 | A1* | 3/2017 | Woo | B60W 50/0097 |
| 2017/0123421 | A1 | 5/2017 | Kentley et al. | |
| 2017/0169366 | A1* | 6/2017 | Klein | G06Q 50/30 |
| 2017/0193627 | A1 | 7/2017 | Urmson et al. | |
| 2017/0294130 | A1 | 10/2017 | Donnelly | |
| 2017/0351990 | A1* | 12/2017 | Hecht | G06Q 50/01 |
| 2018/0197071 | A1* | 7/2018 | Dong | G06Q 30/0202 |
| 2018/0202822 | A1* | 7/2018 | DeLizio | G06Q 30/0645 |
| 2018/0211541 | A1* | 7/2018 | Rakah | B60W 60/00253 |
| 2018/0224866 | A1* | 8/2018 | Alonso-Mora | G06N 5/04 |
| 2018/0315146 | A1* | 11/2018 | Matthiesen | G06Q 10/06315 |
| 2019/0370922 | A1* | 12/2019 | Asghari | G06Q 50/30 |

FOREIGN PATENT DOCUMENTS

| | | | |
|---|---|---|---|
| JP | 2003-024390 | A | 1/2003 |
| JP | 2003-168195 | A | 6/2003 |
| JP | 2003288687 | A | 10/2003 |
| JP | 2005-011007 | A | 1/2005 |
| JP | 2014-006890 | A | 1/2014 |
| JP | 2016-091411 | A | 5/2016 |
| JP | 2017-517809 | A | 6/2017 |
| JP | 2017-167669 | A | 9/2017 |

OTHER PUBLICATIONS

Akitani, Ryutaro, "Development of an actual operable simulator of a transportation system enabling platooning", Research Report of Information Processing Society of Japan: System software and Operating System (OS) 2017-OS-141 [online]. Jul. 19, 2017 (accession date), pp. 1-6.

Japan Executive Trade, "Taxi driver talks! The trick of finding customers when an taxi is empty", Taku Ten, Aug. 8, 2016, all pages, URL: https://jet-takuten.com/537/.

An approach case ECODRIVE company's approach to the Cool Choice future., Dec. 7, 2016, <https://ondankataisaku.env.go.jp/coolchoice/ecodriver/action/archives/161207/> (documents indicating well-known arts).

Development, information processing society research report system software and an operating system (OS) 2017-OS-141, Japan, Information Processing Society, Jan. 19, 2017, Development of an actual operation of a traffic system capable of travelling in Akiya Rasora, Kagea Run, and 07, January.

\* cited by examiner

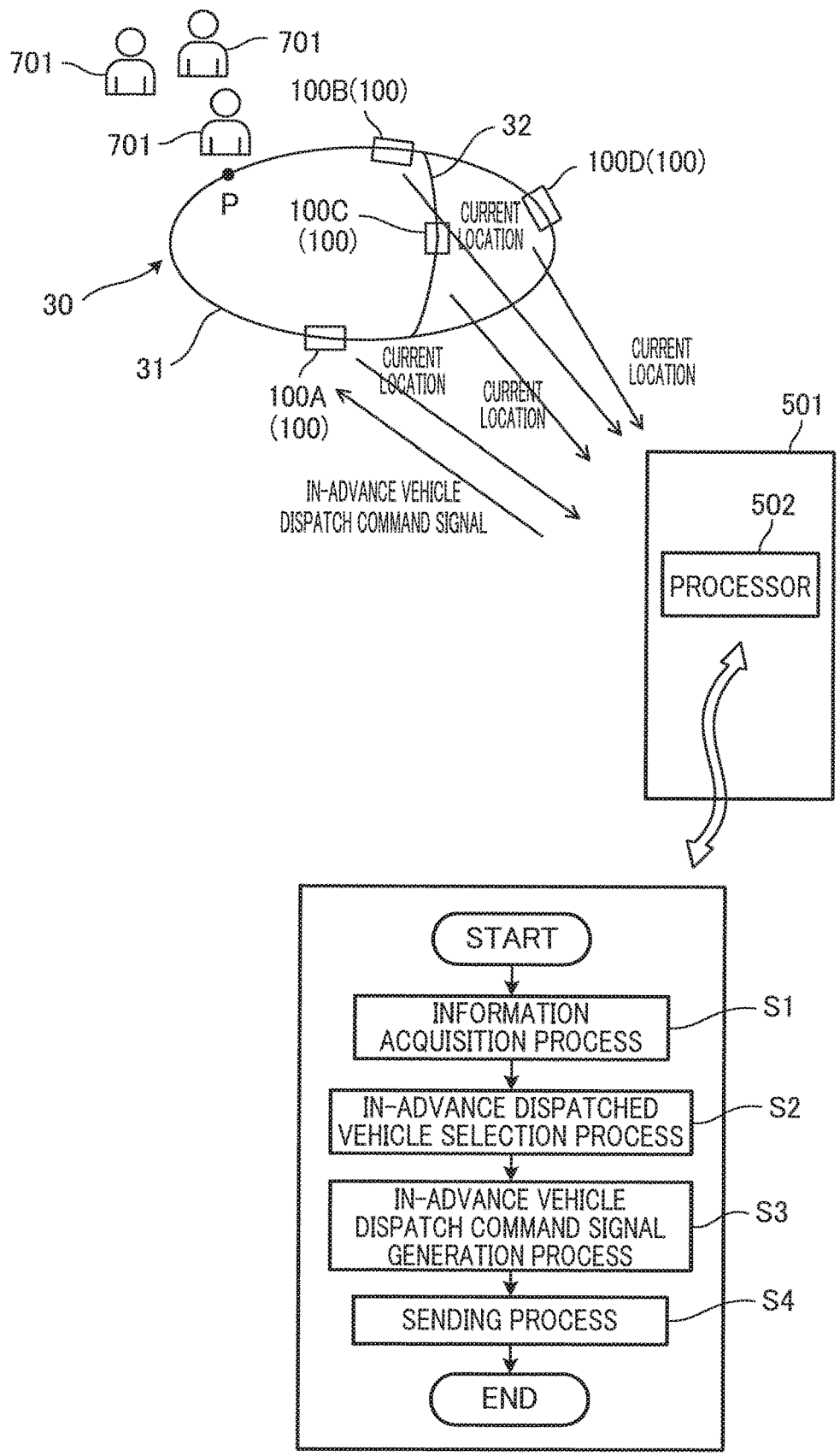

ON-DEMAND PREDEFINED ROUTE AUTOMATED DRIVING VEHICLE

CROSS-REFERENCE TO RELATED APPLICATIONS

This application is a continuation-in-part of International Application No. PCT/JP2018/047190, filed on Dec. 21, 2018, and claims the benefit of the earlier filing date of PCT/JP2018/047190 and of U.S. provisional application 62/609,779, filed on Dec. 22, 2017. The entire contents of each of the identified applications are incorporated herein by reference.

TECHNICAL FIELD

The present invention relates to an on-demand predefined route automated driving vehicle.

BACKGROUND ART

An on-demand predefined route automated driving vehicle has been known. The on-demand predefined route automated driving vehicle automatically runs along a predefined route which is in a runnable area and is determined in advance. The on-demand predefined route automated driving vehicle is arranged to be able to send and receive information to and from an on-demand predefined route automated driving vehicle fleet controller. The on-demand predefined route automated driving vehicle fleet controller is arranged to be able to send and receive information to and from plural on-demand predefined route automated driving vehicles, and to control the running of each of the on-demand predefined route automated driving vehicles. When the on-demand predefined route automated driving vehicle fleet controller receives a use request from a user, the on-demand predefined route automated driving vehicle is dispatched to a location where the user plans to ride on the vehicle, based on a vehicle dispatch command signal supplied from the on-demand predefined route automated driving vehicle fleet controller.

The running of the on-demand predefined route automated driving vehicle which runs along the predefined route is limited in the runnable area. Meanwhile, an automated driving vehicle which runs along a route which is not a predefined route is allowed to run freely in the runnable area. When running from a start point to an end point of the predefined route, an amount of energy consumed by the on-demand predefined route automated driving vehicle which runs along the predefined route tends to be smaller than an amount of energy consumed by the automated driving vehicle which runs along a route which is not a predefined route.

The predefined route along which the on-demand predefined route automated driving vehicle runs may be annular. When the predefined route is annular, plural on-demand predefined route automated driving vehicles are able to regularly circulate along the route. When the predefined route is annular, plural on-demand predefined route automated driving vehicles are able to run along the predefined route in a dispersed manner.

Patent Literature 1 (identified further on) discloses plural on-demand predefined route automated driving vehicles running along an annular predefined route. According to Patent Literature 1, the on-demand predefined route automated driving vehicles regularly circulate along the annular predefined route. According to Patent Literature 1, the on-demand predefined route automated driving vehicle fleet controller dispatches one of the on-demand predefined route automated driving vehicles regularly circulating along the annular predefined route, in accordance with a use request from a user. This reduces the waiting time of the user who has made the use request for using the on-demand predefined route automated driving vehicle. According to Patent Literature 1, when picking up a user, an on-demand predefined route automated driving vehicle deviates from the annular predefined route and runs along a non-predefined route. When the on-demand predefined route automated driving vehicle on which the user rides runs along the annular predefined route, the vehicle stops as the user presses a stop key at a desired location.

However, when plural on-demand predefined route automated driving vehicles regularly circulate, an energy consumption amount of all of the on-demand predefined route automated driving vehicles running along the annular predefined route is large as compared to a case where a vehicle runs in response to the acquisition of a use request. In Patent Literature 1, the on-demand predefined route automated driving vehicles are electric wheelchairs each of which is a small vehicle. Each electric wheelchair consumes a small amount of energy. As such, in Patent Literature 1, increase in an energy consumption amount of the all on-demand predefined route automated driving vehicles running along the annular predefined route is suppressed because wheelchairs with a low consumption amount are employed.

CITATION LIST

Patent Literatures

[Patent Literature 1] Japanese Unexamined Patent Publication No. 2003-24390

SUMMARY

Technical Problem

An energy storage amount of the on-demand predefined route automated driving vehicle is determined based on an energy consumption amount. The degree of freedom in designing the on-demand predefined route automated driving vehicle is restricted by the energy storage amount. The on-demand predefined route automated driving vehicle is required to shorten the waiting time of a user who has made a use request and to have a smaller energy storage amount in order to have a higher degree of freedom in design.

An object of the present teaching is to provide an on-demand predefined route automated driving vehicle which is able to shorten the waiting time of a user who has made a use request and to improve the degree of freedom in design by reducing an energy storage amount.

Solution to Problem

According to Patent Literature 1, in order to shorten the waiting time of a user who has made a use request of the on-demand predefined route automated driving vehicle, the on-demand predefined route automated driving vehicles regularly circulate along the annular predefined route. Furthermore, as the on-demand predefined route automated driving vehicle, a small vehicle with a low energy consumption amount is employed. In other words, in Patent Literature 1, while the reduction in waiting time of the user who has made a use request for using the on-demand predefined route automated driving vehicle is preferred, increase in energy consumption amount of the all on-demand predefined route automated driving vehicles is suppressed. In Patent Literature 1, because energy is consumed due to the regular circulation, an energy storage amount of each vehicle is constant even if the number of the on-demand predefined route automated driving vehicles running along the annular predefined route is increased. The inventors of the subject application therefore tried to shorten the waiting time of a user who has made a use request while giving preference to the reduction of an energy storage amount of each vehicle.

(1) An on-demand predefined route automated driving vehicle of the present teaching includes: wheels; a drive mechanism configured to apply driving force for running the vehicle to at least one of the wheels; a brake mechanism configured to apply braking force for decelerating the vehicle to at least one of the wheels; a traveling direction control mechanism configured to control a traveling direction of at least one of the wheels when the vehicle runs; and a vehicle-mounted controller which (a) is configured to be able to send and receive information to and from an on-demand predefined route automated driving vehicle fleet controller and (b) controls the drive mechanism, the brake mechanism, and the traveling direction control mechanism to cause the vehicle to run toward a planned riding location such that the vehicle automatically runs along a predefined route which is determined in advance and in a runnable area no matter whether an occupant is on the vehicle, and the vehicle is dispatched to the planned riding location where a user plans to ride on the vehicle, when the vehicle-mounted controller receives a vehicle dispatch command signal generated by the on-demand predefined route automated driving vehicle fleet controller to which a use request is sent from the user, the vehicle-mounted controller sending, to the on-demand predefined route automated driving vehicle fleet controller, information of a current location of the on-demand predefined route automated driving vehicle on the predefined route which is an annular connected predefined route including at least one annular predefined route and at least one connected predefined route which is connected to the at least one annular predefined route so that a vehicle is allowed to run across the routes, and when the on-demand predefined route automated driving vehicle is selected, by the on-demand predefined route automated driving vehicle fleet controller, as a vehicle which is dispatched in advance at an anticipated riding location from among vehicles which do not have an occupant and have not received the vehicle dispatch command signal among the plurality of on-demand predefined route automated driving vehicles, based on: (A) route information related to the annular connected predefined route; (B) vehicle location information which relates to current locations of the plurality of on-demand predefined route automated driving vehicles on the annular connected predefined route, including the information of the current location of the on-demand predefined route automated driving vehicle having been sent; (C) occupant existence information which relates to existence of an occupant on each of the plurality of on-demand predefined route automated driving vehicles on the annular connected predefined route; and (D) anticipated riding location information which relates to the anticipated riding location which is a location anticipated to be the planned riding location on the annular connected predefined route, receiving an in-advance vehicle dispatch command signal generated by the on-demand predefined route automated driving vehicle fleet controller based on the route information, the vehicle location information, the occupant existence information, and the anticipated riding location information, the drive mechanism, the brake mechanism, and the traveling direction control mechanism being controlled so that the on-demand predefined route automated driving vehicle runs toward the anticipated riding location based on the in-advance vehicle dispatch command signal.

According to this arrangement, the on-demand predefined route automated driving vehicle runs along the annular connected predefined route which includes at least one annular predefined route and at least one connected predefined route which is connected to the at least one annular predefined route so that vehicles are able to run across these routes. The number of the connected predefined routes connected to an annular predefined route so that vehicles are able to run across these routes can be increased. Based on an in-advance vehicle dispatch command signal, the vehicle-mounted controller controls the drive mechanism, the brake mechanism, and the traveling direction control mechanism so that the vehicles runs toward an anticipated riding location on the annular connected predefined route, which is anticipated to become a planned riding location of a user. The in-advance vehicle dispatch command signal is generated by the on-demand predefined route automated driving vehicle fleet controller based on the route information, the vehicle location information, the occupant existence information, and the anticipated riding location information. When the on-demand predefined route automated driving vehicle is dispatched in advance, the vehicles are controlled with better energy efficiency, as compared to a case where the on-demand predefined route automated driving vehicle is not dispatched in advance and is dispatched after receiving a vehicle dispatch command signal. The control of the vehicles with better energy efficiency corresponds to, for example, the following case. For example, the on-demand predefined route automated driving vehicle having received the in-advance vehicle dispatch command signal runs at a speed with a small energy consumption amount or runs along a route with no traffic jam. This makes it possible to reduce the energy consumption of the on-demand predefined route automated driving vehicle having received the in-advance vehicle dispatch command signal. The energy storage amount of each vehicle is therefore reduced and the degree of freedom in designing the vehicles is improved.

In addition to the above, it is possible to cause the on-demand predefined route automated driving vehicle which has not received a vehicle dispatch command signal to be on standby at or around a location on the annular connected predefined route, where a user is anticipated to ride on the vehicle. The waiting time of users is therefore shortened.

The on-demand predefined route automated driving vehicle of the present teaching is therefore able to shorten the waiting time of a user who has made a use request and to improve the degree of freedom in design by reducing an energy storage amount.

(2) According to another aspect of the present teaching, the on-demand predefined route automated driving vehicle of the present teaching preferably includes the following arrangement, in addition to the arrangement (1).

The anticipated riding location information is generated based on at least one of: information related to a user, including a past use history of the user and a current location of the user; information related to a destination, including a destination in past use of the on-demand predefined route automated driving vehicle by the user; or information related to environment of the annular connected predefined route.

According to this arrangement, the on-demand predefined route automated driving vehicle is dispatched to the anticipated riding location information in advance, based on the anticipated riding location information which is generated based on at least one of the information related to a user, the information related to a destination, or the information related to environment. The annular connected predefined route is a predefined route which is in a runnable area and is determined in advance. The annular connected predefined route is therefore limited within the runnable area and is relatively small in size. For this reason, sets of information of users in the vicinity of the annular connected predefined route are limited to those in the runnable area, and hence such a relatively small number of sets of information can be collected easily. Sets of information of destinations in the vicinity of the annular connected predefined route are limited to those in the runnable area, and hence such a relatively small number of sets of information can be collected easily. Sets of information of environment related to the annular connected predefined route are limited to those in the runnable area, and hence such a relatively small number of sets of information can be collected easily. The information related to a user includes a past use history of the user and a current location of the user. The information of a past use history of a user is, for example, information of a past riding location and past riding date and time of the user and information of a past alighting location and past alighting date and time. The information related to a destination includes a destination when a user used an on-demand predefined route automated driving vehicle in the past. The information related to a destination is, for example, information of surroundings of a destination, information of business hours and business days of a shop, or information of the date and time of an event. The information related to a user and the information related to a destination are, for example, statistical information of check-in and check-out to and from an accommodation. The information related to environment is, for example, weather information such as rain. Furthermore, because the annular connected predefined route is provided within the runnable area, a location where a user is likely to ride on a vehicle can be anticipated relatively easily.

On this account, when the on-demand predefined route automated driving vehicle is dispatched in advance, the vehicles are controlled with better energy efficiency, as compared to a case where the on-demand predefined route automated driving vehicle is not dispatched in advance and is dispatched after receiving a vehicle dispatch command signal. This makes it possible to further reduce the energy consumption of the on-demand predefined route automated driving vehicle in a state of having not received a vehicle dispatch command signal. The energy storage amount of each vehicle is therefore reduced and the degree of freedom in designing the vehicles is further improved.

In addition to the above, it is possible to more accurately cause the on-demand predefined route automated driving vehicle which has no occupant and has not received a vehicle dispatch command signal to be on standby at or around a location on the annular connected predefined route, where a user is anticipated to ride on the vehicle. The waiting time of users is therefore shortened.

On this account, with the on-demand predefined route automated driving vehicle of the present teaching, the waiting time of a user who has made a use request is further shortened, and the degree of freedom in designing the vehicle is further improved as the energy storage amount is reduced.

(3) According to another aspect of the present teaching, the on-demand predefined route automated driving vehicle of the present teaching preferably includes the following arrangement, in addition to the arrangement (1) or (2).

The anticipated riding location information includes information of an anticipated riding location use request time at which the user is anticipated to make the use request at the anticipated riding location, the anticipated riding location being set as the planned riding location in the use request, and based on the in-advance vehicle dispatch command signal, the vehicle-mounted controller controls the drive mechanism, the brake mechanism, and the traveling direction control mechanism so that the on-demand predefined route automated driving vehicle waits at the anticipated riding location at the anticipated riding location use request time.

According to this arrangement, based on the anticipated riding location and the anticipated riding location use request time, the on-demand predefined route automated driving vehicle is dispatched to the anticipated riding location before the anticipated riding location use request time comes. The annular connected predefined route is a predefined route which is in a runnable area and is determined in advance. The annular connected predefined route is therefore limited within the runnable area and is relatively small in size. Because the annular connected predefined route is provided within the runnable area, it is relatively easy to generate an anticipated riding location use request time at which a user is anticipated to make a use request to ride on a vehicle from an anticipated riding location.

For this reason, when the on-demand predefined route automated driving vehicle is dispatched in advance based on the anticipated riding location and the anticipated riding location use request time, the vehicles are controlled with better energy efficiency, as compared to a case where the on-demand predefined route automated driving vehicle is dispatched in advance based solely on the anticipated riding location. This makes it possible to further reduce the energy consumption of the on-demand predefined route automated driving vehicle in a state of having not received a vehicle dispatch command signal. The energy storage amount of each vehicle is therefore reduced and the degree of freedom in designing the vehicles is further improved.

In addition to the above, it is possible to cause the on-demand predefined route automated driving vehicle which has no occupant and has not received a vehicle dispatch command signal to be on standby at or around a location on the annular connected predefined route, where a user is anticipated to ride on the vehicle, before a time at which the user is anticipated to ride on the vehicle comes. The waiting time of users is therefore shortened.

On this account, with the on-demand predefined route automated driving vehicle of the present teaching, the waiting time of a user who has made a use request is further shortened, and the degree of freedom in designing the vehicle is further improved as the energy storage amount is reduced.

(4) According to another aspect of the present teaching, the on-demand predefined route automated driving vehicle of the present teaching preferably includes the following arrangement, in addition to any one of the arrangements (1) to (3).

The annular connected predefined route includes a first annular predefined route and a first connected predefined route connected to the first annular predefined route at a first junction, and when the drive mechanism, the brake mechanism, and the traveling direction control mechanism are not controlled in regard to existence of an obstacle in a vehicle forward direction of the on-demand predefined route automated driving vehicle, and either the on-demand predefined route automated driving vehicle is running on the first annular predefined route toward the first junction and there is a second on-demand predefined route automated driving vehicle running on the first connected predefined route toward the first junction or the on-demand predefined route automated driving vehicle is running on the first connected predefined route toward the first junction and there is a second on-demand predefined route automated driving vehicle running on the first annular predefined route toward the first junction, the vehicle-mounted controller receives an arbitration command signal which is generated by the on-demand predefined route automated driving vehicle fleet controller based on the route information, the vehicle location information, the occupant existence information, and the anticipated riding location information and instructs the on-demand predefined route automated driving vehicle to pass through the first junction after the second on-demand predefined route automated driving vehicle fleet controller passes through the first junction, and the vehicle-mounted controller controls the drive mechanism, the brake mechanism, and the traveling direction control mechanism so that speed of the on-demand predefined route automated driving vehicle running toward the first junction based on the arbitration command signal is lower than speed of the second on-demand predefined route automated driving vehicle running toward the first junction.

According to this arrangement, when the second on-demand predefined route automated driving vehicle is running along the first connected predefined route toward the first junction, the on-demand predefined route automated driving vehicle running along the first annular predefined route toward the first junction decelerates or stops based on a received arbitration command signal. In other words, when the second on-demand predefined route automated driving vehicle is running along the first connected predefined route toward the first junction, the on-demand predefined route automated driving vehicle running along the first annular predefined route toward the first junction waits based on the arbitration command signal so that this vehicle passes through the first junction after the second on-demand predefined route automated driving vehicle passes through the first junction. The second on-demand predefined route automated driving vehicle running along the first connected predefined route toward the first junction passes through the first junction before the on-demand predefined route automated driving vehicle running along the first annular predefined route toward the first junction passes through the first junction. Meanwhile, when the second on-demand predefined route automated driving vehicle is running along the first annular predefined route toward the first junction, the on-demand predefined route automated driving vehicle running along the first connected predefined route toward the first junction decelerates or stops based on a received arbitration command signal. In other words, when the second on-demand predefined route automated driving vehicle is running along the first annular predefined route toward the first junction, the on-demand predefined route automated driving vehicle running along the first connected predefined route toward the first junction waits based on the arbitration command signal so that this vehicle passes through the first junction after the second on-demand predefined route automated driving vehicle passes through the first junction. The second on-demand predefined route automated driving vehicle running along the first annular predefined route toward the first junction passes through the first junction before the on-demand predefined route automated driving vehicle running along the first connected predefined route toward the first junction passes through the first junction. An arbitration command signal is sent to the on-demand predefined route automated driving vehicle in the following cases, for example. For example, there is a case in which an on-demand predefined route automated driving vehicle is in the in-advance vehicle dispatch state whereas a second on-demand predefined route automated driving vehicle has an occupant or is in the vehicle dispatch state. The vehicle in the in-advance vehicle dispatch state is a vehicle running toward an anticipated riding location based on an in-advance vehicle dispatch command signal. The vehicle in the vehicle dispatch state is a vehicle running toward a planned riding location based on a vehicle dispatch command signal. For example, there is a case in which an on-demand predefined route automated driving vehicle is in the standby state whereas a second on-demand predefined route automated driving vehicle is in the vehicle dispatch state. The vehicle in the standby state has no occupant and is able to receive an in-advance vehicle dispatch command signal or a vehicle dispatch command signal. Furthermore, there is a case in which, for example, an on-demand predefined route automated driving vehicle is in the vehicle dispatch state whereas a second on-demand predefined route automated driving vehicle has an occupant. Furthermore, there is a case in which, for example, both of the on-demand predefined route automated driving vehicle and the second on-demand predefined route automated driving vehicle either are in the vehicle dispatch state or have occupants and the distance from the first junction to a planned riding location toward which the on-demand predefined route automated driving vehicle is running is shorter than the distance from the first junction to a planned riding location toward which the second on-demand predefined route automated driving vehicle is running. Furthermore, there is a case in which, for example, both of the on-demand predefined route automated driving vehicle and the second on-demand predefined route automated driving vehicle are in the standby state, are in the vehicle dispatch state, or have occupants and the distance from the first junction to a current location of the on-demand predefined route automated driving vehicle is longer than the distance from the first junction to a current location where the second on-demand predefined route automated driving vehicle is running. Furthermore, there is a case in which the remaining energy amount of the on-demand predefined route automated driving vehicle is larger than the remaining energy amount of the second on-demand predefined route automated driving vehicle. On this account, when an on-demand predefined route automated driving vehicle is running along the first annular predefined route toward the first junction and an on-demand predefined route automated driving vehicle is running along the first connected predefined route toward the first junction, it is possible to cause these two on-demand predefined route automated driving vehicles to smoothly pass through the first junction. With this arrangement, the on-demand predefined route automated driving vehicles are able to smoothly run even when the number of connected predefined routes connected to the annular predefined route is increased. Furthermore, the number of on-demand predefined route automated driving vehicles running along the annular connected predefined route can be increased. The waiting time of users is therefore shortened.

When the number of the on-demand predefined route automated driving vehicles runnable on the annular connected predefined route is increased, the distance from a current location of the on-demand predefined route automated driving vehicle having no occupant and having not received a vehicle dispatch command signal to the anticipated riding location may be shortened. It is therefore possible to further reduce the energy consumption amount of each on-demand predefined route automated driving vehicle.

On this account, with the on-demand predefined route automated driving vehicle of the present teaching, the waiting time of a user who has made a use request is further shortened, and the degree of freedom in designing the vehicle is further improved as the energy storage amount is further reduced.

(5) According to another aspect of the present teaching, the on-demand predefined route automated driving vehicle of the present teaching preferably includes the following arrangement, in addition to any one of the arrangements (1) to (4).

The maximum number of occupants on the on-demand predefined route automated driving vehicle is eight.

According to this arrangement, as compared to a case where the maximum number of occupants is more than eight, the weight of the on-demand predefined route automated driving vehicle is small. As compared to a case where the maximum number of occupants is more than eight, the total weight of the on-demand predefined route automated driving vehicle with the occupants is small. It is therefore possible to improve the energy efficiency of each on-demand predefined route automated driving vehicle. In other words, it is possible to improve the degree of freedom in designing the vehicles by reducing the energy storage amount of each on-demand predefined route automated driving vehicle.

The on-demand predefined route automated driving vehicle of the present teaching is therefore able to shorten the waiting time of a user who has made a use request and to further improve the degree of freedom in design by further reducing an energy storage amount.

(6) According to another aspect of the present teaching, the on-demand predefined route automated driving vehicle of the present teaching preferably includes the following arrangement, in addition to any one of the arrangements (1) to (5).

The vehicle-mounted controller controls the drive mechanism, the brake mechanism, and the traveling direction control mechanism so that speed of running toward the anticipated riding location based on the in-advance vehicle dispatch command signal is 40 km per hour or less.

According to this arrangement, when the speed of the on-demand predefined route automated driving vehicle running toward the anticipated riding location based on the in-advance vehicle dispatch command signal is controlled to be 40 km per hour or less, the air resistance of the on-demand predefined route automated driving vehicle is small as compared to a case where the vehicle running toward the anticipated riding location based on the in-advance vehicle dispatch command signal is controlled so that the speed is higher than 40 km per hour. It is therefore possible to reduce the energy consumption amount of each on-demand predefined route automated driving vehicle.

When the speed of the vehicle running toward the anticipated riding location based on the in-advance vehicle dispatch command signal is controlled to be 40 km per hour or less, the time of the running of the on-demand predefined route automated driving vehicle from the current location to the anticipated riding location is long as compared to a case where the vehicle running toward the anticipated riding location based on the in-advance vehicle dispatch command signal is controlled so that the speed of the vehicle is higher than 40 km per hour. Meanwhile, the number of the on-demand predefined route automated driving vehicles running along the annular connected predefined route can be increased. It is therefore possible to dispatch an on-demand predefined route automated driving vehicle whose current location is close to the anticipated riding location, in advance. The waiting time of users is therefore shortened.

The on-demand predefined route automated driving vehicle of the present teaching is therefore able to shorten the waiting time of a user who has made a use request and to further improve the degree of freedom in design by further reducing an energy storage amount.

(7) According to another aspect of the present teaching, the on-demand predefined route automated driving vehicle of the present teaching preferably includes the following arrangement, in addition to any one of the arrangements (1) to (6).

The vehicle-mounted controller controls the drive mechanism, the brake mechanism, and the traveling direction control mechanism so that speed of moving toward the planned riding location based on the vehicle dispatch command signal is 40 km per hour or less.

According to this arrangement, when the speed of the on-demand predefined route automated driving vehicle running toward the planned riding location based on the vehicle dispatch command signal is controlled to be 40 km per hour or less, the air resistance of the on-demand predefined route automated driving vehicle is small as compared to a case where the vehicle running toward the planned riding location based on the vehicle dispatch command signal is controlled so that the speed is higher than 40 km per hour. It is therefore possible to reduce the energy consumption amount of each on-demand predefined route automated driving vehicle.

When the speed of the on-demand predefined route automated driving vehicle running toward the planned riding location based on the vehicle dispatch command signal is controlled to be 40 km per hour or less, the time of the running of the on-demand predefined route automated driving vehicle from the current location to the planned riding location is long as compared to a case where the vehicle running toward the planned riding location based on the vehicle dispatch command signal is controlled so that the speed is higher than 40 km per hour. Meanwhile, the number of the on-demand predefined route automated driving vehicles running along the annular connected predefined route can be increased. It is therefore possible to dispatch an on-demand predefined route automated driving vehicle whose current location is close to the planned riding location. The waiting time of users is therefore shortened.

The on-demand predefined route automated driving vehicle of the present teaching is therefore able to shorten the waiting time of a user who has made a use request and to further improve the degree of freedom in design by further reducing an energy storage amount.

(8) According to another aspect of the present teaching, the on-demand predefined route automated driving vehicle of the present teaching preferably includes the following arrangement, in addition to any one of the arrangements (1) to (7).

When the on-demand predefined route automated driving vehicle is selected as a vehicle to be dispatched at an anticipated riding location in advance from vehicles which have not received the vehicle dispatch command signal among the plurality of on-demand predefined route automated driving vehicles by the on-demand predefined route automated driving vehicle fleet controller, based on (A) the route information, (B) the vehicle location information, (C) the occupant existence information, (D) the anticipated riding location information, and (E) energy information which is related to a remaining energy amount of each of the plurality of on-demand predefined route automated driving vehicles on the annular connected predefined route, the vehicle-mounted controller receives the in-advance vehicle dispatch command signal generated by the on-demand predefined route automated driving vehicle fleet controller based on the route information, the vehicle location information, the occupant existence information, the anticipated riding location information, and the energy information.

According to this arrangement, the on-demand predefined route automated driving vehicle fleet controller selects a vehicle to be dispatched to the anticipated riding location in advance from vehicles having not received a vehicle dispatch command signal among the plurality of on-demand predefined route automated driving vehicles, based on the remaining energy amount of each of the plurality of on-demand predefined route automated driving vehicles. For example, an on-demand predefined route automated driving vehicle which has a remaining energy amount sufficiently larger than the energy amount required to run from the current location to the anticipated riding location is selected as a vehicle to be dispatched to the anticipated riding location in advance by the on-demand predefined route automated driving vehicle fleet controller. In other words, an on-demand predefined route automated driving vehicle having a large remaining energy amount is preferentially dispatched to the anticipated riding location in advance. The frequency of the supply of energy to the plurality of on-demand predefined route automated driving vehicles is reduced. On this account, it is possible to improve the overall energy efficiency of the plurality of on-demand predefined route automated driving vehicles. It is therefore possible to improve the degree of freedom in designing the vehicles by reducing the energy storage amount of each on-demand predefined route automated driving vehicle.

The on-demand predefined route automated driving vehicle of the present teaching is therefore able to shorten the waiting time of a user who has made a use request and to further improve the degree of freedom in design by further reducing an energy storage amount.

(9) According to another aspect of the present teaching, the on-demand predefined route automated driving vehicle of the present teaching preferably includes the following arrangement, in addition to the arrangement (8).

The vehicle-mounted controller sends information related to the remaining energy amount of the on-demand predefined route automated driving vehicle to the on-demand predefined route automated driving vehicle fleet controller.

According to this arrangement, the on-demand predefined route automated driving vehicle sends information related to its remaining energy amount to the on-demand predefined route automated driving vehicle fleet controller. The on-demand predefined route automated driving vehicle fleet controller selects a vehicle to be dispatched to the anticipated riding location in advance from vehicles having not received a vehicle dispatch command signal among the on-demand predefined route automated driving vehicles, based on a more accurate remaining energy amount of each of the on-demand predefined route automated driving vehicles sent to the on-demand predefined route automated driving vehicle fleet controller. For example, an on-demand predefined route automated driving vehicle which has a remaining energy amount sufficiently larger than the energy amount required to run from the current location to the anticipated riding location is further accurately selected as a vehicle to be dispatched to the anticipated riding location in advance by the on-demand predefined route automated driving vehicle fleet controller. In other words, an on-demand predefined route automated driving vehicle having a large remaining energy amount is preferentially dispatched to the anticipated riding location in advance, further accurately. The frequency of the supply of energy to the on-demand predefined route automated driving vehicles is therefore reduced further accurately. On this account, it is possible to further improve the overall energy efficiency of the on-demand predefined route automated driving vehicles. It is therefore possible to further improve the degree of freedom in designing the vehicles by reducing the energy storage amount of each on-demand predefined route automated driving vehicle.

The on-demand predefined route automated driving vehicle of the present teaching is therefore able to shorten the waiting time of a user who has made a use request and to further improve the degree of freedom in design by further reducing an energy storage amount.

(10) According to another aspect of the present teaching, the on-demand predefined route automated driving vehicle of the present teaching preferably includes the following arrangement, in addition to the arrangement (8) or (9).

The anticipated riding location information includes information of an anticipated alighting location which is anticipated to become a planned alighting location where a user alights from a vehicle.

The in-advance vehicle dispatch command signal is generated by the on-demand predefined route automated driving vehicle fleet controller based on the route information, the vehicle location information, the occupant existence information, the anticipated riding location information, and the energy information. The anticipated riding location information includes an anticipated riding location and an anticipated alighting location. The anticipated alighting location is generated based on at least one of the information related to a user, the information related to a destination, or the information related to environment. The on-demand predefined route automated driving vehicle fleet controller therefore dispatches, to the anticipated riding location in advance, an on-demand predefined route automated driving vehicle which is selected based on the current locations, the anticipated riding location, the anticipated alighting location, and the remaining energy amounts of the on-demand predefined route automated driving vehicles. For example, the on-demand predefined route automated driving vehicle fleet controller is able to dispatch, to the anticipated riding location in advance, an on-demand predefined route automated driving vehicle having a remaining energy amount sufficient to run from the current location to the anticipated alighting location via the anticipated riding location. On this account, it is possible to improve the overall energy efficiency of the on-demand predefined route automated driving vehicles. It is therefore possible to improve the degree of freedom in designing the vehicles by reducing the energy storage amount of each on-demand predefined route automated driving vehicle.

On this account, with the on-demand predefined route automated driving vehicle of the present teaching, the waiting time of a user who has made a use request is further shortened, and the degree of freedom in designing the vehicle is further improved as the energy storage amount is further reduced.

(11) According to another aspect of the present teaching, the on-demand predefined route automated driving vehicle of the present teaching preferably includes the following arrangement, in addition to any one of the arrangements (1) to (10).

The annular connected predefined route includes a first annular predefined route, a second annular predefined route, and at least one first connected predefined route, and the first annular predefined route and the second annular predefined route are connected to each other through the at least one first connected predefined route so that a vehicle is able to run across the routes.

According to this arrangement, plural annular predefined routes are included in the annular connected predefined route. The number of on-demand predefined route automated driving vehicles running along the annular connected predefined route can be increased. The waiting time of users is therefore shortened.

When the number of the on-demand predefined route automated driving vehicles runnable on the annular connected predefined route is increased, the distance from the current location of the on-demand predefined route automated driving vehicle to the anticipated riding location may be shortened. It is therefore possible to further reduce the energy consumption amount of each on-demand predefined route automated driving vehicle.

On this account, with the on-demand predefined route automated driving vehicle of the present teaching, the waiting time of a user who has made a use request is further shortened, and the degree of freedom in designing the vehicle is further improved as the energy storage amount is further reduced.

(12) According to another aspect of the present teaching, the on-demand predefined route automated driving vehicle of the present teaching preferably includes the following arrangement, in addition to any one of the arrangements (1) to (11).

When at least one use request management device which is able to send and receive information to and from an information terminal and the on-demand predefined route automated driving vehicle fleet controller receives the use request of the user from the information terminal, the use request of the user is sent from the at least one use request management device to the on-demand predefined route automated driving vehicle fleet controller and acquired by the on-demand predefined route automated driving vehicle fleet controller, and based on the vehicle dispatch command signal generated by the on-demand predefined route automated driving vehicle fleet controller, the vehicle-mounted controller controls the drive mechanism, the brake mechanism, and the traveling direction control mechanism so that the on-demand predefined route automated driving vehicle runs toward a planned riding location of the user, which is included in the use request received by the at least one use request management device.

According to this arrangement, the use request from the user is sent from the information terminal to the on-demand predefined route automated driving vehicle fleet controller, via at least one use request management device. The information terminal may be held by a user or may be provided at a location where an occupant gets on or off from an on-demand predefined route automated driving vehicle. The user sends the use request from the information terminal to the use request management device which is arranged to be able to communicate with the on-demand predefined route automated driving vehicle fleet controller. Plural use request management devices can be provided for one on-demand predefined route automated driving vehicle fleet controller. In other words, the on-demand predefined route automated driving vehicle fleet controller is able to receive a use request of a user from the information terminal held by the user, via plural use request management devices. It is therefore possible to dispatch an on-demand predefined route automated driving vehicle by one on-demand predefined route automated driving vehicle fleet controller based on a use request from a user received by the plural use request management devices. In other words, when one on-demand predefined route automated driving vehicle fleet controller is provided for plural use request management devices, transmission of information between on-demand predefined route automated driving vehicle fleet controllers is unnecessary as compared to a case where an on-demand predefined route automated driving vehicle fleet controller is provided for each of use request management devices. It is therefore possible to further quickly dispatch an on-demand predefined route automated driving vehicle by one on-demand predefined route automated driving vehicle fleet controller based on a use request from a user received by the plural use request management devices. The waiting time of users is therefore shortened.

The on-demand predefined route automated driving vehicle of the present teaching is therefore able to shorten the waiting time of a user who has made a use request and to improve the degree of freedom in design by reducing an energy storage amount.

(13) According to another aspect of the present teaching, the on-demand predefined route automated driving vehicle of the present teaching preferably includes the following arrangement, in addition to the arrangement (12).

The anticipated riding location information is generated by the at least one use request management device based on at least one of the information related to the user, the information related to the destination, or the information related to the environment, and is sent by the at least one use request management device.

According to this arrangement, the on-demand predefined route automated driving vehicle is dispatched to the anticipated riding location information in advance, based on the anticipated riding location information which is generated based on at least one of the information related to a user, the information related to a destination, or the information related to environment, which are generated by the use request management device. The annular connected predefined route is a predefined route which is in a runnable area and is determined in advance. The annular connected predefined route is therefore limited within the runnable area and is relatively small in size. For this reason, at least one group of: sets information of users in the vicinity of the annular connected predefined route; sets of information related to destinations; and sets of information related to environment is limited to those in the runnable area, and hence such a relatively small number of sets of information can be collected easily. In addition to the above, the use request management device is able to acquire information related to users, information related to destinations, and information related to environment, which reflect the use of vehicles of the users around the annular connected predefined route. It is therefore possible to anticipate a location where a user is likely to ride on a vehicle further easily.

On this account, the on-demand predefined route automated driving vehicles are controlled with better energy efficiency, as compared to a case where a vehicle moves after receiving a vehicle dispatch command signal. This makes it possible to further reduce the energy consumption of the on-demand predefined route automated driving vehicle in a state of having not received a vehicle dispatch command signal. The energy storage amount of each vehicle is therefore reduced and the degree of freedom in designing the vehicles is further improved.

In addition to the above, it is possible to more accurately cause the on-demand predefined route automated driving vehicle which has not received a vehicle dispatch command signal to be on standby at or around a location on the annular connected predefined route, where a user is anticipated to ride on the vehicle. The waiting time of users is therefore shortened.

On this account, with the on-demand predefined route automated driving vehicle of the present teaching, the waiting time of a user who has made a use request is further shortened, and the degree of freedom in designing the vehicle is further improved as the energy storage amount is reduced.

The present teaching may be related to an on-demand predefined route automated driving vehicle fleet controller.

An on-demand predefined route automated driving vehicle fleet controller has been known. The on-demand predefined route automated driving vehicle fleet controller is arranged to be able to send and receive information to and from the on-demand predefined route automated driving vehicles. The on-demand predefined route automated driving vehicle fleet controller is arranged to be able to send and receive information to and from plural on-demand predefined route automated driving vehicles, and to control the running of each of the on-demand predefined route automated driving vehicles. The on-demand predefined route automated driving vehicle automatically runs along a predefined route which is in a runnable area and is determined in advance. When receiving a use request from a user, the on-demand predefined route automated driving vehicle fleet controller sends a vehicle dispatch command signal generated by the on-demand predefined route automated driving vehicle fleet controller to the on-demand predefined route automated driving vehicle. The on-demand predefined route automated driving vehicle fleet controller then dispatches the on-demand predefined route automated driving vehicle to a location where the user plans to ride on the vehicle. The on-demand predefined route automated driving vehicle fleet controller controls the running of the on-demand predefined route automated driving vehicles.

The running of the on-demand predefined route automated driving vehicle which runs along the predefined route is limited in the runnable area. Meanwhile, an automated driving vehicle which runs along a route which is not a predefined route is allowed to run freely in the runnable area. When running from a start point to an end point of the predefined route, an amount of energy consumed by the on-demand predefined route automated driving vehicle which runs along the predefined route tends to be smaller than an amount of energy consumed by the automated driving vehicle which runs along a route which is not a predefined route.

The predefined route along which the on-demand predefined route automated driving vehicle runs may be annular. When the predefined route is annular, plural on-demand predefined route automated driving vehicles are able to regularly circulate along the route. When the predefined route is annular, plural on-demand predefined route automated driving vehicles are able to run along the predefined route in a dispersed manner.

Patent Literature 1 discloses an on-demand predefined route automated driving vehicle fleet controller which dispatches plural on-demand predefined route automated driving vehicles running along an annular predefined route. According to Patent Literature 1, the on-demand predefined route automated driving vehicles regularly circulate along the annular predefined route. According to Patent Literature 1, the on-demand predefined route automated driving vehicle fleet controller dispatches one of the on-demand predefined route automated driving vehicles regularly circulating along the annular predefined route, in accordance with a use request from a user. This reduces the waiting time of the user who has made the use request for using the on-demand predefined route automated driving vehicle. According to Patent Literature 1, when picking up a user, an on-demand predefined route automated driving vehicle deviates from the annular predefined route and runs along a non-predefined route. When the on-demand predefined route automated driving vehicle on which the user rides runs along the annular predefined route, the vehicle stops as the user presses a stop key at a desired location.

When a connected predefined route is connected to an annular predefined route so that vehicles are able to run across the routes, the predefined route is increased in area and the number of on-demand predefined route automated driving vehicles is likely to be increased. When the number of on-demand predefined route automated driving vehicles is increased, a processing load on the on-demand predefined route automated driving vehicle fleet controller is increased.

An object of the present teaching is to suppress a processing load on an on-demand predefined route automated driving vehicle fleet controller which controls the running of plural on-demand predefined route automated driving vehicles, while reducing a waiting time of a user who has made a use request.

In order to suppress the processing load on the on-demand predefined route automated driving vehicle fleet controller, the number of times of energy supply to the on-demand predefined route automated driving vehicles may be reduced. In order to reduce the number of times of energy supply, the running of each on-demand predefined route automated driving vehicle may be controlled so that the energy consumption is suppressed. When plural on-demand predefined route automated driving vehicles regularly circulate, an energy consumption amount of all of the on-demand predefined route automated driving vehicles running along the annular predefined route is large as compared to a case where a vehicle runs in response to the acquisition of a use request. In Patent Literature 1, the on-demand predefined route automated driving vehicles are electric wheelchairs each of which is a small vehicle. Each electric wheelchair consumes a small amount of energy. As such, in Patent Literature 1, increase in an energy consumption amount of the all on-demand predefined route automated driving vehicles running along the annular predefined route is suppressed because wheelchairs with a low consumption amount are employed. Meanwhile, the inventors of the subject application connected a connected predefined route to an annular predefined route in order to suppress the energy consumption of each on-demand predefined route automated driving vehicle. Furthermore, the inventors tried to control the running of plural on-demand predefined route automated driving vehicles on the predefined route by an on-demand predefined route automated driving vehicle fleet controller.

(14) An on-demand predefined route automated driving vehicle fleet controller of the present teaching is (i) able to send and receive information to and from on-demand predefined route automated driving vehicles which automatically run in a predefined route which is in a runnable area and is determined in advance, no matter whether an occupant is in the vehicles, and (ii) configured to control running of the on-demand predefined route automated driving vehicles when receiving a use request from a user, so that at least one of the on-demand predefined route automated driving vehicles is dispatched to a location where the user plans to ride on a vehicle, the on-demand predefined route automated driving vehicle fleet controller including a processor which is arranged or programmed to execute: an information acquisition process of acquiring (A) route information related to the predefined route which is an annular connected predefined route including at least one annular predefined route and at least one connected predefined route connected to the at least one annular predefined route so that a vehicle is able to run across the routes, (B) vehicle location information related to current locations of the on-demand predefined route automated driving vehicles on the annular connected predefined route, which are sent from the on-demand predefined route automated driving vehicles on the annular connected predefined route, (C) occupant existence information related to existence of an occupant on each of the on-demand predefined route automated driving vehicles on the annular connected predefined route, and (D) anticipated riding location information related to an anticipated riding location which is anticipated to become the planned riding location on the annular connected predefined route; an in-advance dispatched vehicle selection process of selecting, based on the acquired route information vehicle location information, occupant existence information, and anticipated riding location information, a vehicle to be dispatched to the anticipated riding location in advance from vehicles having no occupant and having not received the vehicle dispatch command signal among the on-demand predefined route automated driving vehicles; an in-advance vehicle dispatch command signal generation process of generating, based on the acquired route information vehicle location information, occupant existence information, and anticipated riding location information, an in-advance vehicle dispatch command signal which instructs the selected vehicle which is to be dispatched to the anticipated riding location among the on-demand predefined route automated driving vehicles to run toward the anticipated riding location; and a sending process of sending the generated vehicle dispatch command signal to the selected vehicle which is to be dispatched to the anticipated riding location among the on-demand predefined route automated driving vehicles.

According to this arrangement, the on-demand predefined route automated driving vehicle runs along the annular connected predefined route which includes at least one annular predefined route and at least one connected predefined route which is connected to the at least one annular predefined route so that vehicles are able to run across these routes. The number of the connected predefined routes connected to an annular predefined route so that vehicles are able to run across these routes can be increased. The on-demand predefined route automated driving vehicle fleet controller generates an in-advance vehicle dispatch command signal to instruct the on-demand predefined route automated driving vehicle to run toward an anticipated riding location on the annular connected predefined route, which is anticipated to become a planned riding location where a user plans to ride on the vehicle, based on the in-advance vehicle dispatch command signal. The in-advance vehicle dispatch command signal is generated by the on-demand predefined route automated driving vehicle fleet controller based on the route information, the vehicle location information, the occupant existence information, and the anticipated riding location. When the on-demand predefined route automated driving vehicle is dispatched in advance, the vehicles are controlled with better energy efficiency, as compared to a case where the on-demand predefined route automated driving vehicle is not dispatched in advance and is dispatched after receiving a vehicle dispatch command signal. The control of the vehicles with better energy efficiency corresponds to, for example, the following case. For example, the on-demand predefined route automated driving vehicle having received the in-advance vehicle dispatch command signal runs at a speed with a small energy consumption amount or runs along a route with no traffic jam. This makes it possible to reduce the energy consumption of the on-demand predefined route automated driving vehicle having received the in-advance vehicle dispatch command signal. In other words, the running of the on-demand predefined route automated driving vehicle is controlled so that the energy consumption is suppressed. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

In addition to the above, it is possible to cause the on-demand predefined route automated driving vehicle which has not received a vehicle dispatch command signal to be on standby at or around a location on the annular connected predefined route, where a user is anticipated to ride on the vehicle. The waiting time of users is therefore shortened.

The on-demand predefined route automated driving vehicle fleet controller of the present teaching is therefore able to suppress the processing load of the on-demand predefined route automated driving vehicle fleet controller while further shortening the waiting time of the user who has made the use request.

(15) According to another aspect of the present teaching, the on-demand predefined route automated driving vehicle fleet controller of the present teaching preferably includes the following arrangement, in addition to the arrangement (14).

The anticipated riding location information is generated based on at least one of: information related to a user, including a past use history of the user and a current location of the user; information related to a destination, including a destination in past use of the on-demand predefined route automated driving vehicle by the user; or information related to environment of the annular connected predefined route.

According to this arrangement, the on-demand predefined route automated driving vehicle is dispatched to the anticipated riding location information in advance, based on the anticipated riding location information which is generated based on at least one of the information related to a user, the information related to a destination, or the information related to environment. The annular connected predefined route is a predefined route which is in a runnable area and is determined in advance. The annular connected predefined route is therefore limited within the runnable area and is relatively small in size. For this reason, sets of information of users in the vicinity of the annular connected predefined route are limited to those in the runnable area, and hence such a relatively small number of sets of information can be collected easily. Sets of information of destinations in the vicinity of the annular connected predefined route are limited to those in the runnable area, and hence such a relatively small number of sets of information can be collected easily. Sets of information of environment related to the annular connected predefined route are limited to those in the runnable area, and hence such a relatively small number of sets of information can be collected easily. The information related to a user includes a past use history of the user and a current location of the user. The information of a past use history of a user is, for example, information of a past riding location and past riding date and time of the user and information of a past alighting location and past alighting date and time. The information related to a destination includes a destination when a user used an on-demand predefined route automated driving vehicle in the past. The information related to a destination is, for example, information of surroundings of a destination, information of business hours and business days of a shop, or information of the date and time of an event. The information related to a user and the information related to a destination are, for example, statistical information of check-in and check-out to and from an accommodation. The information related to environment is, for example, weather information such as rain. Furthermore, because the annular connected predefined route is provided within the runnable area, a location where a user is likely to ride on a vehicle can be anticipated relatively easily.

On this account, the on-demand predefined route automated driving vehicles are controlled with better energy efficiency, as compared to a case where a vehicle moves after receiving a vehicle dispatch command signal. This makes it possible to further reduce the energy consumption of the on-demand predefined route automated driving vehicle in a state of having not received a vehicle dispatch command signal. On this account, the running of the on-demand predefined route automated driving vehicle is controlled so that the energy consumption is suppressed. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

In addition to the above, it is possible to more accurately cause the on-demand predefined route automated driving vehicle which has not received a vehicle dispatch command signal to be on standby at or around a location on the annular connected predefined route, where a user is anticipated to ride on the vehicle. The waiting time of users is therefore shortened.

The on-demand predefined route automated driving vehicle fleet controller of the present teaching is therefore able to suppress the processing load on the on-demand predefined route automated driving vehicle fleet controller while further shortening the waiting time of the user who has made the use request.

(16) According to another aspect of the present teaching, the on-demand predefined route automated driving vehicle fleet controller of the present teaching preferably includes the following arrangement, in addition to the arrangement (14) or (15).

The anticipated riding location information includes information of an anticipated riding location use request time at which the user is anticipated to make the use request at the anticipated riding location, the anticipated riding location being set as the planned riding location in the use request, and the in-advance vehicle dispatch command signal instructs a vehicle to be at the anticipated riding location at the anticipated riding location use request time.

According to this arrangement, based on the anticipated riding location information and the anticipated riding location use request time, the on-demand predefined route automated driving vehicle is dispatched to the anticipated riding location in advance. The annular connected predefined route is a predefined route which is in a runnable area and is determined in advance. The annular connected predefined route is therefore limited within the runnable area and is relatively small in size. Because the annular connected predefined route is provided within the runnable area, it is relatively easy to generate an anticipated riding location use request time at which a user is anticipated to make a use request to ride on a vehicle from an anticipated riding location.

For this reason, when the on-demand predefined route automated driving vehicle is dispatched in advance based on the anticipated riding location and the anticipated riding location use request time, the vehicles are controlled with better energy efficiency, as compared to a case where the on-demand predefined route automated driving vehicle is dispatched in advance based solely on the anticipated riding location. This makes it possible to further reduce the energy consumption of the on-demand predefined route automated driving vehicle in a state of having not received a vehicle dispatch command signal. On this account, the running of the on-demand predefined route automated driving vehicle is controlled so that the energy consumption is suppressed. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

In addition to the above, it is possible to cause the on-demand predefined route automated driving vehicle which has not received a vehicle dispatch command signal to be on standby at or around a location on the annular connected predefined route, where a user is anticipated to ride on the vehicle, before a time at which the user is anticipated to ride on the vehicle comes. The waiting time of users is therefore shortened.

The on-demand predefined route automated driving vehicle fleet controller of the present teaching is therefore able to suppress the processing load on the on-demand predefined route automated driving vehicle fleet controller while further shortening the waiting time of the user who has made the use request.

(17) According to another aspect of the present teaching, the on-demand predefined route automated driving vehicle fleet controller of the present teaching preferably includes the following arrangement, in addition to any one of the arrangements (14) to (16).

The annular connected predefined route includes a first annular predefined route and a first connected predefined route connected to the first annular predefined route at a first junction, the processor is arranged or programmed to further execute an arbitration command signal generation process of generating an arbitration command signal which instructs that speed of a first on-demand predefined route automated driving vehicle running toward the first junction to be lower than speed of a second on-demand predefined route automated driving vehicle running toward the first junction so that the first on-demand predefined route automated driving vehicle passes through the first junction after the second on-demand predefined route automated driving vehicle passes through the first junction, based on the route information, the vehicle location information, the occupant existence information, and the anticipated riding location information, when either (i) the first on-demand predefined route automated driving vehicle is running along the first annular predefined route toward the first junction and the second on-demand predefined route automated driving vehicle is running along the first connected predefined route toward the first junction and control related to an obstacle in a vehicle forward direction of the on-demand predefined route automated driving vehicle is not performed by the drive mechanism, the brake mechanism, and the traveling direction control mechanism or (ii) the first on-demand predefined route automated driving vehicle is running along the first connected predefined route toward the first junction and the second on-demand predefined route automated driving vehicle is running along the first annular predefined route toward the first junction and control related to an obstacle in a vehicle forward direction of the on-demand predefined route automated driving vehicle is not performed by the drive mechanism, the brake mechanism, and the traveling direction control mechanism, and the generated arbitration command signal is sent to the first on-demand predefined route automated driving vehicle in the sending process.

According to this arrangement, when the second on-demand predefined route automated driving vehicle is running along the first connected predefined route toward the first junction, the first on-demand predefined route automated driving vehicle running along the first annular predefined route toward the first junction decelerates or stops based on a received arbitration command signal. In other words, when the second on-demand predefined route automated driving vehicle is running along the first connected predefined route toward the first junction, the first on-demand predefined route automated driving vehicle running along the first annular predefined route toward the first junction waits for the passing of the second on-demand predefined route automated driving vehicle through the first junction, based on the arbitration command signal. The second first on-demand predefined route automated driving vehicle running along the first connected predefined route toward the first junction passes through the first junction before the first on-demand predefined route automated driving vehicle running along the first annular predefined route toward the first junction passes through the first junction. Meanwhile, when the second first on-demand predefined route automated driving vehicle is running along the first annular predefined route toward the first junction, the first on-demand predefined route automated driving vehicle running along the first connected predefined route toward the first junction decelerates or stops based on a received arbitration command signal. In other words, when the second first on-demand predefined route automated driving vehicle is running along the first annular predefined route toward the first junction, the first on-demand predefined route automated driving vehicle running along the first connected predefined route toward the first junction waits based on the arbitration command signal so that the first on-demand predefined route automated driving vehicle passes through the first junction after the second on-demand predefined route automated driving vehicle passes through the first junction. The second first on-demand predefined route automated driving vehicle running along the first annular predefined route toward the first junction passes through the first junction before the first on-demand predefined route automated driving vehicle running along the first connected predefined route toward the first junction passes through the first junction. An arbitration command signal is sent to the first on-demand predefined route automated driving vehicle in the following cases, for example. For example, there is a case in which the first on-demand predefined route automated driving vehicle is in the in-advance vehicle dispatch state whereas the second on-demand predefined route automated driving vehicle has an occupant or is in the vehicle dispatch state. The vehicle in the in-advance vehicle dispatch state is a vehicle running toward an anticipated riding location based on an in-advance vehicle dispatch command signal. The vehicle in the vehicle dispatch state is a vehicle running toward a planned riding location based on a vehicle dispatch command signal. Meanwhile, for example, there is a case in which the first on-demand predefined route automated driving vehicle is in the standby state whereas the second on-demand predefined route automated driving vehicle is either a vehicle having an occupant or a vehicle in the vehicle dispatch state. The vehicle in the standby state has no occupant and is able to receive the vehicle dispatch command signal. Furthermore, there is a case in which, for example, the first on-demand predefined route automated driving vehicle is in the vehicle dispatch state whereas the second on-demand predefined route automated driving vehicle has an occupant. Furthermore, there is a case in which, for example, both of the first on-demand predefined route automated driving vehicle and the second on-demand predefined route automated driving vehicle either are in the vehicle dispatch state or have occupants and the distance from the first junction to a planned riding location toward which the first on-demand predefined route automated driving vehicle is running is shorter than the distance from the first junction to a planned riding location toward which the second on-demand predefined route automated driving vehicle is running. Furthermore, there is a case in which, for example, both of the first on-demand predefined route automated driving vehicle and the second on-demand predefined route automated driving vehicle are in the standby state, are in the vehicle dispatch state, or have occupants and the distance from the first junction to a current location of the first on-demand predefined route automated driving vehicle is longer than the distance from the first junction to a current location where the second on-demand predefined route automated driving vehicle is running. Furthermore, there is a case in which the remaining energy amount of the first on-demand predefined route automated driving vehicle is larger than the remaining energy amount of the second on-demand predefined route automated driving vehicle. On this account, when the first on-demand predefined route automated driving vehicle is running along the first annular predefined route toward the first junction and the on-demand predefined route automated driving vehicle is running along the first connected predefined route toward the first junction, it is possible to cause these two on-demand predefined route automated driving vehicles to smoothly pass through the first junction. With this arrangement, the on-demand predefined route automated driving vehicles are able to smoothly run even when the number of connected predefined routes connected to the annular predefined route is increased. Furthermore, the number of on-demand predefined route automated driving vehicles running along the annular connected predefined route can be increased. The waiting time of users is therefore shortened. When the number of the on-demand predefined route automated driving vehicles runnable on the annular connected predefined route is increased, the distance from a current location of the on-demand predefined route automated driving vehicle having no occupant and having not received a vehicle dispatch command signal to the anticipated riding location may be shortened. On this account, the running of the on-demand predefined route automated driving vehicle is controlled so that the energy consumption is suppressed. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

The on-demand predefined route automated driving vehicle fleet controller of the present teaching is therefore able to suppress the processing load on the on-demand predefined route automated driving vehicle fleet controller while further shortening the waiting time of the user who has made the use request.

(18) According to another aspect of the present teaching, the on-demand predefined route automated driving vehicle fleet controller of the present teaching preferably includes the following arrangement, in addition to any one of the arrangements (14) to (17).

The maximum number of occupants on the on-demand predefined route automated driving vehicle is eight.

According to this arrangement, as compared to a case where the maximum number of occupants is more than eight, the weight of the on-demand predefined route automated driving vehicle is small. As compared to a case where the maximum number of occupants is more than eight, the total weight of the on-demand predefined route automated driving vehicle with the occupants is small. It is therefore possible to improve the energy efficiency of each on-demand predefined route automated driving vehicle. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

The on-demand predefined route automated driving vehicle fleet controller of the present teaching is therefore able to suppress the processing load on the on-demand predefined route automated driving vehicle fleet controller while further shortening the waiting time of the user who has made the use request.

(19) According to another aspect of the present teaching, the on-demand predefined route automated driving vehicle fleet controller of the present teaching preferably includes the following arrangement, in addition to any one of the arrangements (14) to (18).

The in-advance vehicle dispatch command signal instructs the vehicle which is to be dispatched to the anticipated riding in advance and is selected from the on-demand predefined route automated driving vehicles to run toward the anticipated riding location at a speed of 40 km per hour or less.

According to this arrangement, when the speed of the on-demand predefined route automated driving vehicle running toward the anticipated riding location based on the in-advance vehicle dispatch command signal is controlled to be 40 km per hour or less, the air resistance of the on-demand predefined route automated driving vehicle is small as compared to a case where the vehicle running toward the anticipated riding location based on the in-advance vehicle dispatch command signal is controlled so that the speed is higher than 40 km per hour. It is therefore possible to reduce the energy consumption amount of each on-demand predefined route automated driving vehicle. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

When the speed of the vehicle running toward the anticipated riding location based on the in-advance vehicle dispatch command signal is controlled to be 40 km per hour or less, the time of the running of the on-demand predefined route automated driving vehicle from the current location to the anticipated riding location is long as compared to a case where the vehicle running toward the anticipated riding location based on the in-advance vehicle dispatch command signal is controlled so that the speed of the vehicle is higher than 40 km per hour. Meanwhile, the number of the on-demand predefined route automated driving vehicles running along the annular connected predefined route can be increased. It is therefore possible to dispatch an on-demand predefined route automated driving vehicle whose current location is close to the anticipated riding location, in advance. The waiting time of users is therefore shortened.

The on-demand predefined route automated driving vehicle fleet controller of the present teaching is therefore able to suppress the processing load on the on-demand predefined route automated driving vehicle fleet controller while shortening the waiting time of the user who has made the use request.

(20) According to another aspect of the present teaching, the on-demand predefined route automated driving vehicle fleet controller of the present teaching preferably includes the following arrangement, in addition to any one of the arrangements (14) to (19).

The vehicle dispatch command signal instructs the vehicle which is to be dispatched to the planned riding location and is selected from the on-demand predefined route automated driving vehicles to run toward the planned riding location at a speed of 40 km per hour or less.

According to this arrangement, when the speed of the on-demand predefined route automated driving vehicle running toward the planned riding location based on the vehicle dispatch command signal is controlled to be 40 km per hour or less, the air resistance of the on-demand predefined route automated driving vehicle is small as compared to a case where the vehicle running toward the planned riding location based on the vehicle dispatch command signal is controlled so that the speed is higher than 40 km per hour. It is therefore possible to reduce the energy consumption amount of each on-demand predefined route automated driving vehicle. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

When the speed of the on-demand predefined route automated driving vehicle running toward the planned riding location based on the vehicle dispatch command signal is controlled to be 40 km per hour or less, the time of the running of the on-demand predefined route automated driving vehicle from the current location to the planned riding location is long as compared to a case where the vehicle running toward the planned riding location based on the vehicle dispatch command signal is controlled so that the speed is higher than 40 km per hour. Meanwhile, the number of the on-demand predefined route automated driving vehicles running along the annular connected predefined route can be increased. It is therefore possible to dispatch an on-demand predefined route automated driving vehicle whose current location is close to the planned riding location. The waiting time of users is therefore shortened.

The on-demand predefined route automated driving vehicle fleet controller of the present teaching is therefore able to suppress the processing load on the on-demand predefined route automated driving vehicle fleet controller while shortening the waiting time of the user who has made the use request.

(21) According to another aspect of the present teaching, the on-demand predefined route automated driving vehicle fleet controller of the present teaching preferably includes the following arrangement, in addition to any one of the arrangements (14) to (20).

In the information acquisition process, (A) the route information, (B) the vehicle location information, (C) the occupant existence information, (D) the anticipated riding location information, and (E) energy information related to a remaining energy amount of each of the on-demand predefined route automated driving vehicles on the annular connected predefined route, in the in-advance dispatched vehicle selection process, a vehicle to be dispatched to the anticipated riding location in advance is selected from the on-demand predefined route automated driving vehicles based on the acquired route information, vehicle location information, occupant existence information, anticipated riding location information, and energy information, and in the vehicle dispatch command signal generation process, the in-advance vehicle dispatch command signal is generated based on the acquired route information, vehicle location information, occupant existence information, anticipated riding location information, and energy information.

According to this arrangement, the on-demand predefined route automated driving vehicle fleet controller selects a vehicle to be dispatched to the anticipated riding location in advance from vehicles having not received a vehicle dispatch command signal among the on-demand predefined route automated driving vehicles, based on the remaining energy amount of each of the on-demand predefined route automated driving vehicles. For example, an on-demand predefined route automated driving vehicle which has a remaining energy amount sufficiently larger than the energy amount required to run from the current location to the anticipated riding location is selected as a vehicle to be dispatched to the anticipated riding location in advance by the on-demand predefined route automated driving vehicle fleet controller. In other words, an on-demand predefined route automated driving vehicle having a large remaining energy amount is preferentially dispatched to the anticipated riding location in advance. The frequency of the supply of energy to the on-demand predefined route automated driving vehicles is reduced. The processing load of the on-demand predefined route automated driving vehicle fleet controller is reduced.

The on-demand predefined route automated driving vehicle fleet controller of the present teaching is therefore able to suppress the processing load on the on-demand predefined route automated driving vehicle fleet controller while shortening the waiting time of the user who has made the use request.

(22) According to another aspect of the present teaching, the on-demand predefined route automated driving vehicle fleet controller of the present teaching preferably includes the following arrangement, in addition to the arrangement (21).

The energy information is information related to a remaining energy amount of each vehicle, which is sent from each of the on-demand predefined route automated driving vehicles on the annular connected predefined route.

According to this arrangement, each of the on-demand predefined route automated driving vehicles on the annular connected predefined route sends information related to its remaining energy amount to the on-demand predefined route automated driving vehicle fleet controller. The on-demand predefined route automated driving vehicle fleet controller selects a vehicle to be dispatched to the anticipated riding location in advance from vehicles having not received a vehicle dispatch command signal among the on-demand predefined route automated driving vehicles, based on a more accurate remaining energy amount of each of the on-demand predefined route automated driving vehicles sent to the on-demand predefined route automated driving vehicle fleet controller. For example, an on-demand predefined route automated driving vehicle which has a remaining energy amount sufficiently larger than the energy amount required to run from the current location to the anticipated riding location is further accurately selected as a vehicle to be dispatched to the anticipated riding location in advance by the on-demand predefined route automated driving vehicle fleet controller. In other words, an on-demand predefined route automated driving vehicle having a large remaining energy amount is preferentially dispatched to the anticipated riding location in advance, further accurately. The frequency of the supply of energy to the on-demand predefined route automated driving vehicles is therefore reduced further accurately. The processing load on the on-demand predefined route automated driving vehicle fleet controller is therefore further reduced.

The on-demand predefined route automated driving vehicle fleet controller of the present teaching is therefore able to suppress the processing load on the on-demand predefined route automated driving vehicle fleet controller while shortening the waiting time of the user who has made the use request.

(23) According to another aspect of the present teaching, the on-demand predefined route automated driving vehicle fleet controller of the present teaching preferably includes the following arrangement, in addition to the arrangement (21) or (22).

The anticipated riding location information includes information of an anticipated alighting location which is anticipated to become a planned alighting location where a user alights from a vehicle.

The in-advance vehicle dispatch command signal is generated by the on-demand predefined route automated driving vehicle fleet controller based on the route information, the vehicle location information, the occupant existence information, the anticipated riding location information, and the energy information. The anticipated riding location information includes an anticipated riding location and an anticipated alighting location. The anticipated alighting location is generated based on at least one of the information related to a user, the information related to a destination, or the information related to environment. The on-demand predefined route automated driving vehicle fleet controller therefore dispatches, to the anticipated riding location in advance, an on-demand predefined route automated driving vehicle which is selected based on the current locations, the anticipated riding location, the anticipated alighting location, and the remaining energy amounts of the on-demand predefined route automated driving vehicles. For example, the on-demand predefined route automated driving vehicle fleet controller is able to dispatch, to the anticipated riding location in advance, an on-demand predefined route automated driving vehicle having a remaining energy amount sufficient to run from the current location to the anticipated alighting location via the anticipated riding location. On this account, it is possible to improve the overall energy efficiency of the on-demand predefined route automated driving vehicles. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

The on-demand predefined route automated driving vehicle fleet controller of the present teaching is therefore able to suppress the processing load on the on-demand predefined route automated driving vehicle fleet controller while further shortening the waiting time of the user who has made the use request.

(24) According to another aspect of the present teaching, the on-demand predefined route automated driving vehicle fleet controller of the present teaching preferably includes the following arrangement, in addition to any one of the arrangements (14) to (23).

The annular connected predefined route includes a first annular predefined route, a second annular predefined route, and at least one first connected predefined route, and the first annular predefined route and the second annular predefined route are connected to each other through the at least one first connected predefined route so that a vehicle is able to run across the routes.

According to this arrangement, plural annular predefined routes are included in the annular connected predefined route. The number of on-demand predefined route automated driving vehicles running along the annular connected predefined route can be increased. The waiting time of users is therefore shortened.

When the number of the on-demand predefined route automated driving vehicles runnable on the annular connected predefined route is increased, the distance from the current location of the on-demand predefined route automated driving vehicle to the anticipated riding location may be shortened. It is therefore possible to further reduce the energy consumption amount of each on-demand predefined route automated driving vehicle. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

The on-demand predefined route automated driving vehicle fleet controller of the present teaching is therefore able to suppress the processing load on the on-demand predefined route automated driving vehicle fleet controller while further shortening the waiting time of the user who has made the use request.

(25) According to another aspect of the present teaching, the on-demand predefined route automated driving vehicle fleet controller of the present teaching preferably includes the following arrangement, in addition to any one of the arrangements (14) to (24).

When at least one use request management device which is able to send and receive information to and from an information terminal of the user and the on-demand predefined route automated driving vehicle fleet controller receives the use request of the user from the information terminal, the use request of the user is sent to the on-demand predefined route automated driving vehicle fleet controller and acquired by the on-demand predefined route automated driving vehicle fleet controller, and in the vehicle dispatch command signal generation process, the vehicle dispatch command signal is generated to instruct the vehicle which is to be dispatched to the planned riding location and selected from the on-demand predefined route automated driving vehicles the run toward the planned riding location included in the use request received by the at least one use request management device.

According to this arrangement, the use request from the user which is a request to use the on-demand predefined route automated driving vehicle which runs under the control of the on-demand predefined route automated driving vehicle fleet controller is sent from the information terminal of the user to the on-demand predefined route automated driving vehicle fleet controller, via at least one use request management device. The information terminal may be held by a user or may be provided at a location where an occupant gets on or off from an on-demand predefined route automated driving vehicle. The user sends the use request from the information terminal to the use request management device which is arranged to be able to communicate with the on-demand predefined route automated driving vehicle fleet controller. Plural use request management devices can be provided for one on-demand predefined route automated driving vehicle fleet controller. In other words, the on-demand predefined route automated driving vehicle fleet controller is able to receive a use request of a user from the information terminal held by the user, via plural use request management devices. It is therefore possible to dispatch an on-demand predefined route automated driving vehicle by one on-demand predefined route automated driving vehicle fleet controller based on a use request from a user received by the plural use request management devices. In other words, when one on-demand predefined route automated driving vehicle fleet controller is provided for plural use request management devices, transmission of information between on-demand predefined route automated driving vehicle fleet controllers is unnecessary as compared to a case where an on-demand predefined route automated driving vehicle fleet controller is provided for each of use request management devices. It is therefore possible to further quickly dispatch an on-demand predefined route automated driving vehicle by one on-demand predefined route automated driving vehicle fleet controller based on a use request from a user received by the plural use request management devices. The waiting time of users is therefore shortened. The processing load of the on-demand predefined route automated driving vehicle fleet controller is reduced.

The on-demand predefined route automated driving vehicle fleet controller of the present teaching is therefore able to suppress the processing load on the on-demand predefined route automated driving vehicle fleet controller while shortening the waiting time of the user who has made the use request.

(26) According to another aspect of the present teaching, the on-demand predefined route automated driving vehicle fleet controller of the present teaching preferably includes the following arrangement, in addition to the arrangement (25).

The anticipated riding location information is generated by the at least one use request management device based on at least one of the information related to the user, the information related to the destination, or the information related to the environment, and is sent by the at least one use request management device.

According to this arrangement, the on-demand predefined route automated driving vehicle is dispatched to the anticipated riding location information in advance, based on the anticipated riding location information which is generated based on at least one of the information related to a user, the information related to a destination, or the information related to environment, which are generated by the use request management device. The annular connected predefined route is a predefined route which is in a runnable area and is determined in advance. The annular connected predefined route is therefore limited within the runnable area and is relatively small in size. For this reason, at least one group of: sets information of users in the vicinity of the annular connected predefined route; sets of information related to destinations; and sets of information related to environment is limited to those in the runnable area, and hence such a relatively small number of sets of information can be collected easily. In addition to the above, the use request management device is able to acquire information related to users, information related to destinations, and information related to environment, which reflect the use of vehicles of the users around the annular connected predefined route. It is therefore possible to anticipate a location where a user is likely to ride on a vehicle further easily.

On this account, the on-demand predefined route automated driving vehicles are controlled with better energy efficiency, as compared to a case where a vehicle moves after receiving a vehicle dispatch command signal. This makes it possible to further reduce the energy consumption of the on-demand predefined route automated driving vehicle in a state of having not received a vehicle dispatch command signal. In other words, the total energy consumption of the on-demand predefined route automated driving vehicles is lowered. The frequency of the supply of energy to the on-demand predefined route automated driving vehicles is reduced. The processing load of the on-demand predefined route automated driving vehicle fleet controller is reduced.

In addition to the above, it is possible to more accurately cause the on-demand predefined route automated driving vehicle which has no occupant and has not received a vehicle dispatch command signal to be on standby at or around a location on the annular connected predefined route, where a user is anticipated to ride on the vehicle. The waiting time of users is therefore shortened.

The on-demand predefined route automated driving vehicle fleet controller of the present teaching is therefore able to suppress the processing load on the on-demand predefined route automated driving vehicle fleet controller while further shortening the waiting time of the user who has made the use request.

Definition of Driving Mechanism

In the present teaching, a drive mechanism is a device which applies driving force to a wheel. The drive mechanism encompasses, for example, a device which is able to apply driving force, such as an engine, a motor, and a hybrid system of an engine and a motor. The drive mechanism may include a speed reducer, a speed increaser, or a transmission.

Definition of Brake Mechanism

In the present teaching, a brake mechanism is a device which applies braking force to a wheel. The brake mechanism may be a mechanical brake which converts kinetic energy to thermal energy, such as a disc brake, a drum brake, and an engine brake. The brake mechanism encompasses an electric brake which converts kinetic energy to electric energy, such as an electromagnetic brake and a regenerative brake having a generator with a motor function.

Definition of Traveling Direction Control Mechanism

In the present teaching, a traveling direction control mechanism is a device which controls the traveling direction of a vehicle. The traveling direction control mechanism may be a steering wheel which is operated by an occupant to change the direction of at least one wheel. Alternatively, for example, the traveling direction control mechanism may be a device which controls the traveling direction of a vehicle by differentiating the rotation speed of a left wheel provided at a vehicle left portion from the rotation speed of a right wheel provided at a vehicle right portion.

Definition of Predefined Route which is in Runnable Area and Determined in Advance In the present teaching, a runnable area is an area in which an on-demand predefined route automated driving vehicle is allowed to run. The runnable area is preferably an area in which only an on-demand predefined route automated driving vehicle is allowed to run. In other words, the runnable area is preferably an area in which vehicles other than on-demand predefined route automated driving vehicles are supposed not to run. In other words, the runnable area is preferably an area in which an on-demand predefined route automated driving vehicle and a vehicle which is not an on-demand predefined route automated driving vehicles are supposed not to run in a mixed manner. In the present teaching, a predefined route which is in a runnable area and is determined in advance is a predefined route which is determined in advance and is included in a part of a runnable area in which an on-demand predefined route automated driving vehicle is allowed to run.

Definition of On-Demand Predefined Route Automated Driving Vehicle

In the present teaching, an on-demand predefined route automated driving vehicle is a vehicle which, in response to a use request from a user, automatically runs along a predefined route which is in a runnable area and is determined in advance. The predefined route is a route determined in advance, along which an on-demand predefined route automated driving vehicle runs. The predefined route is a referential running line which is in a runnable lane in which an on-demand predefined route automated driving vehicle is able to run and functions as a reference for the running of the on-demand predefined route automated driving vehicle. A lane mark (e.g., white line) may or may not be provided at each edge of the runnable lane. The referential running line does not physically exist. Automatic running indicates that a vehicle runs without the control of speed and steering by an operator. The operator encompasses an occupant of a vehicle and a person who remotely controls the vehicle. The automated driving encompasses autonomous running. The autonomous running indicates that a vehicle runs without the control of speed and steering by an operator, while avoiding obstacles. The on-demand predefined route automated driving vehicle automatically runs under the control of at least one of a vehicle-mounted controller or an on-demand predefined route automated driving vehicle fleet controller. The on-demand predefined route automated driving vehicle encompasses, for example, an electric small vehicle such as a golf cart.

Definition of On-Demand Predefined Route Automated Driving Vehicle Fleet Controller In the present teaching, the on-demand predefined route automated driving vehicle fleet controller is a device which is arranged to be able to send and receive information to and from plural on-demand predefined route automated driving vehicles, and to control the running of each of the on-demand predefined route automated driving vehicles.

Definition of Dispatch

In the present teaching, when an on-demand predefined route automated driving vehicle fleet controller "dispatches" an on-demand predefined route automated driving vehicle to a planned riding location, it is indicated that the on-demand predefined route automated driving vehicle fleet controller controls the on-demand predefined route automated driving vehicle to run toward a specified location (e.g., the planned riding location).

Definition of Annular Connected Predefined Route

In the present teaching, an annular connected predefined route is a predefined route which includes at least one annular predefined route and at least one connected predefined route which is connected to the at least one annular predefined route so that vehicles are able to run across these routes. The annular predefined route is a predefined route which is determined in advance and is annular in shape. The annular predefined route may not be annular in shape, as long as vehicles are allowed to regularly circulate along the route. The connected predefined route is a predefined route which is determined in advance and is connected to an annular predefined route at a junction on the annular predefined route so that vehicles are able to run across these routes. In the present teaching, when a connected predefined route is connected to an annular predefined route so that vehicles are able to run across these routes, it is indicated that a vehicle is allowed to run from the annular predefined route to the connected predefined route and to run from the connected predefined route to the annular predefined route.

Definition of Route Information

In the present teaching, route information is information related to an annular connected predefined route along which on-demand predefined route automated driving vehicles run. The route information may be, for example, map information related to an annular connected predefined route.

Definition of Vehicle Location Information

In the present teaching, vehicle location information is information related to locations of on-demand predefined route automated driving vehicles on an annular connected predefined route, each of the on-demand predefined route automated driving vehicles being arranged to be able to send and receive information to and from the on-demand predefined route automated driving vehicle fleet controller. The vehicle location information may be information of an absolute location on the annular connected predefined route, or of a relative location on the annular connected predefined route.

Definition of Occupant Existence Information

In the present teaching, occupant existence information is information related to the existence of an occupant on on-demand predefined route automated driving vehicles each of which is arranged to be able to send and receive information to and from the on-demand predefined route automated driving vehicle fleet controller. The occupant existence information may include not only the information related to the existence of an occupant on each of the on-demand predefined route automated driving vehicles but also information of the number of occupants on each of the on-demand predefined route automated driving vehicles.

Definition of Anticipated Riding Location Information

In the present teaching, anticipated riding location information is information related to a location which is anticipated to become a planned riding location on an annular connected predefined route. An anticipated riding location is, for example, a specific location on the annular connected predefined route, which has been set as a planned riding location at least a reference number of times in the past. The anticipated riding location information is, for example, a specific location on the annular connected predefined route, where a predetermined number or more of users are gathered. In other words, the planned riding location is a location which is relatively likely to be set as a planned riding location of a user.

Definition of Maximum Number of Occupants

In the present teaching, the maximum number of occupants indicates the maximum number of adults each having an average height riding on an on-demand predefined route automated driving vehicle. Not only adults but also children or wheelchaired persons are allowed to ride on an on-demand predefined route automated driving vehicle of the present teaching.

Definition of Remaining Energy Amount

In the present teaching, a remaining energy amount is a remaining amount of energy of a rechargeable secondary battery mounted on an on-demand predefined route automated driving vehicle, when such a battery is mounted on the vehicle. To be more specific, the remaining energy amount indicates a remaining capacity of a secondary battery, which is represented by a unit such as Ah and Wh. In the present teaching, the remaining energy amount is a remaining amount of fuel on an on-demand predefined route automated driving vehicle, when a drive mechanism driven by energy of combustion of fuel is mounted on the on-demand predefined route automated driving vehicle. To be more specific, the remaining energy amount indicates a remaining amount of fuel, which is represented by volume or weight. The fuel specifically encompasses, for example, gasoline, light oil, hydrogen, LNG, PPG, and gas fuel. The fuel is not limited to these specific examples, as long as the fuel produces energy required for driving a vehicle. When the drive mechanism of a vehicle is a hybrid drive mechanism of an engine and a motor, the remaining energy amount may be a combination of a remaining capacity of a secondary battery and a remaining amount of fuel.

Definition of Energy Information Related to Remaining Energy Amount

In the present teaching, energy information related to a remaining energy amount is not limited to information which directly indicates the above-described remaining energy amount. For example, the energy information may be information indirectly indicating a remaining energy amount, on condition that the information indicates a function achievable with the remaining energy amount, such as a travelable time or a travelable distance with the remaining energy amount. When a secondary battery is employed, the energy information related to the remaining energy amount may encompass SOC which directly indicates the remaining energy amount. In the case of the secondary battery, the energy information related to the remaining energy amount may encompass a voltage of the secondary battery and a current of the secondary battery, based on which the remaining energy amount of the secondary battery can be estimated. It is noted that the remaining energy amount can be estimated by calculating an open circuit voltage or an consumption amount of energy based on a voltage or a current of the secondary battery.

Definition of Processor

In the present teaching, "processor" encompasses a microcontroller, a CPU (Central Processing Unit), a GPU (Graphics Processing Unit), a microprocessor, a multi processor, an application specific integrated circuit (ASIC), a programmable logic circuit (PLC), a field programmable gate array (FPGA), and other types of circuits capable of executing processes described in this specification. The processor may be an ECU (Electronic Control Unit).

Definition of Information

In the present teaching, information indicates digital signals which can be treated by computers and are combinations of characters and texts.

Definition of Information Terminal

In the present teaching, an information terminal is an information device which is arranged to be able to send and receive information, such as a smartphone, a mobile phone, a tablet, and a data information terminal. The information terminal may be held by a user or may be provided at a location where an occupant gets on or off from an on-demand predefined route automated driving vehicle.

Definition of Storage Unit

In this specification, a storage unit is able to store various types of data. The storage unit may be a single storage device, may be part of a storage area of a single storage device, or may include plural storage devices. The storage unit may include a RAM (Random Access Memory), for example. The RAM temporarily stores data when the processor executes a program. The storage unit may or may not include a ROM (Read Only Memory), for example. The ROM stores a program executed by the processor. The storage unit does not include a buffer (buffer storage) of the processor. The buffer is a device which temporarily stores data.

Definition of Hardware Resource

In this specification, hardware resource indicates devices such as a processor and a storage device. In the present teaching, reduction of hardware resource indicates, for example, reduction of the number of processors or storage devices, reduction of processing capability required for a processor, or reduction of the capacity of a storage device.

Other Definitions of Terms

In the present teaching, acquisition, generation, or control based on a set of information may indicate acquisition, generation, or control based solely on the set of information, or may indicate acquisition, generation, or control based on the set of information and another set of information. This applies to actions other than the acquisition, generation, and control.

In the present teaching, acquisition from A encompasses both direct acquisition from A and acquisition from A via B.

In the present teaching, terms "including", "comprising", "having", and derivatives thereof are used to encompass not only listed items and equivalents thereof but also additional items.

In the present teaching, the terms "mounted", "connected", "coupled", and "supported" are used in broad sense. To be more specific, the terms encompass not only directly mounting, connection, coupling, and supporting but also indirect mounting, connection, coupling, and supporting. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs. Terms defined in typical dictionaries indicate meanings used in related technologies and in the context of the present disclosure. The terms are not interpreted ideally or excessively formally.

In the present teaching and the specification, at least one of plural options encompasses all conceivable combinations of the options. At least one of plural options may be one of the options, some of the options, or all of the options. For example, at least one of A, B, or C indicates only A, only B, only C, A and B, A and C, B and C, or A, B, and C.

In this specification, the term "preferable" is non-exclusive. The term "preferable" means "preferable but not limited to". In this specification, an arrangement which is "preferable" exerts at least the above-described effects of the arrangement (1) above. In this specification, the term "may" is non-exclusive. The term "may" indicate "may but not must". In this specification, an arrangement which is explained by using the term "may" exerts at least the above-described effects of the arrangement (1) above.

In the claims, when the number of a constituent feature is not clearly specified and the constituent feature is expressed in a singular form in English, the number of the constituent feature may be more than one in the present teaching. In the present teaching, the number of the constituent features may be only one.

In the present teaching, the preferred arrangements of the different aspects described above may be variously combined. Before an embodiment of the present teaching is detailed, it is informed that the present teaching is not limited to the configurations and layout of elements described below and/or shown in drawings. The present teaching may be implemented as an embodiment other than the below-described embodiment. The present teaching may be implemented as an embodiment other than the below-described embodiment. Furthermore, the present teaching may be implemented by suitably combining below-described embodiment, specific example, and modifications.

Advantageous Effects

The on-demand predefined route automated driving vehicle of the present teaching is able to shorten the waiting time of a user who has made a use request and to improve the degree of freedom in design by reducing an energy storage amount.

BRIEF DESCRIPTION OF THE DRAWINGS

FIG. 2 shows an arrangement of an on-demand predefined route automated driving vehicle fleet controller of the embodiment.

DETAILED DESCRIPTION (On-Demand Predefined Route Automated Driving Vehicle of Embodiment)

Figure 1:
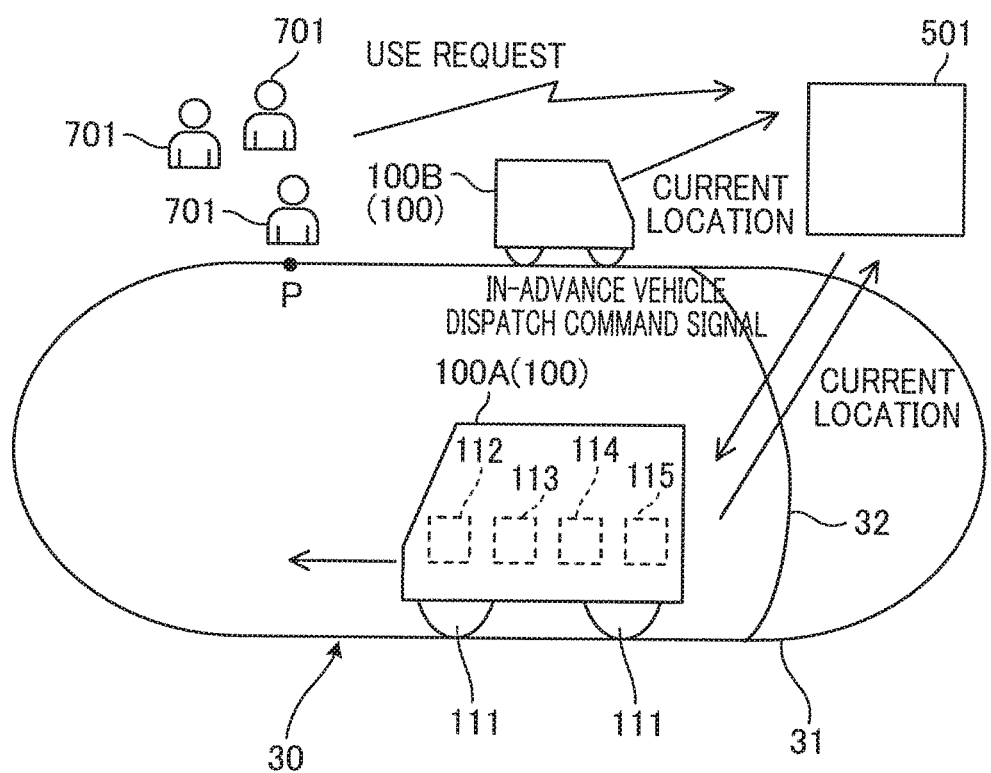
FIG. 1 is a schematic representation showing an example of an arrangement and a state of use of an on-demand predefined route automated driving vehicle of an embodiment.

The following will describe on-demand predefined route automated driving vehicles 100 of an embodiment with reference to FIG. 1.

Each on-demand predefined route automated driving vehicle 100 includes wheels 111, a drive mechanism 112, a brake mechanism 113, a traveling direction control mechanism 114, and a vehicle-mounted controller 115. In the present embodiment, on-demand predefined route automated driving vehicles 100 are an on-demand predefined route automated driving vehicle 100A and an on-demand predefined route automated driving vehicle 100B.

The drive mechanism 112 applies driving force for running the vehicle to at least one wheel 111. The brake mechanism 113 applies braking force for decelerating the vehicle to at least one wheel 111. The traveling direction control mechanism 114 controls the traveling direction of at least one wheel 111 when the vehicle runs.

The vehicle-mounted controller 115 is arranged to be able to send and receive information to and from an on-demand predefined route automated driving vehicle fleet controller 501.

The vehicle-mounted controller 115 controls the drive mechanism 112, the brake mechanism 113, and the traveling direction control mechanism 114 so that the vehicle automatically runs along a predefined route 30 which is in a runnable area and is determined in advance, irrespective of the existence of an occupant in the vehicle. When receiving a vehicle dispatch command signal generated by the on-demand predefined route automated driving vehicle fleet controller 501 having received a use request from a user 701, the vehicle-mounted controller 115 controls the drive mechanism 112, the brake mechanism 113, and the traveling direction control mechanism 114 to run the vehicle toward a planned riding location where the user 701 plans to ride on the vehicle, so that the vehicle is dispatched to the planned riding location.

The vehicle-mounted controller 115 sends information of a current location of the vehicle on the predefined route 30 to the on-demand predefined route automated driving vehicle fleet controller 501. The predefined route 30 is an annular connected predefined route 30 which includes at least one annular predefined route 31 and at least one connected predefined route 32 which is connected to the at least one annular predefined route 31 so that vehicles are able to run across these routes.

The vehicle-mounted controller 115 receives an in-advance vehicle dispatch command signal, when a vehicle on which the vehicle-mounted controller 115 is mounted is selected from vehicles having not received a vehicle dispatch command signal among the on-demand predefined route automated driving vehicles 100, as a vehicle to be dispatched to an anticipated riding location P in advance by the on-demand predefined route automated driving vehicle fleet controller 501. The on-demand predefined route automated driving vehicle fleet controller 501 selects a vehicle to be dispatched to an anticipated riding location in advance from the on-demand predefined route automated driving vehicles 100A and 100B, based on route information, vehicle location information, occupant existence information, and anticipated riding location information. The vehicle dispatch command signal is generated by the on-demand predefined route automated driving vehicle fleet controller 501 based on the route information, the vehicle location information, the occupant existence information, and the anticipated riding location information. The present embodiment presupposes that the on-demand predefined route automated driving vehicle 100A is selected as a vehicle to be dispatched to the anticipated riding location in advance.

The route information is information related to the annular connected predefined route 30. The vehicle location information is information of the current locations of on-demand predefined route automated driving vehicles running along the annular connected predefined route 30. The vehicle location information encompasses information of the current location of each vehicle sent from the on-demand predefined route automated driving vehicles 100A and 100B. The occupant existence information is information related to the existence of an occupant in each of the on-demand predefined route automated driving vehicles 100A and 100B running along the annular connected predefined route 30. The anticipated riding location information is information related to a location which is anticipated to become a planned riding location on the annular connected predefined route 30. The present embodiment assumes that the anticipated riding location which is anticipated to become a planned riding location is a location P where plural users 701 are gathered.

The vehicle-mounted controller 115 controls the drive mechanism 112, the brake mechanism 113, and the traveling direction control mechanism 114 so that the on-demand predefined route automated driving vehicle 100A runs toward the anticipated riding location P based on an in-advance vehicle dispatch command signal.

Because the on-demand predefined route automated driving vehicle 100 of the present embodiment has the above-described arrangements, the following effects are exerted.

Each of the on-demand predefined route automated driving vehicles 100A and 100B runs along the annular connected predefined route 30 which includes at least one annular predefined route 31 and at least one connected predefined route 32 which is connected to the at least one annular predefined route 31 so that vehicles are able to run across these routes. The number of the connected predefined routes 32 connected to an annular predefined route 31 so that vehicles are able to run across these routes can be increased. Based on an in-advance vehicle dispatch command signal, the vehicle-mounted controller 115 controls the drive mechanism 112, the brake mechanism 113, and the traveling direction control mechanism 114 so that the vehicle run toward an anticipated riding location P on the annular connected predefined route 30, which is anticipated to become a planned riding location of a user 701. The in-advance vehicle dispatch command signal is generated by the on-demand predefined route automated driving vehicle fleet controller 501 based on the route information, the vehicle location information, the occupant existence information, and the anticipated riding location information. When the on-demand predefined route automated driving vehicle 100A is dispatched in advance, the vehicles are controlled with better energy efficiency, as compared to a case where the on-demand predefined route automated driving vehicle 100A is not dispatched in advance and is dispatched after receiving a vehicle dispatch command signal. The control of the vehicles with better energy efficiency corresponds to, for example, the following case. For example, the on-demand predefined route automated driving vehicle 100A having received the in-advance vehicle dispatch command signal runs at a speed with a small energy consumption amount or runs along a route with no traffic jam. This makes it possible to reduce the energy consumption of the on-demand predefined route automated driving vehicle 100A having received the in-advance vehicle dispatch command signal. The energy storage amount of each vehicle is therefore reduced and the degree of freedom in designing the vehicles is improved.

In addition to the above, it is possible to cause the on-demand predefined route automated driving vehicle 100A which has not received a vehicle dispatch command signal to be on standby at or around a location on the annular connected predefined route 30, where a user 701 is anticipated to ride on the vehicle. The waiting time of users 701 is therefore shortened.

In this way, the on-demand predefined route automated driving vehicles 100A and 100B of the present embodiment are able to shorten the waiting time of a user 701 who has made a use request and to improve the degree of freedom in design by reducing an energy storage amount.

(On-Demand Predefined Route Automated Driving Vehicle Fleet Controller of Present Embodiment)

The following will describe the on-demand predefined route automated driving vehicle fleet controller 501 of the present embodiment with reference to FIG. 2.

The on-demand predefined route automated driving vehicle fleet controller 501 is arranged to be able to send and receive information to and from the on-demand predefined route automated driving vehicles 100. In the present embodiment, the on-demand predefined route automated driving vehicles 100 are the on-demand predefined route automated driving vehicle 100A, the on-demand predefined route automated driving vehicle 100B, an on-demand predefined route automated driving vehicle 100C, and an on-demand predefined route automated driving vehicle 100D. The on-demand predefined route automated driving vehicles 100A, 100B, 100C, and 100D automatically run along a predefined route 30 which is in a runnable area and is determined in advance, irrespective of the existence of an occupant in the vehicle.

The on-demand predefined route automated driving vehicle fleet controller 501 controls the running of the on-demand predefined route automated driving vehicles 100A, 100B, 100C, and 100D. When receiving a use request from a user, the on-demand predefined route automated driving vehicle fleet controller 501 dispatches at least one of the on-demand predefined route automated driving vehicles 100A, 100B, 100C, or 100D to a location where the user plan to ride on a vehicle.

The on-demand predefined route automated driving vehicle fleet controller 501 executes an information acquisition process S1, an in-advance dispatched vehicle selection process S2, an in-advance vehicle dispatch command signal generation process S3, and a sending process S4.

In the information acquisition process S1, route information, vehicle location information, occupant existence information, and anticipated riding location information are acquired. The route information is information related to a predefined route 30 which is an annular connected predefined route. The annular connected predefined route 30 includes at least one annular predefined route 31 and at least one connected predefined route 32 which is connected to the at least one annular predefined route 31 so that vehicles are able to run across these routes. The vehicle location information is information of the current locations of the on-demand predefined route automated driving vehicles 100A, 100B, 100C, and 100D running along the annular connected predefined route 30. The vehicle location information is sent from the on-demand predefined route automated driving vehicles 100A, 100B, 100C, and 100D on the annular connected predefined route 30 to the on-demand predefined route automated driving vehicle fleet controller 501. The occupant existence information is information related to the existence of an occupant in each of the on-demand predefined route automated driving vehicles 100A, 100B, 100C, and 100D running along the annular connected predefined route 30. The anticipated riding location information is information related to a location which is anticipated to become a planned riding location on the annular connected predefined route 30. The present embodiment assumes that the anticipated riding location which is anticipated to become a planned riding location is a location P where plural users 701 are gathered.

In the in-advance dispatched vehicle selection process S2, based on the acquired information, a vehicle to be dispatched to an anticipated riding location P in advance is selected from vehicles having not received a vehicle dispatch command signal among the on-demand predefined route automated driving vehicles 100A, 100B, 100C, and 100D. The acquired information is the route information, the vehicle location information, the occupant existence information, and the anticipated riding location information. The present embodiment presupposes that the on-demand predefined route automated driving vehicle 100A is selected from the on-demand predefined route automated driving vehicles 100A, 100B, 100C, and 100D, as a vehicle to be dispatched to the anticipated riding location Pin advance.

In the in-advance vehicle dispatch command signal generation process S3, an in-advance vehicle dispatch command signal is generated based on the acquired route information, vehicle location information, occupant existence information, and anticipated riding location information. The in-advance vehicle dispatch command signal is a signal by which the vehicle 100A which is to be dispatched to the anticipated riding location P in advance and is selected from the on-demand predefined route automated driving vehicles 100A, 100B, 100C, and 100D is dispatched to the anticipated riding location P in advance. In other words, the in-advance vehicle dispatch command signal is a signal by which the vehicle 100A which is to be dispatched to the anticipated riding location P in advance and is selected from the on-demand predefined route automated driving vehicles 100A, 100B, 100C, and 100D is instructed to run toward the anticipated riding location P.

In the sending process S4, the generated vehicle dispatch command signal is sent to the vehicle 100A which is selected from the on-demand predefined route automated driving vehicles 100A, 100B, 100C, and 100D and to be dispatched to the anticipated riding location Pin advance.

Because the on-demand predefined route automated driving vehicle fleet controller 501 of the present embodiment has the above-described arrangements, the following effects are exerted.

The on-demand predefined route automated driving vehicle 100 runs along the annular connected predefined route 30 which includes at least one annular predefined route 31 and at least one connected predefined route 32 which is connected to the at least one annular predefined route 31 so that vehicles are able to run across these routes. The number of the connected predefined routes 32 connected to an annular predefined route 31 so that vehicles are able to run across these routes can be increased. The on-demand predefined route automated driving vehicle fleet controller 501 generates an in-advance vehicle dispatch command signal to instruct the on-demand predefined route automated driving vehicle 100A to run toward an anticipated riding location P on the annular connected predefined route 30, which is anticipated to become a planned riding location where a user 701 plans to ride on the vehicle, based on the in-advance vehicle dispatch command signal. The in-advance vehicle dispatch command signal is generated by the on-demand predefined route automated driving vehicle fleet controller 501 based on the route information, the vehicle location information, the occupant existence information, and the anticipated riding location. When the on-demand predefined route automated driving vehicle 100A is dispatched in advance, the vehicles are controlled with better energy efficiency, as compared to a case where the on-demand predefined route automated driving vehicle 100A is not dispatched in advance and is dispatched after receiving a vehicle dispatch command signal. The control of the vehicles with better energy efficiency is, for example, the following case. For example, the on-demand predefined route automated driving vehicle 100A having received the in-advance vehicle dispatch command signal runs at a speed with a small energy consumption amount or runs along a route with no traffic jam. This makes it possible to reduce the energy consumption of the on-demand predefined route automated driving vehicle 100A having received the in-advance vehicle dispatch command signal. In other words, the running of the on-demand predefined route automated driving vehicle 100A is controlled so that the energy consumption is suppressed. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

In addition to the above, it is possible to cause the on-demand predefined route automated driving vehicle 100A which has no occupant and has not received a vehicle dispatch command signal to be on standby at or around a location on the annular connected predefined route 30, where a user 701 is anticipated to ride on the vehicle. The waiting time of users 701 is therefore shortened.

The on-demand predefined route automated driving vehicle fleet controller 501 of the present embodiment is therefore able to suppress the processing load on the on-demand predefined route automated driving vehicle fleet controller 501 while shortening the waiting time of the user 701 who has made the use request.

Specific Example of On-Demand Predefined Route Automated Driving Vehicle and On-Demand Predefined Route Automated Driving Vehicle Fleet Controller of Embodiment The following will describe a specific example of the on-demand predefined route automated driving vehicle and the on-demand predefined route automated driving vehicle fleet controller of the above-described embodiment of the present teaching, with reference to FIG. 3 to FIG. 10. The specific example of the on-demand predefined route automated driving vehicle of the embodiment is a case where the on-demand predefined route automated driving vehicle of the present teaching is applied to a golf cart. It is noted that items identical with those in the embodiment of the present teaching having been described above are not explained again. Basically, the on-demand predefined route automated driving vehicle of the specific example of the embodiment of the present teaching encompasses all features of the on-demand predefined route automated driving vehicle of the above-described embodiment of the present teaching. Furthermore, basically, the on-demand predefined route automated driving vehicle fleet controller of the specific example of the embodiment of the present teaching encompasses all features of the on-demand predefined route automated driving vehicle fleet controller of the above-described embodiment of the present teaching.

Hereinafter, an up-down direction is an up-down direction of a vehicle unless otherwise specified. The up-down direction of the vehicle is a direction orthogonal to the road surface when the on-demand predefined route automated driving vehicle 100 is provided on the horizontal road surface. Hereinafter, a front-rear direction is a front-rear direction of a vehicle unless otherwise specified. The front-rear direction of the vehicle is a direction orthogonal to the up-down direction of the vehicle, and the traveling direction of the vehicle when the vehicle runs forward is a forward direction of the vehicle. Hereinafter, a left-right direction is a left-right direction of a vehicle. The left-right direction of the vehicle is a direction orthogonal to the up-down direction and the front-rear direction. The left-right direction of the vehicle is identical with the vehicle width direction of the on-demand predefined route automated driving vehicle 100. In each figure, arrows F, B, U, D, L, and R indicate forward, rearward, upward, downward, leftward, and rightward, respectively.

<Arrangement of Annular Connected Predefined Route>

Figure 3A:
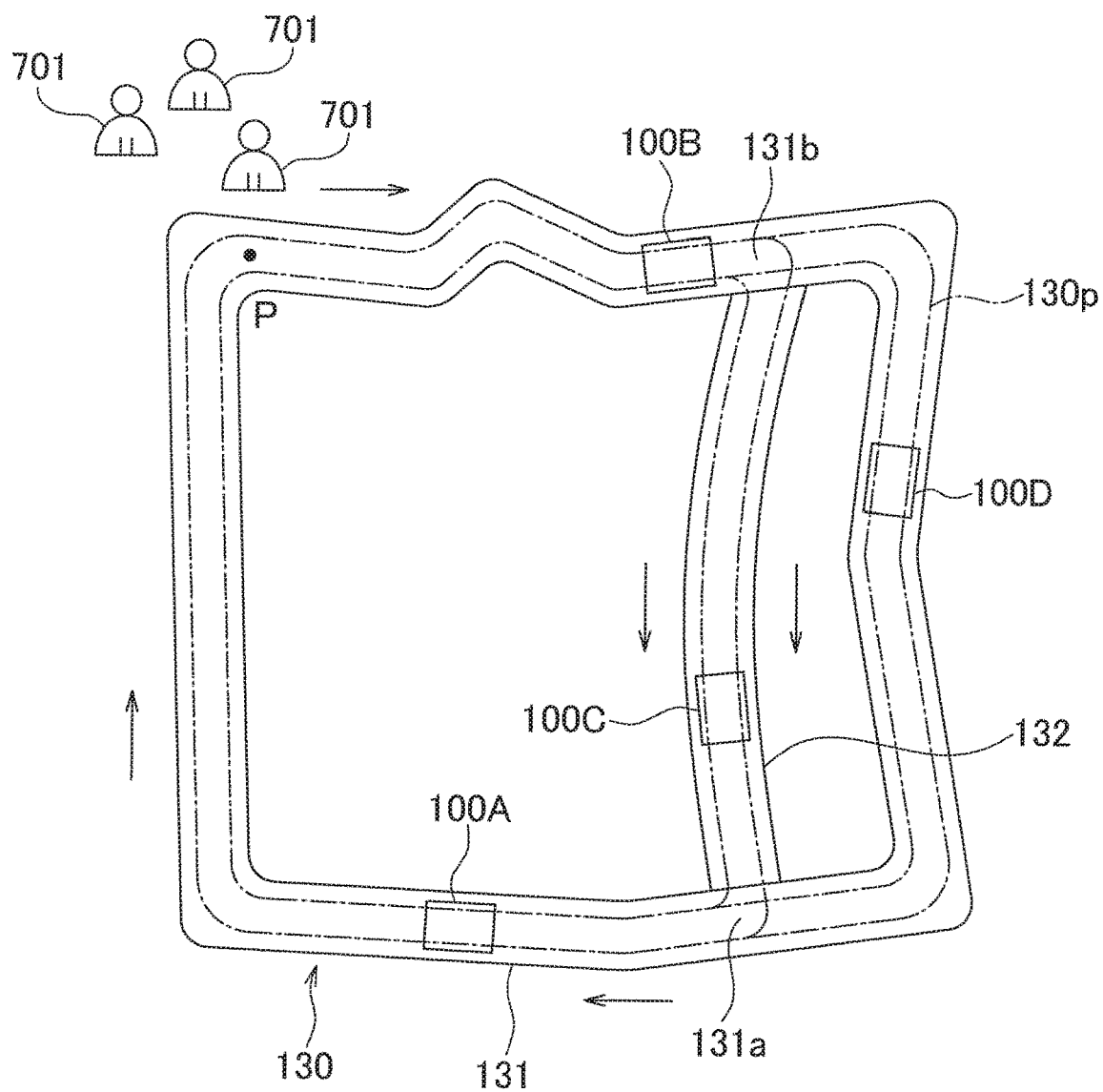
FIG. 3A is a schematic representation of an annular connected predefined route of a specific example.
Figure 3B:
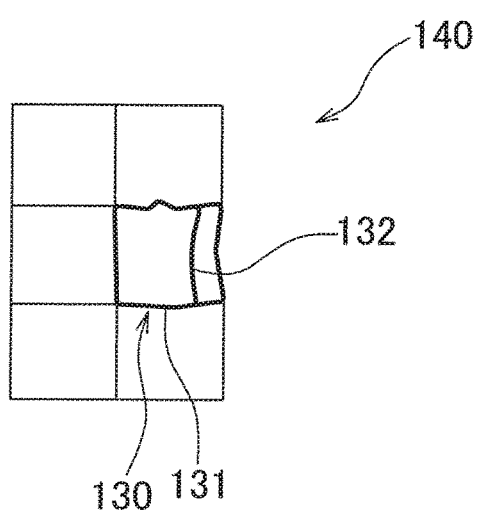
FIG. 3B is a schematic representation of an annular connected predefined route in a runnable area of the specific example.

FIG. 3A and FIG. 3B schematically show an annular connected predefined route 130 along which the on-demand predefined route automated driving vehicle 100 of the specific example runs. As shown in FIG. 3A, the annular connected predefined route 130 includes one annular predefined route 131 and one connected predefined route 132. The connected predefined route 132 is connected to the annular predefined route 131 at a first junction 131a and a second junction 131b which are on the annular predefined route 131. Along the annular connected predefined route 130 of the specific example, four on-demand predefined route automated driving vehicles 100A, 100B, 100C, and 100D are running. The annular connected predefined route 130 is a one-way route for the on-demand predefined route automated driving vehicles. On the annular predefined route 131 and the connected predefined route 132, the direction in which the on-demand predefined route automated driving vehicles run is indicated by arrows in FIG. 3A. The first junction 131a is a merging point where the annular predefined route 131 and the connected predefined route 132 are merged. The second junction 131b is a branching point where the annular predefined route 131 and the connected predefined route 132 are branched.

As shown in FIG. 3B, the annular connected predefined route 130 is a predefined route which is in a runnable area 140 and is determined in advance. In other words, the annular connected predefined route 130 is a predefined route included in a part of the runnable area 140. The runnable area 140 is an area in which only the on-demand predefined route automated driving vehicles 100 are allowed to run. The runnable area 140 is an area in which vehicles other than the on-demand predefined route automated driving vehicles 100 are supposed not to run. In other words, the runnable area 140 is an area in which the on-demand predefined route automated driving vehicles 100 and a vehicle which is not an on-demand predefined route automated driving vehicle 100 are supposed not to run in a mixed manner. The runnable area 140 is, for example, an urban area or a resort area for general users including elderly people, parents and children, and wheelchair users, which is sized about several square kilometers.

As shown in FIG. 3A, users 701 are in the runnable area 140. In this specific example, plural users 701 are gathered at a specific location P in the vicinity of the annular connected predefined route 130. The users 701 may be gathered at a location in the vicinity of the annular predefined route 131 or may be gathered at a location in the vicinity of the connected predefined route 132.

<Structure of On-Demand Predefined Route Automated Driving Vehicle>

Figure 4:
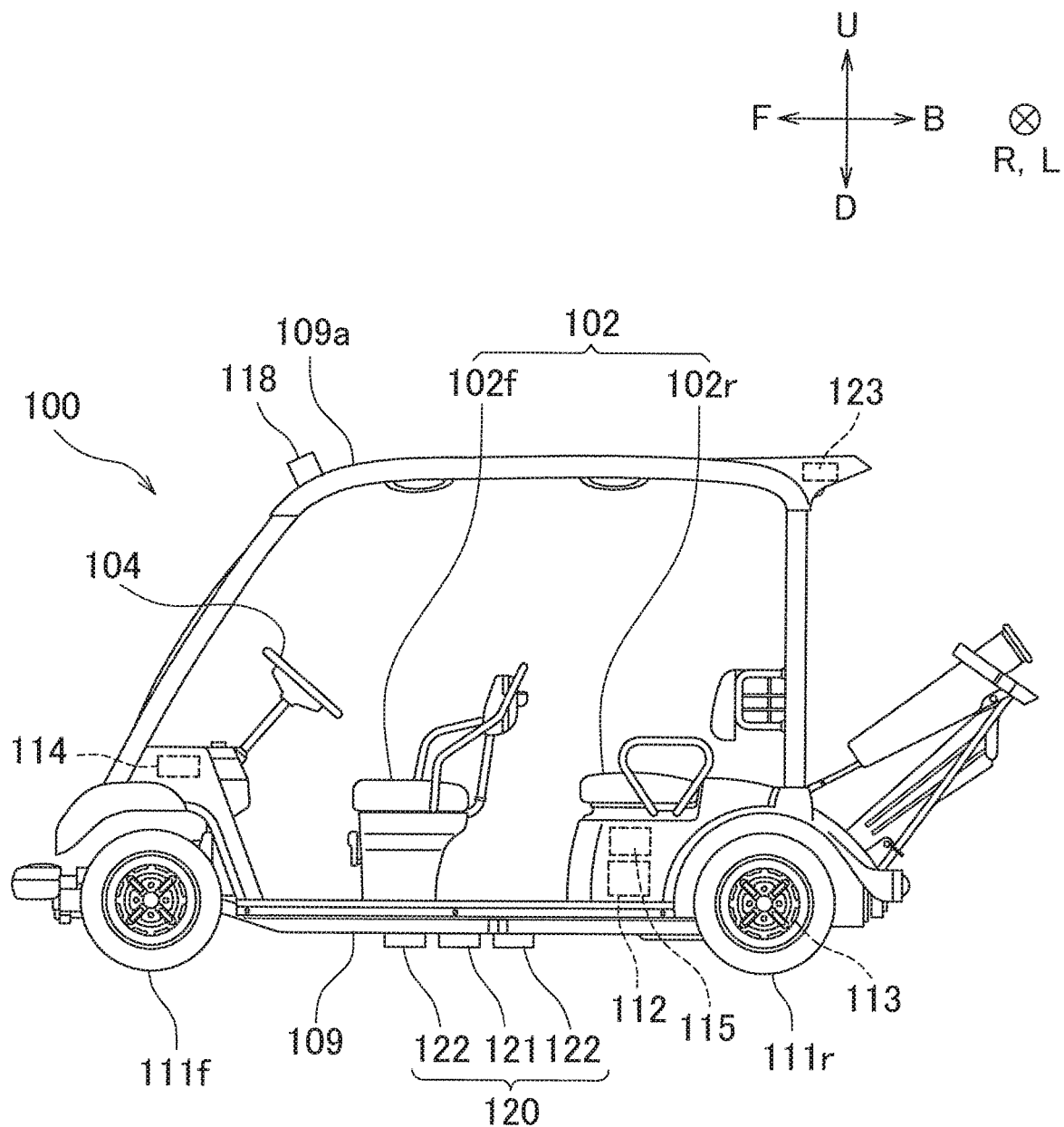
FIG. 4 is a side view of an on-demand predefined route automated driving vehicle of the specific example.
Figure 5:
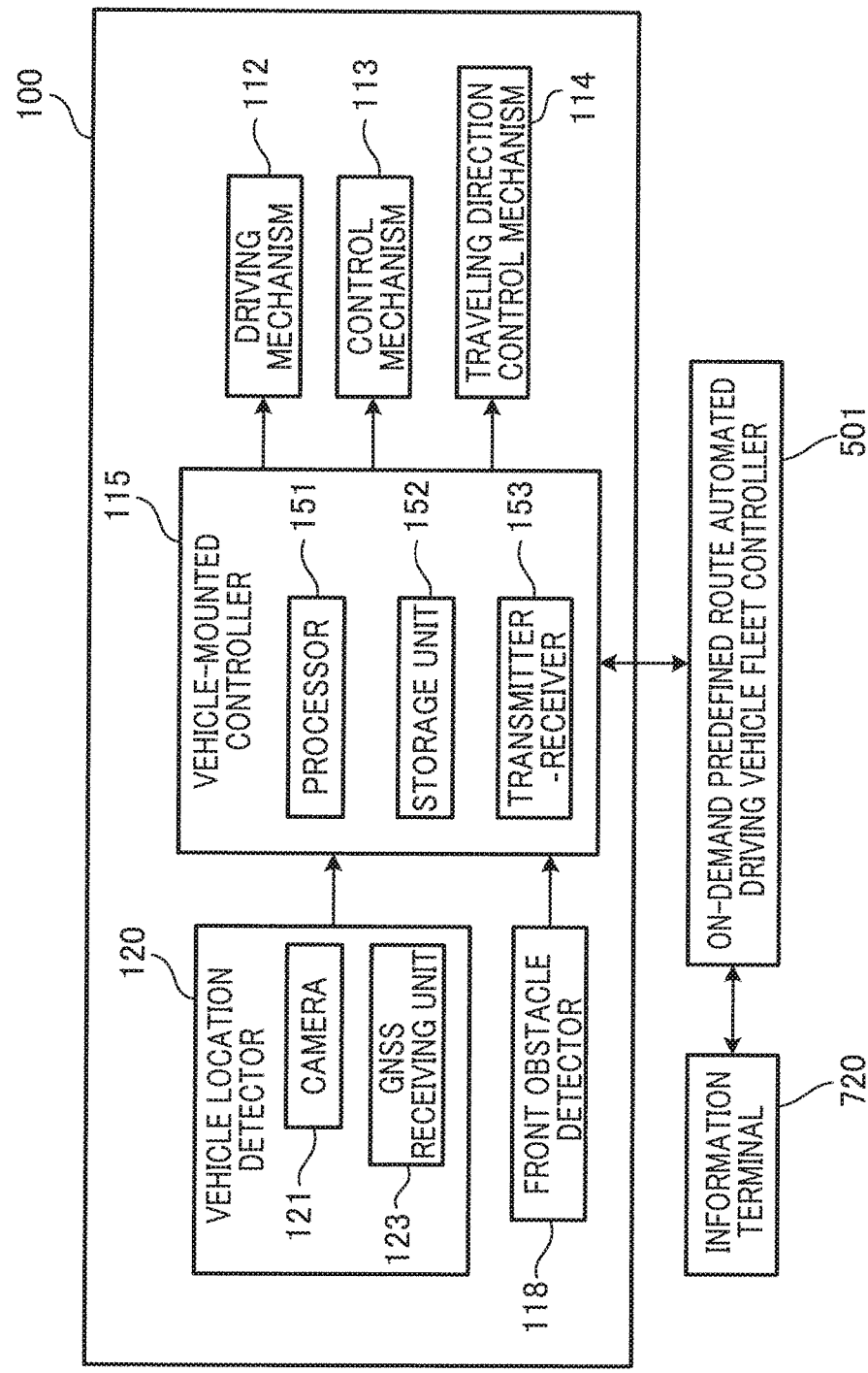
FIG. 5 is a block diagram of an arrangement of a vehicle-mounted controller of the on-demand predefined route automated driving vehicle of the specific example.

FIG. 4 is a side view of the on-demand predefined route automated driving vehicle 100 of the specific example of the embodiment. FIG. 5 is a block diagram of an arrangement of a vehicle-mounted controller 115 of the on-demand predefined route automated driving vehicle 100 of the specific example of the embodiment.

As shown in FIG. 4, the on-demand predefined route automated driving vehicle 100 includes four wheels 111 and a vehicle body 109. The four wheels 111 include two front wheels 111f. The two front wheels 111f are lined up in the left-right direction and provided at a front portion of the vehicle body 109. The four wheels 111 include two rear wheels 111r. The two rear wheels 111r are lined up in the left-right direction and provided at a rear portion of the vehicle body 109. The on-demand predefined route automated driving vehicle 100 runs as the four wheels 111 rotate.

The on-demand predefined route automated driving vehicle 100 includes seats 102. The seats 102 allow occupants to be seated thereon. The seats 102 include a front seat 102f and a rear seat 102r. The front seat 102f and the rear seat 102r are lined up in the front-rear direction and are supported by the vehicle body 109. On each of the front seat 102f and the rear seat 102r, two adults each having an average height can be seated. The front seat 102f is provided forward of the rear seat 102r. The maximum number of occupants on the on-demand predefined route automated driving vehicle 100 is four. The vehicle body 109 has a roof portion 109a at an upper portion. The roof portion 109a is provided directly above the front seat 102f and the rear seat 102r.

The seats 102 are provided with a seating detector (not illustrated) which detects the seating of an occupant. To be more specific, the seating detector includes two seating sensors which are provided at positions where two occupants are seated on the front seat 102f and two seating sensors which are provided at positions where two occupants are seated on the rear seat 102r. Each seating sensor is, for example, a pressure sensor and is provided in the seats 102. The seating sensor detects the seating of an occupant on the seats 102 by detecting a load due to the seating of the occupant. When detecting a load due to the seating of an occupant at least for a predetermined time, the seating sensor determines that an occupant is seated on the seats 102. The seating detector is connected to a transmitter-receiver 153. Based on how many seating sensors among the four seating sensors detect the seating of occupants, the seating detector detects the number of occupants seated on the front seat 102f and the rear seat 102r. The seating detector then outputs the information of the number of occupants seated on the seats 102 to the transmitter-receiver 153, as the occupant existence information. When the number of seated occupants detected by the seating detector is changed, the transmitter-receiver 153 transmits the energy information to the on-demand predefined route automated driving vehicle fleet controller 501.

The on-demand predefined route automated driving vehicle 100 includes a drive mechanism 112, a brake mechanism 113, and a traveling direction control mechanism 114.

The drive mechanism 112 is able to apply driving force to the on-demand predefined route automated driving vehicle 100. The brake mechanism 113 is able to apply braking force to the on-demand predefined route automated driving vehicle 100. The drive mechanism 112 and the brake mechanism 113 control the speed of the on-demand predefined route automated driving vehicle 100 in the traveling direction. The drive mechanism 112 is able to apply driving force to the two rear wheels 111r. The driving force may include not only positive driving force but also negative driving force. When positive driving force is applied to the two rear wheels 111r, the on-demand predefined route automated driving vehicle 100 accelerates. When negative driving force is applied to the two rear wheels 111r, the on-demand predefined route automated driving vehicle 100 decelerates. The drive mechanism 112 include a driving motor M and a battery B, for example. The on-demand predefined route automated driving vehicle 100 is an electric vehicle, and the driving motor M is an electric motor. The driving motor M is connected to the battery B. The battery B supplies electric power for driving the on-demand predefined route automated driving vehicle 100 to the driving motor M. The battery B is connected to the vehicle-mounted controller 115. The vehicle-mounted controller 115 acquires energy information related to the remaining energy amount of the battery B. The driving motor M drives the two rear wheels 111r. The brake mechanism 113 is able to apply braking force to the four wheels 111. When braking force is applied to the four wheel 111, the on-demand predefined route automated driving vehicle 100 decelerates. The brake mechanism 113 is constituted by four disc brake devices, for example. The four disc brake devices are provided for the four wheels 111, respectively. The four disc brake devices brake the four wheels 111.

The on-demand predefined route automated driving vehicle 100 includes an accelerator pedal and a brake pedal which are not illustrated. The on-demand predefined route automated driving vehicle 100 of the present embodiment normally runs in an automatic driving mode. In the automatic driving mode, the vehicle-mounted controller 115 controls the speed of the on-demand predefined route automated driving vehicle 100 by controlling the drive mechanism 112 and the brake mechanism 113 without operations of the accelerator pedal and the brake pedal. The on-demand predefined route automated driving vehicle 100 can be switched to a manual driving mode and run. In the manual driving mode, the drive mechanism 112 and the brake mechanism 113 control the speed of the on-demand predefined route automated driving vehicle 100 as an occupant operates the accelerator pedal and the brake pedal. The accelerator pedal is operated by an occupant to run the on-demand predefined route automated driving vehicle 100. The accelerator pedal is connected to the drive mechanism 112. Alternatively, a sensor for detecting the degree of movement of the accelerator pedal is provided and the vehicle-mounted controller 115 controls the drive mechanism 112 based on a signal from the sensor. The brake pedal is operated by an occupant to decelerate the on-demand predefined route automated driving vehicle 100. The brake pedal is connected to the brake mechanism 113. Alternatively, a sensor for detecting the degree of movement of the brake pedal is provided and the vehicle-mounted controller 115 controls the brake mechanism 113 based on a signal from the sensor.

The traveling direction control mechanism 114 is able to steer the two front wheels 111f. As the two front wheels 111f are steered, the traveling direction of the on-demand predefined route automated driving vehicle 100 is controlled.

The on-demand predefined route automated driving vehicle 100 includes a steering wheel 104. The steering wheel 104 is connected to the traveling direction control mechanism 114. The steering wheel 104 is detachable. The steering wheel 104 is provided in front of an occupant seated on the front seat 102f. The on-demand predefined route automated driving vehicle 100 of the present embodiment typically runs in the automatic driving mode. In the automatic driving mode, the traveling direction control mechanism 114 controls the traveling direction of the on-demand predefined route automated driving vehicle 100 in such a way that the vehicle-mounted controller 115 controls the traveling direction control mechanism 114 without an operation of the steering wheel 104. The on-demand predefined route automated driving vehicle 100 can be switched to a manual driving mode and run. In the manual driving mode, the traveling direction control mechanism 114 controls the traveling direction of the on-demand predefined route automated driving vehicle 100 in such a way that an occupant operates the steering wheel 104. The steering wheel 104 is operated by an occupant to change the traveling direction of the on-demand predefined route automated driving vehicle 100. The two front wheels 111f are steered as the steering wheel 104 is rotated. As the two front wheels 111f are steered, the traveling direction of the on-demand predefined route automated driving vehicle 100 is controlled.

The on-demand predefined route automated driving vehicle 100 includes an on-demand predefined route automated driving vehicle location detector 120. The on-demand predefined route automated driving vehicle location detector 120 includes a camera 121, lights 122, and a global navigation satellite system (GNSS) receiving unit 123. The camera 121 and the lights 122 are provided on the bottom surface of the vehicle body 109 to face downward. The camera 121 photographs the road surface of the annular connected predefined route 130 on which the on-demand predefined route automated driving vehicle 100 runs. The camera 121 is, for example, a monocular camera. The monocular camera may be an area camera or a line scan camera. Two lights 122 are provided in the vicinity of the camera 121. The number of the lights 122 may be one. The lights 122 apply light onto the road surface of the annular connected predefined route 30. The camera 121 photographs at least part of an area of the road surface illuminated by the lights 122. The camera 121 may include a polarizing filter in order to suppress an influence of reflection of light from the lights 122. The on-demand predefined route automated driving vehicle location detector 120 outputs an image of the road surface photographed by the camera 121 to the vehicle-mounted controller 115. The GNSS receiving unit 123 generates information of a current location by using electrical waves from a satellite. The information of the current location of the on-demand predefined route automated driving vehicle 100 generated by using the GNSS is generated based on electric waves from a satellite and a signal from a sensor which detects the actions of the on-demand predefined route automated driving vehicle 100. The information of the current location generated by using the GNSS is information of an absolute location. The sensor detecting actions of the on-demand predefined route automated driving vehicle 100 may be a sensor provided in the GNSS receiving unit 123 or another sensor of the on-demand predefined route automated driving vehicle 100. The information of the current location of the on-demand predefined route automated driving vehicle 100 generated by using the GNSS may be generated based solely on electric waves from a satellite. The on-demand predefined route automated driving vehicle location detector 120 outputs the current location of the on-demand predefined route automated driving vehicle generated by the GNSS receiving unit 123 to the vehicle-mounted controller 115.

The on-demand predefined route automated driving vehicle 100 includes a front obstacle detector 118. The front obstacle detector 118 is configured to detect an obstacle which exists ahead of the on-demand predefined route automated driving vehicle 100. The front obstacle detector 118 is, for example, a sensor such as LIDAR (Laser Imaging Detection and Ranging). When detecting an obstacle in front of the on-demand predefined route automated driving vehicle 100, the front obstacle detector 118 outputs a front obstacle detection signal to the vehicle-mounted controller 115.

As shown in FIG. 5, the vehicle-mounted controller 115 includes a processor 151, a storage unit 152, and a transmitter-receiver 153. The transmitter-receiver 153 is arranged to be able to send and receive information to and from the on-demand predefined route automated driving vehicle fleet controller 501. The transmitter-receiver 153 is, for example, an antenna such as a dipole antenna. The vehicle-mounted controller 115 may be physically a single device or a combination of plural devices. When the vehicle-mounted controller 115 is physically a combination of plural devices, each device includes a calculation unit and a storage unit.

The transmitter-receiver 153 receives an in-advance vehicle dispatch command signal, a vehicle dispatch command signal, and an arbitration command signal from the on-demand predefined route automated driving vehicle fleet controller 501. The in-advance vehicle dispatch command signal, the vehicle dispatch command signal, and the arbitration command signal are generated by the on-demand predefined route automated driving vehicle fleet controller 501.

The in-advance vehicle dispatch command signal is generated by the on-demand predefined route automated driving vehicle fleet controller 501. The in-advance vehicle dispatch command signal is received by a vehicle selected from the on-demand predefined route automated driving vehicles 100A to 100D as a vehicle to be dispatched to an anticipated riding location in advance by the on-demand predefined route automated driving vehicle fleet controller 501. The vehicle to be dispatched to the anticipated riding location in advance is selected by the on-demand predefined route automated driving vehicle fleet controller 501 from vehicles which have no occupant and have not received the vehicle dispatch command signal. The in-advance vehicle dispatch command signal instructs the vehicle to run toward the anticipated riding location on the predefined route. The on-demand predefined route automated driving vehicle fleet controller 501 selects a vehicle to be dispatched to an anticipated riding location information in advance from the on-demand predefined route automated driving vehicles 100A to 100D, based on route information, vehicle location information, occupant existence information, anticipated riding location information, and energy information. The in-advance vehicle dispatch command signal is generated by the on-demand predefined route automated driving vehicle fleet controller 501 based on the route information, the vehicle location information, the occupant existence information, the anticipated riding location information, and the energy information. The energy information is information related to a remaining energy amount of each of the on-demand predefined route automated driving vehicles 100A to 100D on the annular connected predefined route 130. The anticipated riding location information includes information of an anticipated riding location and information of an anticipated alighting location.

The vehicle dispatch command signal is generated by the on-demand predefined route automated driving vehicle fleet controller 501 which has acquired a use request from a user 701. The use request from the user 701 is sent from the information terminal 720 held by the user 701 to the on-demand predefined route automated driving vehicle fleet controller 501. In the specific example, each user 701 has an information terminal 720. The information terminal 720 is arranged to be able to send and receive information to and from the on-demand predefined route automated driving vehicle fleet controller 501.

The vehicle dispatch command signal is received by a vehicle selected from the on-demand predefined route automated driving vehicles 100A to 100D as a vehicle to be dispatched to a planned riding location by the on-demand predefined route automated driving vehicle fleet controller 501. The vehicle dispatch command signal instructs the vehicle to run toward a planned riding location on the predefined route. The on-demand predefined route automated driving vehicle fleet controller 501 selects a vehicle to be dispatched to a planned riding location from the on-demand predefined route automated driving vehicles 100A to 100D, based on route information, vehicle location information, occupant existence information, use request information, and energy information. The use request information is acquired by the on-demand predefined route automated driving vehicle fleet controller 501. The use request information is information which is related to a use request from a user 701 and encompasses information of a planned riding location. The vehicle dispatch command signal is generated by the on-demand predefined route automated driving vehicle fleet controller 501 based on the route information, the vehicle location information, the occupant existence information, the use request information, and the energy information. The energy information is information related to a remaining energy amount of each of the on-demand predefined route automated driving vehicles 100A to 100D on the annular connected predefined route 130. The use request information includes information of a planned riding location and information of a planned alighting location.

The arbitration command signal is generated by the on-demand predefined route automated driving vehicle fleet controller 501 based on the route information, the vehicle location information, the occupant existence information, the use request information, and the energy information. The arbitration command signal is a signal instructing to wait for a vehicle passing through the junction 131a where the annular predefined route 131 and the connected predefined route 132 are connected. The arbitration command signal is generated when the on-demand predefined route automated driving vehicle fleet controller 501 determines, based on the route information and the vehicle location information, that there is an on-demand predefined route automated driving vehicle 100 which runs along the connected predefined route 132 toward the first junction 131a and there is another on-demand predefined route automated driving vehicle 100 which runs along the annular predefined route 131 toward the first junction 131a. The arbitration command signal is used for arbitrating between these two on-demand predefined route automated driving vehicles 100 when passing through the junction 131a. The arbitration command signal is sent to a first on-demand predefined route automated driving vehicle 100 which is selected by the on-demand predefined route automated driving vehicle fleet controller 501 as a vehicle which is controlled for the arbitration between the two on-demand predefined route automated driving vehicles 100, based on the route information, the vehicle location information, the occupant existence information, the use request information, and the energy information. In this case, the arbitration command signal is not sent to a second on-demand predefined route automated driving vehicle 100 among the two on-demand predefined route automated driving vehicles 100. In the example shown in FIG. 3A, the first on-demand predefined route automated driving vehicle is the on-demand predefined route automated driving vehicle 100C. The second on-demand predefined route automated driving vehicle is the on-demand predefined route automated driving vehicle 100D. The arbitration command signal instructs that the first on-demand predefined route automated driving vehicle 100C passes through the first junction 131a after the second on-demand predefined route automated driving vehicle 100D passes therethrough. To be more specific, for example, the arbitration command signal instructs the on-demand predefined route automated driving vehicle 100C to decelerate or to stop before reaching the first junction 131a of the connected predefined route 132. The arbitration command signal is sent to the first on-demand predefined route automated driving vehicle 100C from the on-demand predefined route automated driving vehicle fleet controller 501 when the drive mechanism 112 and the brake mechanism 113 of each of the first on-demand predefined route automated driving vehicle 100C and the second on-demand predefined route automated driving vehicle 100D are not controlled regarding the existence of an obstacle in a vehicle forward direction of each vehicle. In other words, the arbitration command signal is sent from the on-demand predefined route automated driving vehicle fleet controller 501 to the first on-demand predefined route automated driving vehicle 100C which is in a state in which the vehicle-mounted controller 115 has not acquired a front obstacle detection signal from the front obstacle detector 118.

When acquiring a front obstacle detection signal from the front obstacle detector 118, the transmitter-receiver 153 sends the front obstacle detection signal to the on-demand predefined route automated driving vehicle fleet controller 501. When acquiring a front obstacle detection signal, the transmitter-receiver 153 sends the front obstacle detection signal to the on-demand predefined route automated driving vehicle fleet controller 501.

The transmitter-receiver 153 transmits the energy information related to the remaining energy amount of the battery B to the on-demand predefined route automated driving vehicle fleet controller 501. The transmitter-receiver 153 sends the energy information to the on-demand predefined route automated driving vehicle fleet controller 501 at predetermined intervals. In this specification, the predetermined intervals may be predetermined time intervals or predetermined running distance intervals. The predetermined intervals may be set at will.

The transmitter-receiver 153 sends, to the on-demand predefined route automated driving vehicle fleet controller 501, information of the number of occupants seated on the seats 102 as the occupant existence information regarding the existence of an occupant. The transmitter-receiver 153 sends the occupant existence information to the on-demand predefined route automated driving vehicle fleet controller 501 at predetermined intervals.

To the vehicle-mounted controller 115, an image of the road surface photographed by the camera 121 and the current location of the on-demand predefined route automated driving vehicle generated by the GNSS receiving unit 123 are input from the on-demand predefined route automated driving vehicle location detector 120.

The storage unit 152 of the vehicle-mounted controller 115 stores a pre-acquired image which is an image of the road surface of the annular connected predefined route 130 acquired in advance and the absolute location on the annular connected predefined route 130 where the pre-acquired image was photographed, in association with each other. The pre-acquired image is an image of the road surface of the annular connected predefined route 130, which was photographed in a range 130P indicated by one-dot chain lines in FIG. 3A. With reference to the current location of the on-demand predefined route automated driving vehicle generated by the GNSS receiving unit 123, the vehicle-mounted controller 115 compares the pre-acquired image stored in the storage unit 152 with the image of the road surface photographed by the camera 121. In other words, the vehicle-mounted controller 115 compares the pre-acquired image taken in the vicinity of the current location of the on-demand predefined route automated driving vehicle generated by the GNSS receiving unit 123 with the image of the road surface photographed by the camera 121. Based on the absolute location associated with the pre-acquired image corresponding to the image of the road surface photographed by the camera 121, the vehicle-mounted controller 115 acquires an accurate current location of the on-demand predefined route automated driving vehicle 100. The pre-acquired image corresponding to the image of the road surface photographed by the camera 121 encompasses not only a completely-corresponding pre-acquired image but also a partially-corresponding pre-acquired image. The transmitter-receiver 153 sends the acquired current location of the on-demand predefined route automated driving vehicle 100 to the on-demand predefined route automated driving vehicle fleet controller 501, as current location information. The transmitter-receiver 153 sends the current location information to the on-demand predefined route automated driving vehicle fleet controller 501 at predetermined intervals.

The storage unit 152 of the vehicle-mounted controller 115 stores a location on the annular connected predefined route 130 and a traveling direction of the on-demand predefined route automated driving vehicle 100 in association with each other. The location on the annular connected predefined route 130 and the traveling direction of the on-demand predefined route automated driving vehicle 100 are stored in association with each other so that the on-demand predefined route automated driving vehicle 100 is able to trace the annular connected predefined route 130 which is in the runnable area and is determined in advance. For example, an absolute location on the annular connected predefined route 130 and a steering angle for changing the traveling direction of the on-demand predefined route automated driving vehicle 100 at the absolute location are stored in association with each other. The vehicle-mounted controller 115 sets the traveling direction of the on-demand predefined route automated driving vehicle 100 corresponding to the current location of the on-demand predefined route automated driving vehicle 100. The vehicle-mounted controller 115 controls the traveling direction control mechanism 114 based on the traveling direction of the on-demand predefined route automated driving vehicle 100 having been set. In other words, the vehicle-mounted controller 115 controls the traveling direction control mechanism 114 so that the traveling direction of the on-demand predefined route automated driving vehicle 100 becomes identical with the traveling direction having been set. The vehicle-mounted controller 115 controls the traveling direction control mechanism 114 so that the vehicle automatically runs along the predefined route 130 which is in the runnable area and is determined in advance, irrespective of the existence of an occupant in the vehicle.

Based on passing route information, the vehicle-mounted controller 115 sets the traveling direction at the junction 131b between the annular predefined route 131 and the connected predefined route 132 of the annular connected predefined route 130. The passing route information is included in the vehicle dispatch command signal supplied from the on-demand predefined route automated driving vehicle fleet controller 501. When the junction 131b which is a branching point exists on a planned running route of the on-demand predefined route automated driving vehicle 100 based on the vehicle dispatch command signal, the vehicle dispatch command signal includes the passing route information. The passing route information includes information indicating that the vehicle runs along the annular predefined route 131 or the connected predefined route 132 after passing through the junction 131b which is a branching point. Based on the traveling direction set based on the passing route information, the vehicle-mounted controller 115 controls the traveling direction control mechanism 114 when the vehicle passes thorough the junction 131b.

The storage unit 152 of the vehicle-mounted controller 115 stores a running state of the on-demand predefined route automated driving vehicle 100 and a speed of the on-demand predefined route automated driving vehicle 100 in association with each other. The vehicle-mounted controller 115 sets the speed of the on-demand predefined route automated driving vehicle 100 corresponding to the running state of the on-demand predefined route automated driving vehicle 100. To be more specific, the running state of the on-demand predefined route automated driving vehicle 100 includes an in-advance vehicle dispatch state, a vehicle dispatch state, a standby state, a running-to-destination state, and an arbitration state. The in-advance vehicle dispatch state is a state in which the on-demand predefined route automated driving vehicle 100 is running toward an anticipated riding location based on an in-advance vehicle dispatch command signal supplied from the on-demand predefined route automated driving vehicle fleet controller 501. In the in-advance vehicle dispatch state, no occupant is in the on-demand predefined route automated driving vehicle 100. The vehicle dispatch state is a state in which the on-demand predefined route automated driving vehicle 100 is running toward a planned riding location based on a vehicle dispatch command signal supplied from the on-demand predefined route automated driving vehicle fleet controller 501. In the vehicle dispatch state, no occupant is in the on-demand predefined route automated driving vehicle 100. The standby state is a state in which no occupant is in the on-demand predefined route automated driving vehicle 100 and the on-demand predefined route automated driving vehicle 100 is able to receive an in-advance vehicle dispatch command signal or a vehicle dispatch command signal from the on-demand predefined route automated driving vehicle fleet controller 501. The running-to-destination state is a state in which there is an occupant in the on-demand predefined route automated driving vehicle 100 and the on-demand predefined route automated driving vehicle 100 is running from a planned riding location toward a planned alighting location based on a vehicle dispatch command signal supplied from the on-demand predefined route automated driving vehicle fleet controller 501. The arbitration state is a state in which the on-demand predefined route automated driving vehicle 100 is running after receiving an arbitration command signal from the on-demand predefined route automated driving vehicle fleet controller 501. Assume that the speed of the on-demand predefined route automated driving vehicle 100 in the standby state is speed V1. Assume that the speed of the on-demand predefined route automated driving vehicle 100 in the vehicle dispatch state is speed V2. Assume that the speed of the on-demand predefined route automated driving vehicle 100 in the running-to-destination state is speed V3. Assume that the speed of the on-demand predefined route automated driving vehicle 100 in the arbitration state is speed V4. Assume that the speed of the on-demand predefined route automated driving vehicle 100 in the in-advance vehicle dispatch state is speed V5. The speed V1 is preferably lower than the speed V2 and the speed V3. The speed V1 may be 0. The speed V4 is lower than the speed V2, the speed V3, and the speed V5. The speed V4 may be 0. The speed V5 may be set at a speed with which the energy consumption amount is small. The speed V2, the speed V3, and the speed V5 may be identical with one another or different from one another. Each of the speed V1 to the speed V5 is arranged to be equal to or lower than 40 km per hour. For example, each of the speed V2, the speed V3, and the speed V5 is 20 km per hour. The vehicle-mounted controller 115 controls the drive mechanism 112 and the brake mechanism 113 based on the speed of the on-demand predefined route automated driving vehicle 100 having been set. In other words, the vehicle-mounted controller 115 controls the drive mechanism 112 and the brake mechanism 113 so that the speed of the on-demand predefined route automated driving vehicle 100 becomes identical with the speed having been set.

To be more specific, when the on-demand predefined route automated driving vehicle 100 which is running at the speed V1 and in the standby state receives an in-advance vehicle dispatch command signal, the vehicle-mounted controller 115 controls the drive mechanism 112 and the brake mechanism 113 to increase the speed of the on-demand predefined route automated driving vehicle 100 to the speed V5. In a case where the speed V1 is zero, when the on-demand predefined route automated driving vehicle 100 in the standby state receives an in-advance vehicle dispatch command signal, the vehicle-mounted controller 115 controls the drive mechanism 112 and the brake mechanism 113 to cause the on-demand predefined route automated driving vehicle 100 to start to run at the speed V5. When the on-demand predefined route automated driving vehicle 100 which is running at the speed V5 and in the in-advance vehicle dispatch state receives an in-advance vehicle dispatch command signal, the vehicle-mounted controller 115 controls the drive mechanism 112 and the brake mechanism 113 to cause the on-demand predefined route automated driving vehicle 100 to run at the speed V2. When the on-demand predefined route automated driving vehicle 100 which is running at the speed V1 and in the standby state receives a vehicle dispatch command signal, the vehicle-mounted controller 115 controls the drive mechanism 112 and the brake mechanism 113 to increase the speed of the on-demand predefined route automated driving vehicle 100 to the speed V2. In a case where the speed V1 is zero, when the on-demand predefined route automated driving vehicle 100 in the standby state receives a vehicle dispatch command signal, the vehicle-mounted controller 115 controls the drive mechanism 112 and the brake mechanism 113 to cause the on-demand predefined route automated driving vehicle 100 to start to run at the speed V2. When the on-demand predefined route automated driving vehicle 100 which is running at the speed V2 and in the vehicle dispatch state reaches a planned riding location of a user, which is included in the vehicle dispatch command signal, the vehicle-mounted controller 115 controls the drive mechanism 112 and the brake mechanism 113 to stop the vehicle. When the user rides on the vehicle at the planned riding location and the vehicle becomes in the running-to-destination state, the vehicle-mounted controller 115 controls the drive mechanism 112 and the brake mechanism 113 to cause the on-demand predefined route automated driving vehicle 100 to start to run at the speed V3. When the on-demand predefined route automated driving vehicle 100 in the running-to-destination state reaches a planned alighting location of the user, which is included in the vehicle dispatch command signal, the vehicle-mounted controller 115 controls the drive mechanism 112 and the brake mechanism 113 to stop the on-demand predefined route automated driving vehicle 100. When the user alights from the vehicle at the planned alighting location and the vehicle becomes in the standby state, the vehicle-mounted controller 115 controls the drive mechanism 112 and the brake mechanism 113 to cause the on-demand predefined route automated driving vehicle 100 to start to run at the speed V1. At this stage, if the on-demand predefined route automated driving vehicle 100 is on the annular predefined route 131, the vehicle-mounted controller 115 may control the drive mechanism 112 and the brake mechanism 113 to cause the on-demand predefined route automated driving vehicle 100 to run at the speed V1 toward the connected predefined route 132. In a case where the speed V1 is zero, when the user alights from the vehicle at the planned alighting location and the vehicle becomes in the standby state, the vehicle-mounted controller 115 controls the drive mechanism 112 and the brake mechanism 113 to stop the on-demand predefined route automated driving vehicle 100. At this stage, if the on-demand predefined route automated driving vehicle 100 is on the annular predefined route 131, the vehicle-mounted controller 115 may control the drive mechanism 112 and the brake mechanism 113 to move the on-demand predefined route automated driving vehicle 100 to the connected predefined route 132 and then stop the vehicle.

When a front obstacle detection signal is supplied from the front obstacle detector 118, the vehicle-mounted controller 115 controls the drive mechanism 112 and the brake mechanism 113 to stop the on-demand predefined route automated driving vehicle 100.

<Structure of On-Demand Predefined Route Automated Driving Vehicle Fleet Controller>

Figure 6:
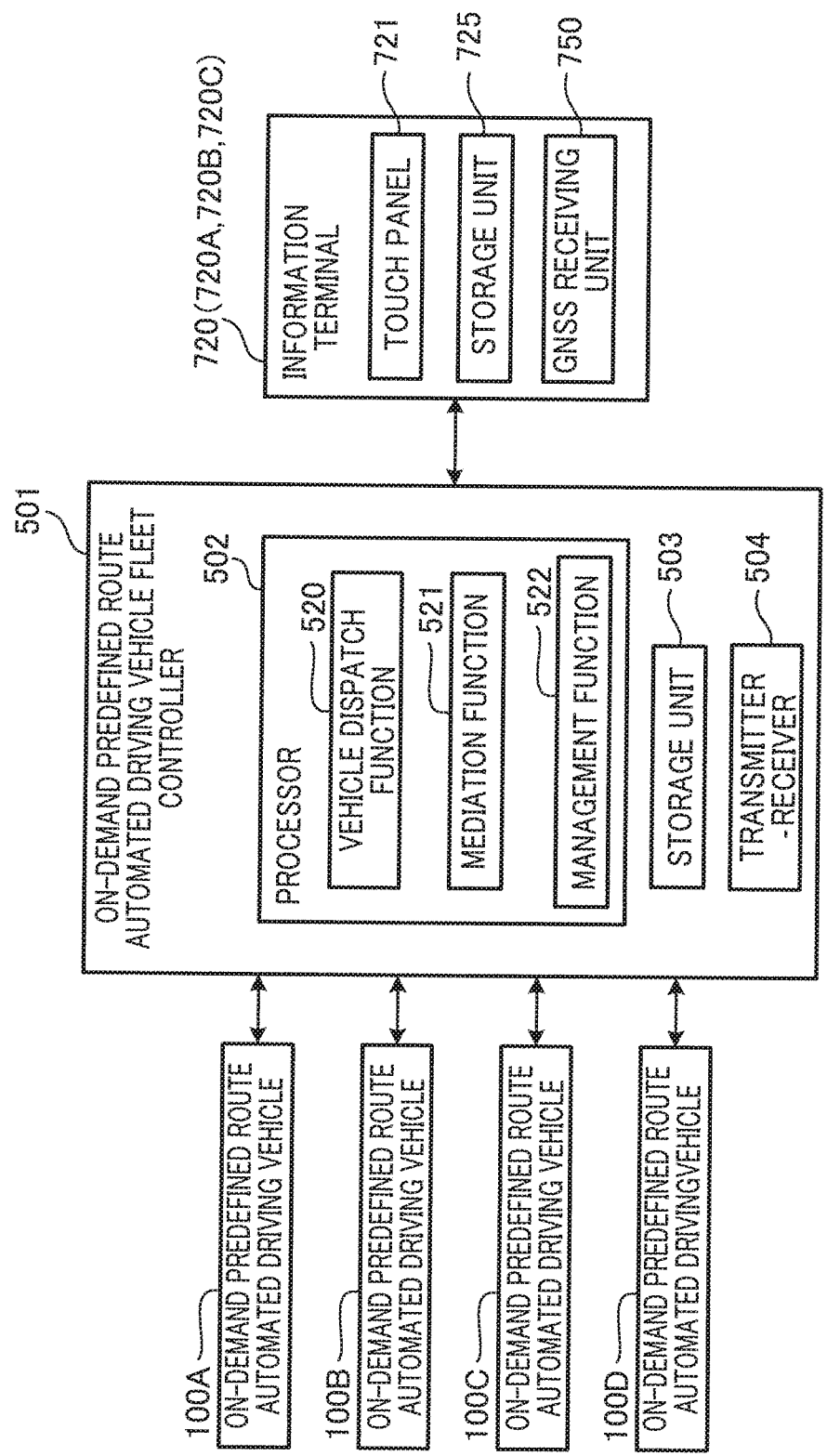
FIG. 6 is a block diagram of an arrangement of an on-demand predefined route automated driving vehicle fleet controller of the specific example.
Figure 7:
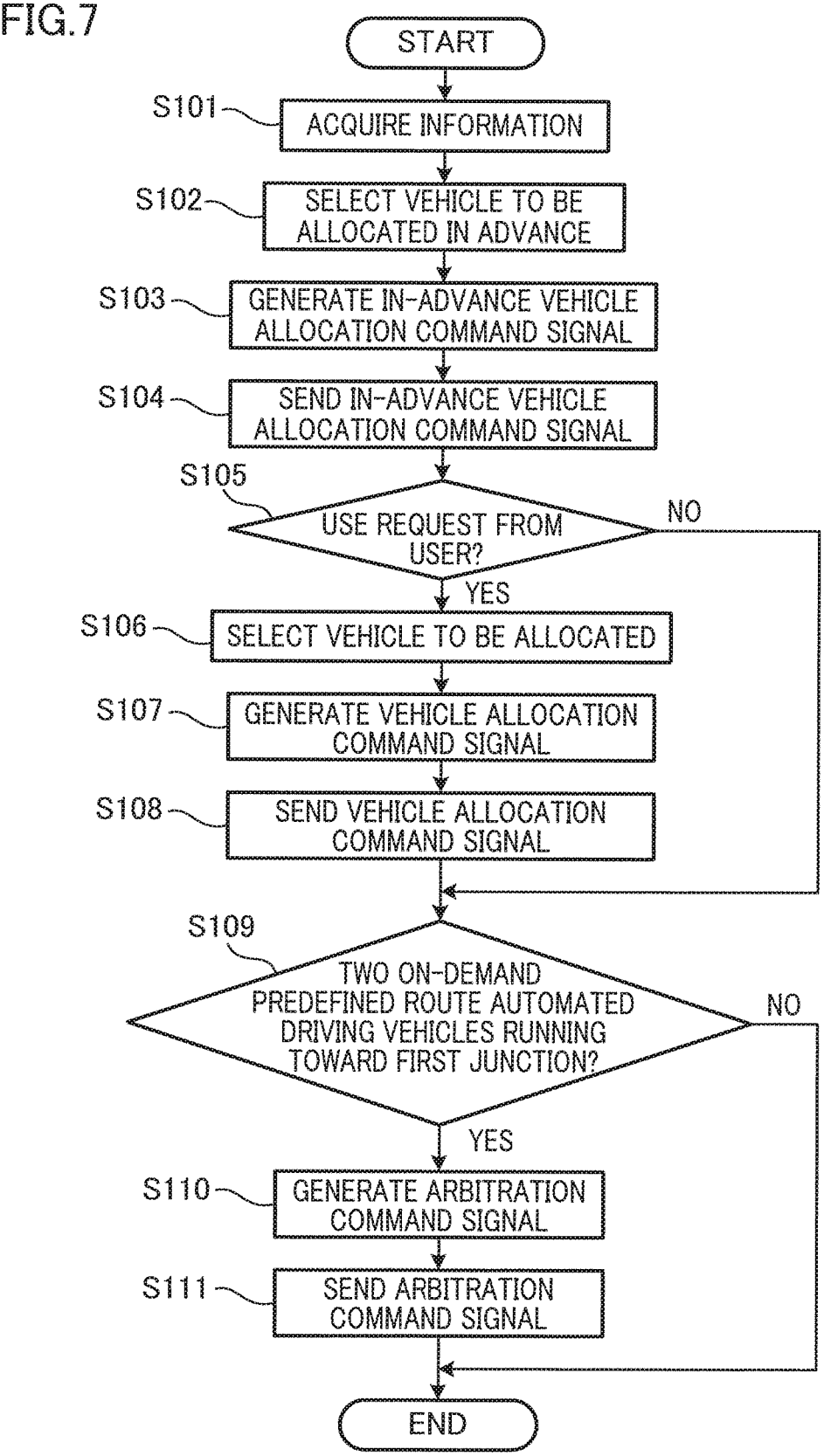
FIG. 7 is a flowchart of steps of a process performed by the on-demand predefined route automated driving vehicle fleet controller of the specific example.

FIG. 6 is a block diagram of an arrangement of the on-demand predefined route automated driving vehicle fleet controller 501 of the specific example of the embodiment. FIG. 7 is a flowchart of steps of a process performed by the on-demand predefined route automated driving vehicle fleet controller 501 of the specific example of the embodiment.

As shown in FIG. 6, the on-demand predefined route automated driving vehicle fleet controller 501 includes a processor 502, a storage unit 503, and a transmitter-receiver 504. The transmitter-receiver 504 is arranged to be able to send and receive information to and from the on-demand predefined route automated driving vehicles 100A to 100D. The transmitter-receiver 504 is, for example, an antenna such as a dipole antenna. The vehicle-mounted controller 115 may be physically a single device or a combination of plural devices. When the on-demand predefined route automated driving vehicle fleet controller 501 is physically a combination of plural devices, each device includes a calculation unit and a storage unit.

The transmitter-receiver 504 receives a use request from a user sent from a information terminal 720 held by the user 701. The information terminal 720 is a portable terminal, for example. The information terminal 720 includes a touch panel 721 and a GNSS receiving unit 750. The touch panel 721 is able to display information and to receive an input of information by a user 701. The GNSS receiving unit 750 generates information of a current location of the information terminal 720 by using electrical waves from a satellite. The information of the current location of the information terminal 720 generated by using the GNSS is generated based on electric waves from a satellite and a signal from a sensor which detects the actions of the information terminal 720. The information of the current location of the information terminal 720 generated by using the GNSS is information of an absolute location. The sensor detecting the actions of the information terminal 720 is a sensor provided in the information terminal 720. The information terminal 720 is able to acquire the current location by the GNSS receiving unit 750. The information terminal 720 sends a current location of the information terminal 720 to the on-demand predefined route automated driving vehicle fleet controller 501 at predetermined intervals. The information of the current location of the information terminal 720 generated by using the GNSS may be generated based solely on electric waves from a satellite.

Figure 8:
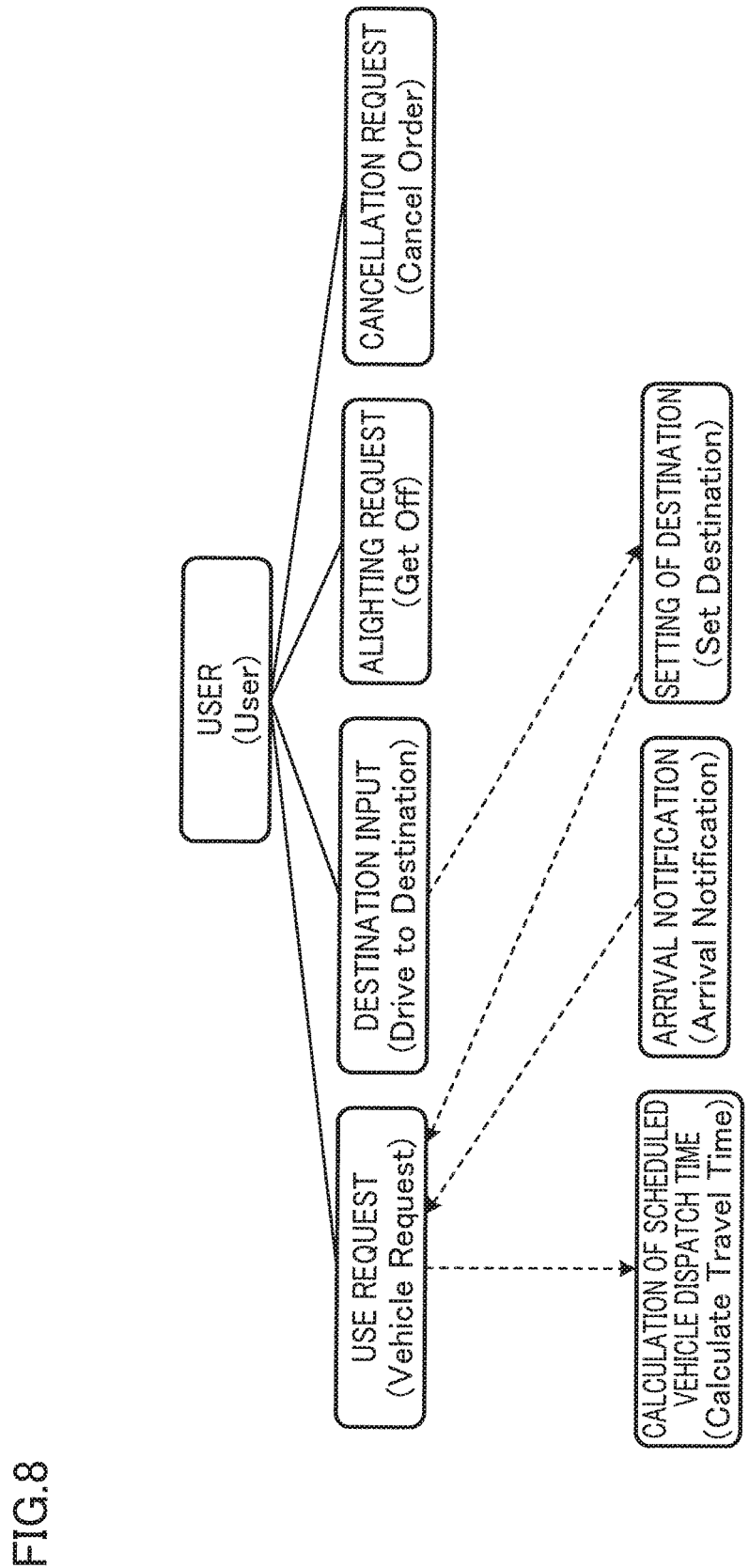
FIG. 8 shows information input to and output from an information terminal of the specific example.

A specific example of information related to a use request which is input to the information terminal 720 by a user 701 and output from the information terminal 720 is shown in FIG. 8. FIG. 8 shows, as a use case, information which is sent and received between the information terminal 720 of the user 701 and the on-demand predefined route automated driving vehicle fleet controller 501. As shown in FIG. 8, in the specific example, as the information related to the use request of the user 701, information of the use request, information of a destination instruction, information of an alighting request, and information of a cancellation request are sent from the information terminal 720 to the on-demand predefined route automated driving vehicle fleet controller 501. The information of the use request, the information of the destination instruction, the information of the alighting request, and the information of the cancellation request are input to the information terminal 720 by the user 701 and are sent to the on-demand predefined route automated driving vehicle fleet controller 501. In FIG. 8, a use request is also represented as Vehicle Request. A destination input is also represented as Drive to Destination. An alighting request is also represented as Get Off. A cancellation request is also represented as Cancel Order. A scheduled vehicle dispatch time calculation is also represented as Calculate Travel Time. An arrival notification is also represented as Arrival Notification. A destination setting is also represented as Set Destination.

The information of the use request is information of a request for using the on-demand predefined route automated driving vehicle 100 from a user 701. The information related to the use request sent to the on-demand predefined route automated driving vehicle fleet controller 501 includes information of a planned riding location. The planned riding location is a location where the user 701 plans to ride on the vehicle.

Figure 9A:
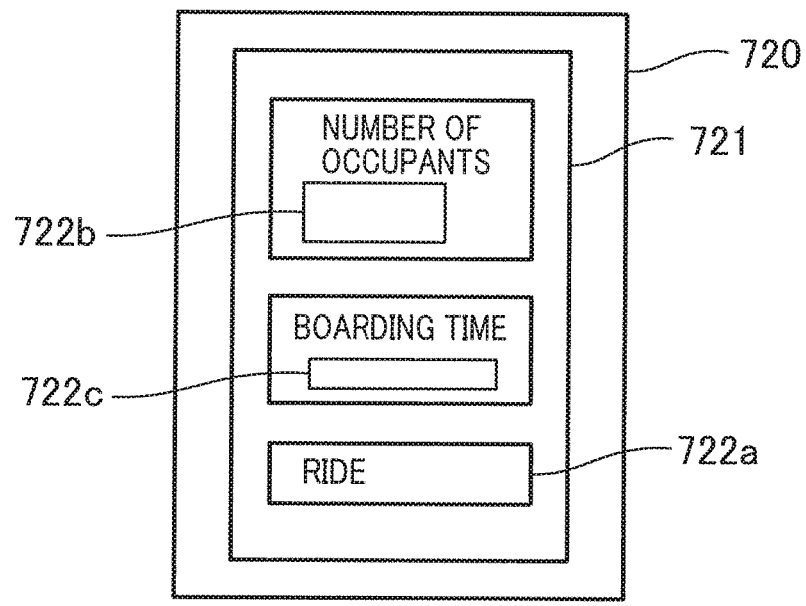
FIG. 9A shows an example of a display screen of the information terminal of the specific example.
Figure 9B:
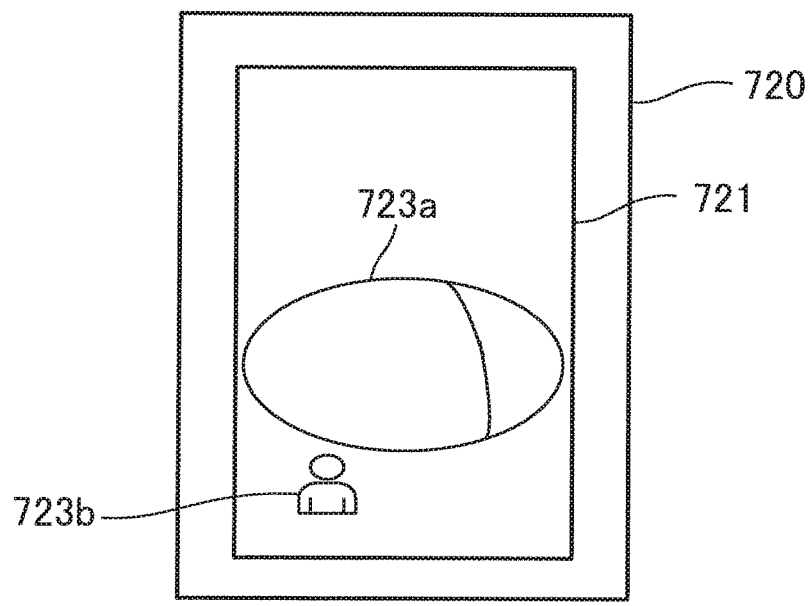
FIG. 9B shows an example of a display screen of the information terminal of the specific example.

The information of the use request input by the user 701 is, for example, information requesting simple use of the on-demand predefined route automated driving vehicle 100. To be more specific, as shown in FIG. 9A, when the user 701 taps a riding button 722*a* displayed on the touch panel 721 of the information terminal 720, information requesting simple use is input. In this case, when the information requesting simple use is input, information of a planned riding location generated based on information of the current location of the information terminal 720 generated by the GNSS receiving unit 750 is sent to the on-demand predefined route automated driving vehicle fleet controller 501. For example, when the current location of the information terminal 720 generated by the GNSS receiving unit 750 at the time of the input of the request of simple use is a location on the annular connected predefined route 130, the current location of the information terminal 720 is sent to the on-demand predefined route automated driving vehicle fleet controller 501 as the planned riding location. For example, when the current location of the information terminal 720 generated by the GNSS receiving unit 750 at the time of the input of the request of simple use is a location in the vicinity of the annular connected predefined route 130, a location on the annular connected predefined route 130, which is closest to the current location of the information terminal 720, is sent to the on-demand predefined route automated driving vehicle fleet controller 501 as the information of the planned riding location.

For example, the information of the use request input by the user 701 is information of a specified riding location specified by the user 701 on a map displayed on the touch panel 721 of the information terminal 720 based on the route information of the annular connected predefined route 130. To be more specific, as show in FIG. 9B, when a desired location 723*b* on a map 723*a* of the annular connected predefined route displayed on the touch panel 721 of the information terminal 720 is tapped by the user 701, information of the specified riding location specified on the map by the user 701 is input to the information terminal 720. A storage unit 725 of the information terminal 720 stores a location on the map 723*a* of the annular connected predefined route and absolute location information of the annular connected predefined route 130 in association with each other. In this case, the absolute location information corresponding to the specified riding location specified on the map 723*a* by the user 701 is sent to the on-demand predefined route automated driving vehicle fleet controller 501, as a planned riding location. The information of the use request may include information of the number of users who plan to ride on the on-demand predefined route automated driving vehicle 100. In this regard, the user 701 inputs the number of users who plan to ride on the vehicle, through the touch panel 721 of the information terminal 720. To be more specific, as shown in FIG. 9A, the user 701 inputs the number of users who plan to ride on the vehicle into a boarding user number input column 722*b* displayed on the touch panel 721 of the information terminal 720. The information of the use request may include information of a planned time to ride on the on-demand predefined route automated driving vehicle 100. In this regard, the user 701 inputs a planned time to ride on the vehicle, through the touch panel 721 of the information terminal 720. To be more specific, as shown in FIG. 9A, the user 701 inputs a planned time to ride on the vehicle into a boarding time input column 722*c* displayed on the touch panel 721 of the information terminal 720.

The information of the destination instruction is information of a destination where the user 701 wishes to reach by using the on-demand predefined route automated driving vehicle 100. The information of the destination instruction sent to the on-demand predefined route automated driving vehicle fleet controller 501 includes information of a planned alighting location. The planned alighting location is a location where the user 701 plans to alight from the vehicle.

Figure 9C:
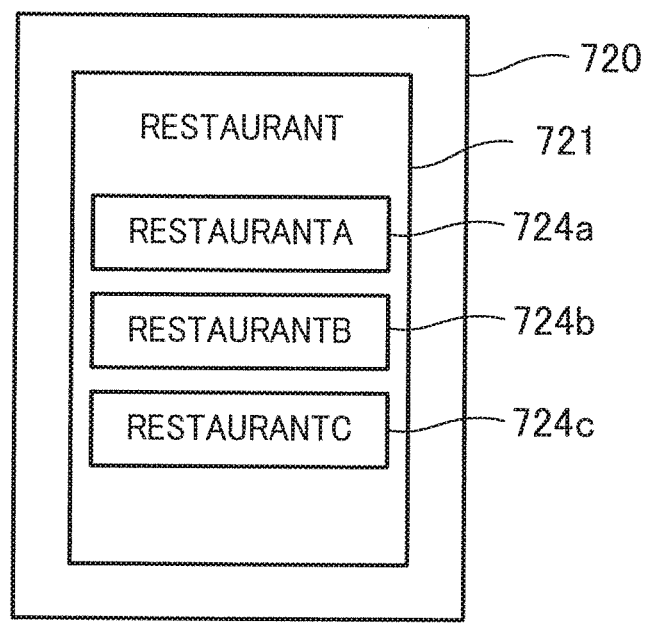
FIG. 9C shows an example of a display screen of the information terminal of the specific example.

For example, the information of the destination instruction input by the user 701 is information of a destination selected from plural candidate destinations by the user 701. The information of the candidate destinations may be stored in the storage unit 725 of the information terminal 720 and displayed on the touch panel 721. Alternatively, the information of the candidate destinations may be sent from the on-demand predefined route automated driving vehicle fleet controller 501 and displayed on the touch panel 721 of the information terminal 720. The candidate destinations may be displayed on the touch panel 721 of the information terminal 720. The candidate destinations may be classified by genre and displayed on the touch panel 721 of the information terminal 720. To be more specific, as shown in FIG. 9C, the touch panel 721 of the information terminal 720 displays, for restaurants A, B, and C which are candidate destinations and belong to the same genre (restaurants), a destination button 724*a* corresponding to the restaurant A, a destination button 724*b* corresponding to the restaurant B, and a destination button 724*c* corresponding to the restaurant C. When the user 701 taps one of the destination buttons 724*a*, 724*b* or 724*c*, the information of the destination instruction is input to the information terminal 720. The information of candidate destinations displayed on the touch panel 721 is not limited to destinations in the same genre, and may be information of various destinations. The storage unit 725 of the information terminal 720 stores restaurants A to C which are candidate destinations in association with the absolute location information of the annular connected predefined route 130. In this case, the absolute location information corresponding to one of the restaurants A to C input by the user 701 as the destination instruction is sent to the on-demand predefined route automated driving vehicle fleet controller 501, as a planned alighting location.

For example, the information of the destination instruction input by the user 701 is information of a specified alighting location specified by the user 701 on a map displayed on the touch panel 721 of the information terminal 720 based on the route information of the annular connected predefined route 130. To be more specific, as show in FIG. 9B, when a desired location 723*b* on a map 723*a* of the annular connected predefined route displayed on the touch panel 721 of the information terminal 720 is tapped by the user 701, information of the specified alighting location specified on the map by the user 701 is input to the information terminal 720. The storage unit 725 of the information terminal 720 stores a location on the map 723*a* of the annular connected predefined route and absolute location information of the annular connected predefined route 130 in association with each other. In this case, the absolute location information corresponding to the specified alighting location specified on the map by the user 701 is sent to the on-demand predefined route automated driving vehicle fleet controller 501, as a planned alighting location.

The information of the destination instruction may include information of a running route in addition to the information of the planned alighting location. The running route is a route along which a user wishes to move. For example, the information of the running route input by the user 701 is (unillustrated) information of a specified running route specified by the user 701 on a map displayed on the touch panel 721 of the information terminal 720 based on the route information of the annular connected predefined route 130. The storage unit 725 of the information terminal 720 stores a route on the map 723*a* of the annular connected predefined route and the route information of the annular connected predefined route 130 in association with each other. In this case, the route information corresponding to the specified running route specified on the map by the user 701 is sent to the on-demand predefined route automated driving vehicle fleet controller 501, as a running route. The information of the destination instruction may include information of a planned stop-over location in addition to the information of the planned alighting location. The planned stop-over location is a location where the user plans to stop over. For example, the information of the planned stop-over location input by the user 701 is information of a specified stop-over location specified by the user 701 on a map displayed on the touch panel 721 of the information terminal 720 based on the route information of the annular connected predefined route 130. To be more specific, as show in FIG. 9B, when a desired location 723*b* on a map 723*a* of the annular connected predefined route displayed on the touch panel 721 of the information terminal 720 is tapped by the user 701, information of the specified stop-over location specified on the map by the user 701 is input. The storage unit 725 of the information terminal 720 stores a location on the map 723*a* of the annular connected predefined route and the route information of the annular connected predefined route 130 in association with each other. In this case, the absolute location information corresponding to the specified stop-over location specified on the map by the user 701 is sent to the on-demand predefined route automated driving vehicle fleet controller 501, as a planned stop-over location.

The information of the alighting request is information of a request for alighting from the on-demand predefined route automated driving vehicle 100 from the user. The information of the alighting request is information simply requesting alighting. To be more specific, when the user 701 taps an alighting button displayed on the touch panel 721 of the information terminal 720, the alighting request is input to the information terminal 720. When the alighting request is input, the information of the alighting request is sent to the on-demand predefined route automated driving vehicle fleet controller 501. The information of the alighting request may include the information of the current location of the information terminal 720, which is generated by the GNSS receiving unit of the information terminal 720.

The information of the cancellation request is information requesting cancellation of the use of the on-demand predefined route automated driving vehicle 100 from a user who has made a use request. The information of the cancellation request is information simply requesting cancellation. To be more specific, when the user 701 taps a cancellation button displayed on the touch panel 721 of the information terminal 720, the cancellation request is input. When the cancellation request is input, the information of the cancellation request is sent to the on-demand predefined route automated driving vehicle fleet controller 501.

As shown in FIG. 8, the information terminal 720 may display, on the touch panel 721, a planned vehicle dispatch time of the on-demand predefined route automated driving vehicle 100, which is calculated based on a use request input by a user 701. The calculation of the planned vehicle dispatch time may be done by the information terminal 720, or the planned vehicle dispatch time may be calculated by the on-demand predefined route automated driving vehicle fleet controller 501 and acquired by the information terminal 720. As shown in FIG. 8, the information terminal 720 may display, on the touch panel 721, a notification of the arrival of the on-demand predefined route automated driving vehicle 100, which is generated based on a use request input by a user 701. The information terminal 720 may display, on the touch panel 721, a current location of the on-demand predefined route automated driving vehicle 100 on the annular connected predefined route 130, which is generated based on a use request input by a user 701.

The transmitter-receiver 504 receives information of a current location of each vehicle and energy information related to the remaining energy amount of the battery B, which are sent from the on-demand predefined route automated driving vehicles 100A to 100D.

The transmitter-receiver 504 receives a front obstacle detection signal sent from the on-demand predefined route automated driving vehicles 100A to 100D.

The transmitter-receiver 504 sends a vehicle dispatch command signal and an arbitration command signal which are generated by the processor 502 to the on-demand predefined route automated driving vehicles 100A to 100D.

The processor 502 has a vehicle dispatch function 520, an arbitration function 521, and a management function 522. With the vehicle dispatch function 520, an in-advance dispatched vehicle selection process, an in-advance vehicle dispatch signal generation process, an dispatched vehicle selection process, and a vehicle dispatch signal generation process are performed. With the arbitration function 521, an arbitration signal generation process is performed. With the management function 522, an information acquisition process and a sending process are performed. The processor 502 is therefore arranged or programmed to perform the in-advance dispatched vehicle selection process, the in-advance vehicle dispatch signal generation process, the dispatched vehicle selection process, the vehicle dispatch signal generation process, the arbitration signal generation process, the information acquisition process, and the sending process. Each of the vehicle dispatch function 520 and the management function 522 does not independently perform processes but perform processes in a cooperated manner. Each of the arbitration function 521 and the management function 522 does not independently perform processes but perform processes in a cooperated manner. Each of the vehicle dispatch function 520 and the arbitration function 521 is able to perform processes independently or in a cooperated manner.

The following will describe steps of a process executed by the processor 502 of the on-demand predefined route automated driving vehicle fleet controller 501 with reference to FIG. 7. The process shown in FIG. 7 is one of processes executed by the processor 502 of the on-demand predefined route automated driving vehicle fleet controller 501. In other words, the processor 502 of the on-demand predefined route automated driving vehicle fleet controller 501 executes processes other than the process shown in FIG. 7.

As shown in FIG. 7, the on-demand predefined route automated driving vehicle fleet controller 501 executes an information acquisition process S101. In the information acquisition process S101, the on-demand predefined route automated driving vehicle fleet controller 501 acquires information (step S101). Sets of information acquired by the on-demand predefined route automated driving vehicle fleet controller 501 are route information, vehicle location information, occupant existence information, anticipated riding location information, use request information, and energy information.

The route information is map information of the annular connected predefined route 130 and is stored in the storage unit 503 in advance.

The vehicle location information is information of the current locations of on-demand predefined route automated driving vehicles 100 running along the annular connected predefined route 130. The vehicle location information is sent from each of the on-demand predefined route automated driving vehicles 100 to the transmitter-receiver 504. The vehicle location information is sent from the on-demand predefined route automated driving vehicles 100 on the annular connected predefined route 130 at predetermined intervals.

The occupant existence information is information related to the existence of an occupant in each of the on-demand predefined route automated driving vehicles 100 running along the annular connected predefined route 130. The occupant existence information is sent from each of the on-demand predefined route automated driving vehicles 100 to the transmitter-receiver 504. The occupant existence information sent from the on-demand predefined route automated driving vehicles 100 is information related to the number of occupants seated on the seats 102 of the on-demand predefined route automated driving vehicles 100. The on-demand predefined route automated driving vehicle fleet controller 501 determines that there is no occupant when the number of occupants seated on the seats 102 is 0, and determines that there is an occupant when the number of occupants seated on the seats 102 is 1 to 4. The occupant existence information is sent from the on-demand predefined route automated driving vehicles 100 on the annular connected predefined route 130 when the number of seated occupants detected by the seating detector provided on the seats 102 is changed.

The anticipated riding location information is information related to an anticipated riding location which is anticipated to become a planned riding location on the annular connected predefined route 130. The anticipated riding location information is generated by the on-demand predefined route automated driving vehicle fleet controller 501 at predetermined intervals, based on at least one of information related to a user 701, information related to a destination, or information related to environment.

The information related to a user includes a past use history of a user 701 and a current location of the user 701. The information of a past use history of a user 701 is, for example, information of a past riding location and past riding date and time of the user 701 and information of a past alighting location and past alighting date and time. The information related to a destination includes a destination when a user 701 used an on-demand predefined route automated driving vehicle 100 in the past or a destination where a user 701 may wish to go in future. The information related to a destination is, for example, information of surroundings of a destination, information of business hours and business days of a shop, or information of the date and time of an event. The information related to a user and the information related to a destination are, for example, statistical information of check-in and check-out to and from an accommodation. The information related to environment is information of the environment of the annular connected predefined route 130. The information of environment is, for example, weather information such as rain.

The anticipated riding location information includes information of an anticipated riding location use request time at which a user 701 is anticipated to make a use request. The anticipated riding location use request time is generated by the on-demand predefined route automated driving vehicle fleet controller 501 at predetermined intervals, based on at least one of information related to a user 701, information related to a destination, or information related to environment.

The anticipated riding location information includes information of an anticipated alighting location which is anticipated to become a planned alighting location where a user 701 alights from a vehicle. The anticipated alighting location is generated based on a past use history of a user 701 corresponding to an anticipated riding location.

To be more specific, a location where a predetermined number or more of users 701 exist at the present moment is specified as an anticipated riding location, among plural locations on the annular connected predefined route. In this case, the present moment is specified as an anticipated riding location use request time. Alternatively, for example, a location which has been selected as a riding location at least a reference number of times in a predetermined time period on a particular day of the week according to a past use history of a user 701 is specified as an anticipated riding location. In this case, the predetermined time period on the particular day of the week is specified as an anticipated riding location use request time. Alternatively, for example, when an event is held on a particular day and time, a location in the vicinity of the event venue is specified as an anticipated riding location. In this case, the particular day and time is specified as an anticipated riding location use request time. For example, when a predetermined number or more of persons check in or check out an accommodation in a predetermined time period on a particular day of the week, a location in the vicinity of the reception of the accommodation is specified as an anticipated riding location. In this case, the predetermined time period on the particular day of the week is specified as an anticipated riding location use request time. For example, when it rains after a user 701 moved to a destination by using an on-demand predefined route automated driving vehicle 100, a location in the vicinity of the destination is specified as an anticipated riding location. In this case, a time after a predetermined period elapses from the arrival of the user 701 at the destination by using the on-demand predefined route automated driving vehicle 100 is specified as an anticipated riding location use request time.

The use request information is information which is related to a use request from a user and encompasses information of a planned riding location where a user 701 plans to ride on a vehicle. In the specific example, information related to a use request is sent from the information terminal 720 to the transmitter-receiver 504 as the use request information. The information which is related to a use request and sent to the on-demand predefined route automated driving vehicle fleet controller 501 is a simple request for use and a current location of the information terminal 720 when the simple request for use is input. Alternatively, the information which is related to a use request and sent to the on-demand predefined route automated driving vehicle fleet controller 501 includes absolute location information corresponding to a specified riding location specified by a user 701. In the specific example, information of a destination instruction may be sent from the information terminal 720 to the transmitter-receiver 504 as the use request information. The information of a destination instruction which is sent to the on-demand predefined route automated driving vehicle fleet controller 501 is either absolute location information corresponding to a destination specified by a user 701 or absolute location information corresponding to a specified alighting location specified by a user 701. When information related to a use request is input to the information terminal 720 by a user 701, the use request information is sent to the on-demand predefined route automated driving vehicle fleet controller 501.

The energy information is information related to a remaining energy amount of each of the on-demand predefined route automated driving vehicles 100 on the annular connected predefined route 130. The energy information is sent from each of the on-demand predefined route automated driving vehicles 100 to the transmitter-receiver 504. In this specific example, the energy information is information related to a remaining energy amount of the battery B of the on-demand predefined route automated driving vehicle 100. The energy information is sent from the on-demand predefined route automated driving vehicles 100 on the annular connected predefined route 130 at predetermined intervals.

The on-demand predefined route automated driving vehicle fleet controller 501 executes the in-advance dispatched vehicle selection process. In the in-advance dispatched vehicle selection process, the on-demand predefined route automated driving vehicle fleet controller 501 selects a vehicle to be dispatched to an anticipated riding location in advance from the on-demand predefined route automated driving vehicles 100, based on the acquired route information, vehicle location information, occupant existence information, and anticipated riding location information. The vehicle to be dispatched to the anticipated riding location in advance is selected from vehicles having no occupant and having not received a vehicle dispatch command signal among the on-demand predefined route automated driving vehicles 100 (step S102).

When an anticipated alighting location has been acquired, the on-demand predefined route automated driving vehicle fleet controller 501 selects a vehicle having a remaining energy amount sufficient for reaching the anticipated alighting location via the anticipated riding location as an on-demand predefined route automated driving vehicle 100 to be dispatched to the anticipated riding location.

The on-demand predefined route automated driving vehicle fleet controller 501 executes the in-advance vehicle dispatch command signal generation process. In the in-advance vehicle dispatch command signal generation process, based on the acquired route information, vehicle location information, occupant existence information, and anticipated riding location information, the on-demand predefined route automated driving vehicle fleet controller 501 generates an in-advance vehicle dispatch command signal. The in-advance vehicle dispatch command signal is a signal which instructs the vehicle, which is selected from the on-demand predefined route automated driving vehicles 100 to be dispatched to the anticipated riding location information in advance, to run toward the anticipated riding location and wait at the anticipated riding location on an anticipated riding location use request time (step S103).

The on-demand predefined route automated driving vehicle fleet controller 501 executes the sending process. In the sending process, the on-demand predefined route automated driving vehicle fleet controller 501 sends the generated in-advance vehicle dispatch command signal to the vehicle which is selected from the on-demand predefined route automated driving vehicles 100 to be dispatched to the anticipated riding location in advance (step S104).

When use request information is input from an information terminal 720 held by a user 701 (YES in the step S105), the on-demand predefined route automated driving vehicle fleet controller 501 executes dispatched vehicle selection processes S106 and S107. When use request information is not input from an information terminal 720 held by a user 701 (NO in the step S105), the on-demand predefined route automated driving vehicle fleet controller 501 does not execute the dispatched vehicle selection processes S106 and S107. In the dispatched vehicle selection processes, the on-demand predefined route automated driving vehicle fleet controller 501 selects an on-demand predefined route automated driving vehicle 100 to be dispatched to the planned riding location included in the use request information from the on-demand predefined route automated driving vehicles 100, based on the acquired route information, vehicle location information, occupant existence information, use request information, and energy information (step S106).

To be more specific, from the on-demand predefined route automated driving vehicles 100, the on-demand predefined route automated driving vehicle fleet controller 501 selects a vehicle which has no occupant and is able to receive a vehicle dispatch command signal, as an on-demand predefined route automated driving vehicle 100 to be dispatched to the planned riding location. The vehicle having no occupant and being able to receive a vehicle dispatch command signal includes a vehicle in the in-advance vehicle dispatch state. When there are plural vehicles which have no occupant and are able to receive a vehicle dispatch command signal, for example, the on-demand predefined route automated driving vehicle fleet controller 501 selects an on-demand predefined route automated driving vehicle 100 to be dispatched to the planned riding location, in the following manner. For example, the on-demand predefined route automated driving vehicle fleet controller 501 selects a vehicle having a remaining energy amount sufficient for reaching the planned riding location as an on-demand predefined route automated driving vehicle 100 to be dispatched to the planned riding location. Alternatively, for example, the on-demand predefined route automated driving vehicle fleet controller 501 selects a vehicle having a remaining energy amount larger than an energy amount required to reach the planned riding location by a predetermined amount, as an on-demand predefined route automated driving vehicle 100 to be dispatched to the planned riding location. Alternatively, for example, when a planned alighting location has been acquired, the on-demand predefined route automated driving vehicle fleet controller 501 selects a vehicle having a remaining energy amount sufficient for reaching the planned alighting location via the planned riding location as an on-demand predefined route automated driving vehicle 100 to be dispatched to the planned riding location. Alternatively, for example, the on-demand predefined route automated driving vehicle fleet controller 501 selects a vehicle having a remaining energy amount larger than a predetermined amount as an on-demand predefined route automated driving vehicle 100. Alternatively, for example, the on-demand predefined route automated driving vehicle fleet controller 501 selects a vehicle whose current location is closest to the planned riding location as an on-demand predefined route automated driving vehicle 100 to be dispatched to the planned riding location. The on-demand predefined route automated driving vehicle fleet controller 501 may select an on-demand predefined route automated driving vehicle 100 to be dispatched to the planned riding location based on a remaining energy amount and a current location.

When there is no vehicle which has no occupant and is able to receive a vehicle dispatch command signal among the on-demand predefined route automated driving vehicles 100, the on-demand predefined route automated driving vehicle fleet controller 501 selects an on-demand predefined route automated driving vehicle 100 to be dispatched to the planned riding location, from vehicles each having an occupant. In this case, for example, the on-demand predefined route automated driving vehicle fleet controller 501 selects a vehicle whose current location is closest to the planned alighting location as an on-demand predefined route automated driving vehicle 100 to be dispatched to the planned riding location, among the on-demand predefined route automated driving vehicles 100 each running based on a vehicle dispatch command signal. Alternatively, for example, the on-demand predefined route automated driving vehicle fleet controller 501 selects a vehicle whose planned alighting location is closest to the planned riding location as an on-demand predefined route automated driving vehicle 100 to be dispatched to the planned riding location, among the on-demand predefined route automated driving vehicles 100 each running based on a vehicle dispatch command signal. The on-demand predefined route automated driving vehicle fleet controller 501 may select an on-demand predefined route automated driving vehicle 100 to be dispatched to the planned riding location based on a current location, a planned alighting location, and a planned riding location. The on-demand predefined route automated driving vehicle fleet controller 501 may select an on-demand predefined route automated driving vehicle 100 to be dispatched to the planned riding location based on a remaining energy amount, a current location, a planned alighting location, and a planned riding location.

In addition to the above, when it is determined based on the acquired occupant existence information that the planned occupant number is larger than the maximum number of occupants of one on-demand predefined route automated driving vehicle 100, the on-demand predefined route automated driving vehicle fleet controller 501 selects plural on-demand predefined route automated driving vehicles 100 to be dispatched to the planned riding location in the use request information, among the on-demand predefined route automated driving vehicles 100.

When the on-demand predefined route automated driving vehicle 100 to be dispatched to the planned riding location is selected, the on-demand predefined route automated driving vehicle fleet controller 501 generates a vehicle dispatch command signal for the on-demand predefined route automated driving vehicle 100 to be dispatched to the planned riding location (step S107). The vehicle dispatch command signal is generated based on the acquired route information, vehicle location information, occupant existence information, use request information, and energy information. The vehicle dispatch command signal is a signal by which a vehicle which is to be dispatched to the planned riding location and is selected from the on-demand predefined route automated driving vehicles 100 is dispatched to the planned riding location. The vehicle dispatch command signal includes a command by which an on-demand predefined route automated driving vehicle 100 to be dispatched to the planned riding location is moved from the current location to the planned riding location and is stopped at the planned riding location based on the current location information and the information of the planned riding location of the on-demand predefined route automated driving vehicle 100 to be dispatched to the planned riding location. When information of the planned alighting location has been input to the information terminal 720 by the user 701, the vehicle dispatch command signal further includes a command by which the on-demand predefined route automated driving vehicle 100 to be dispatched to the planned riding location is moved from the planned riding location to the planned alighting location and is stopped at the planned alighting location. When information of the running route has been input to the information terminal 720 by the user 701, the vehicle dispatch command signal further includes a command by which the on-demand predefined route automated driving vehicle 100 to be dispatched to the planned riding location is moved along the specified running route from the current location to the planned riding location. When information of the planned stop-over location has been input to the information terminal 720 by the user 701, the vehicle dispatch command signal further includes a command by which the on-demand predefined route automated driving vehicle 100 to be dispatched to the planned riding location is stopped at the specified planned stop-over location while running from the current location to the planned riding location.

When an on-demand predefined route automated driving vehicle 100 selected as a vehicle to be dispatched to the planned riding location is a vehicle which has no occupant and is in the standby state, the vehicle dispatch command signal is a signal which instructs the vehicle so that the speed in the standby state is identical with or different from the speed in the vehicle dispatch state when the standby state is switched to the vehicle dispatch state. When an on-demand predefined route automated driving vehicle 100 selected as a vehicle to be dispatched to the planned riding location is a vehicle which has no occupant and is in the standby state, the vehicle dispatch command signal is preferably a signal which instructs the vehicle so that the speed in the standby state is lower than the speed in the vehicle dispatch state when the standby state is switched to the vehicle dispatch state. In this connection, the vehicle-mounted controller 115 of the on-demand predefined route automated driving vehicle 100 sets the speed of the on-demand predefined route automated driving vehicle 100 in the standby state as V1. Furthermore, the vehicle-mounted controller 115 of the on-demand predefined route automated driving vehicle 100 sets the speed of the on-demand predefined route automated driving vehicle 100 in the vehicle dispatch state as V2. The speed V1 may be identical with or different from the speed V2. In other words, when the on-demand predefined route automated driving vehicle 100 to be dispatched to the planned riding location receives a vehicle dispatch command signal and is switched from the standby state to the vehicle dispatch state, the speed in the standby state may be different from or identical with the speed in the vehicle dispatch state. When an on-demand predefined route automated driving vehicle 100 selected as a vehicle to be dispatched to the planned riding location is a vehicle which has an occupant and is in the running-to-destination state, the vehicle dispatch command signal is a signal which instructs the vehicle so that the speed in the running-to-destination state is identical with or different from the speed in the vehicle dispatch state when the running-to-destination state is switched to the vehicle dispatch state. In this connection, the vehicle-mounted controller 115 of the on-demand predefined route automated driving vehicle 100 sets the speed of the on-demand predefined route automated driving vehicle 100 in the running-to-destination state as V3. The speed V3 may be identical with or different from the speed V2. To put it differently, when receiving the vehicle dispatch command signal and switched from the running-to-destination state to the vehicle dispatch state, the on-demand predefined route automated driving vehicle 100 to be dispatched to the planned riding location is controlled so that the speed in the running-to-destination state is identical with or different from the speed in the vehicle dispatch state.

The on-demand predefined route automated driving vehicle fleet controller 501 may control the speed V1 of the on-demand predefined route automated driving vehicle 100 in the standby state to a speed with which the energy consumption amount is suppressed, in accordance with the remaining energy amount of the on-demand predefined route automated driving vehicle 100. For example, when it is determined that the remaining energy amount of an on-demand predefined route automated driving vehicle 100 is small based on the energy information, the on-demand predefined route automated driving vehicle fleet controller 501 controls the speed V1 of that on-demand predefined route automated driving vehicle 100 in the standby state to be decreased to 0.

In addition to the above, when receiving information related to a cancellation request from the information terminal 720 held by the user 701 who has made the use request, the on-demand predefined route automated driving vehicle fleet controller 501 controls the on-demand predefined route automated driving vehicle 100 having been selected as a vehicle to be dispatched to the planned riding location to be switched from the vehicle dispatch state to the standby state.

In addition to the above, when receiving information of an alighting request from the information terminal 720 held by the user 701 who has made the use request, the on-demand predefined route automated driving vehicle fleet controller 501 controls the on-demand predefined route automated driving vehicle 100, on which the user 701 rides and which is running in the running-to-destination state, to be stopped.

When the vehicle dispatch command signal generation process S104 is executed, the on-demand predefined route automated driving vehicle fleet controller 501 executes a sending process S105. The on-demand predefined route automated driving vehicle fleet controller 501 sends the generated vehicle dispatch command signal to the on-demand predefined route automated driving vehicle 100 which is selected as a vehicle to be dispatched to the planned riding location (step S108).

Subsequently, when it is determined that there are an on-demand predefined route automated driving vehicle 100 running along the annular predefined route 131 toward the first junction 131a and another on-demand predefined route automated driving vehicle 100 running along the connected predefined route 132 toward the first junction 131a (YES in S109), the on-demand predefined route automated driving vehicle fleet controller 501 executes an arbitration command signal generation process S110. Based on the acquired route information, vehicle location information, occupant existence information, use request information, and energy information, the on-demand predefined route automated driving vehicle fleet controller 501 determines whether to execute the arbitration command signal generation process S110. When an on-demand predefined route automated driving vehicle 100 enters the annular predefined route 131 which is within a predetermined distance from the first junction 131a, based on the current location information, the on-demand predefined route automated driving vehicle fleet controller 501 determines that there is an on-demand predefined route automated driving vehicle 100 running along the annular predefined route 131 toward the first junction 131a. When an on-demand predefined route automated driving vehicle 100 enters the connected predefined route 132 which is within a predetermined distance from the first junction 131a, based on the current location information, the on-demand predefined route automated driving vehicle fleet controller 501 determines that there is an on-demand predefined route automated driving vehicle 100 running along the connected predefined route 132 toward the first junction 131a. The predetermined distance is longer than the distance at which the on-demand predefined route automated driving vehicle 100 detects an obstacle in the vehicle forward direction by the front obstacle detector 118.

When each of two on-demand predefined route automated driving vehicles 100 running toward the first junction 131a does not detect an obstacle in the vehicle forward direction by the front obstacle detector 118 and control related to the existence of an obstacle is not performed, the on-demand predefined route automated driving vehicle fleet controller 501 executes the arbitration command signal generation process S110. When a front obstacle detection signal is not supplied from these on-demand predefined route automated driving vehicles 100 running toward the first junction 131a, the on-demand predefined route automated driving vehicle fleet controller 501 determines that the control related to the existence of an obstacle is not performed.

Figure 10:
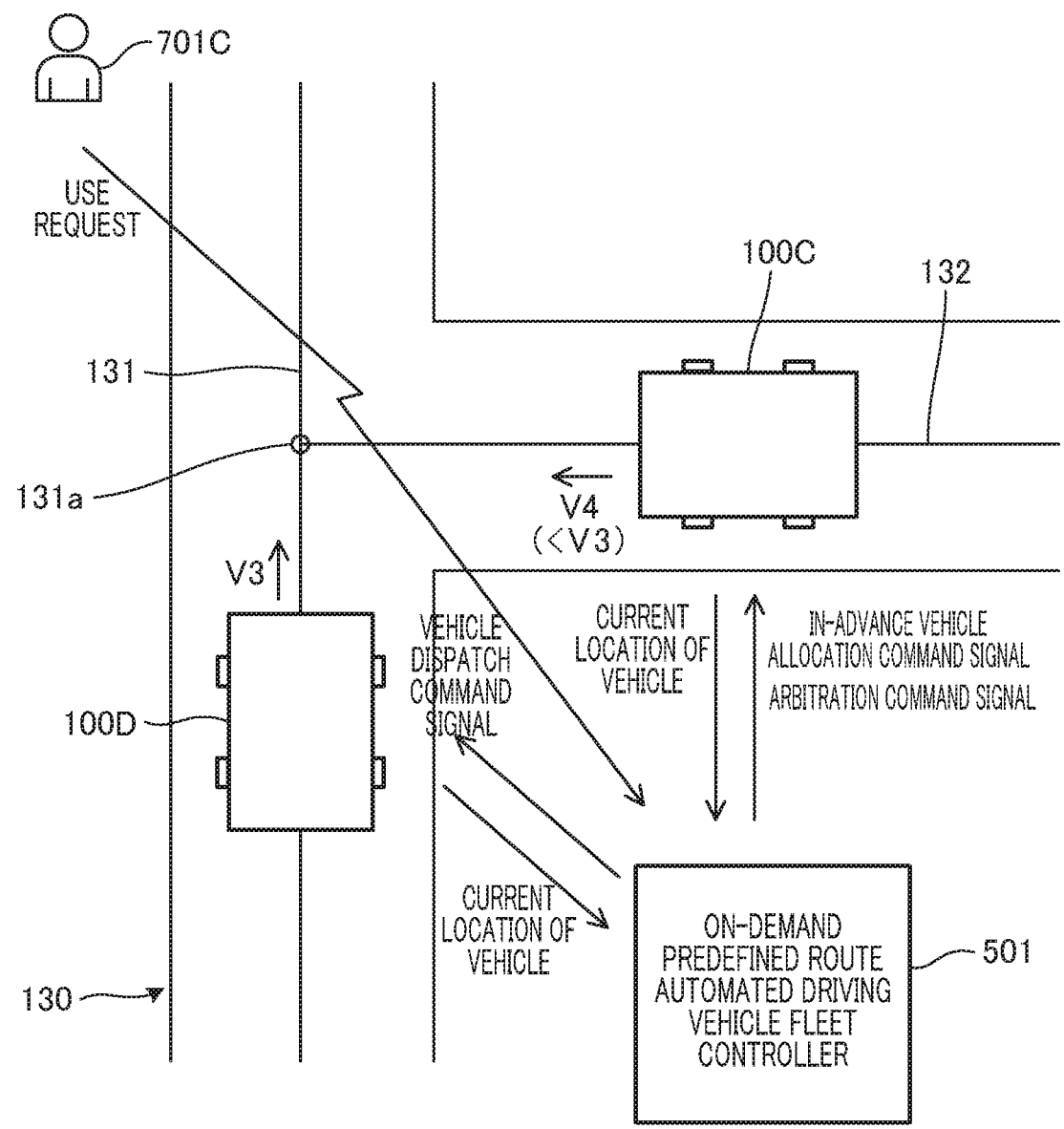
FIG. 10 is a schematic representation showing a state in which two on-demand predefined route automated driving vehicles run toward a first junction on the annular connected predefined route of the specific example.

A specific example of the determination of whether the on-demand predefined route automated driving vehicle fleet controller 501 executes the arbitration command signal generation process S110 will be described with reference to FIG. 10. In FIG. 10, an on-demand predefined route automated driving vehicle 100D runs along the annular predefined route 131 toward the first junction 131a on the annular connected predefined route 130. Furthermore, an on-demand predefined route automated driving vehicle 100C runs along the connected predefined route 132 toward the first junction 131a on the annular connected predefined route 130. The on-demand predefined route automated driving vehicle fleet controller 501 executes the arbitration command signal generation process S107 when the following conditions are satisfied. The first condition is that the on-demand predefined route automated driving vehicle fleet controller 501 determines that the on-demand predefined route automated driving vehicle 100C and the on-demand predefined route automated driving vehicle 100D enter regions each of which is within the predetermined distance from the first junction 131a. The second condition is that the on-demand predefined route automated driving vehicle fleet controller 501 does not receive a front obstacle detection signal from the on-demand predefined route automated driving vehicle 100C and the on-demand predefined route automated driving vehicle 100D.

In the arbitration command signal generation process, based on the acquired route information, vehicle location information, occupant existence information, anticipated riding location information, use request information, and energy information, the on-demand predefined route automated driving vehicle fleet controller 501 generates an arbitration command signal. The arbitration command signal is a signal for determining which one of the two on-demand predefined route automated driving vehicles 100C and 100D running toward the first junction 131a passes through the first junction 131a first.

For example, the on-demand predefined route automated driving vehicle fleet controller 501 determines the order of the vehicles passing through the first junction 131a, based on the running state of each on-demand predefined route automated driving vehicle 100 (not illustrated). For example, when the two on-demand predefined route automated driving vehicles 100 running toward the first junction 131a are an on-demand predefined route automated driving vehicle 100 in the vehicle dispatch state and an on-demand predefined route automated driving vehicle 100 in the in-advance vehicle dispatch state, the on-demand predefined route automated driving vehicle 100 in the in-advance vehicle dispatch state passes through the first junction 131a after the on-demand predefined route automated driving vehicle 100 in the vehicle dispatch state passes through the first junction 131a. Furthermore, for example, when the two on-demand predefined route automated driving vehicles 100 running toward the first junction 131a are an on-demand predefined route automated driving vehicle 100 in the running-to-destination state and an on-demand predefined route automated driving vehicle 100 in the in-advance vehicle dispatch state, the on-demand predefined route automated driving vehicle 100 in the in-advance vehicle dispatch state passes through the first junction 131a after the on-demand predefined route automated driving vehicle 100 in the running-to-destination state passes through the first junction 131a. Furthermore, for example, when the two on-demand predefined route automated driving vehicles 100 running toward the first junction 131a are an on-demand predefined route automated driving vehicle 100 in the vehicle dispatch state and an on-demand predefined route automated driving vehicle 100 in the standby state, the on-demand predefined route automated driving vehicle 100 in the standby state passes through the first junction 131a after the on-demand predefined route automated driving vehicle 100 in the vehicle dispatch state passes through the first junction 131a. Furthermore, for example, when the two on-demand predefined route automated driving vehicles 100 running toward the first junction 131a are an on-demand predefined route automated driving vehicle 100 in the running-to-destination state and an on-demand predefined route automated driving vehicle 100 in the standby state, the on-demand predefined route automated driving vehicle 100 in the standby state passes through the first junction 131a after the on-demand predefined route automated driving vehicle 100 in the running-to-destination state passes through the first junction 131a. Furthermore, for example, when the two on-demand predefined route automated driving vehicles 100 running toward the first junction 131a are an on-demand predefined route automated driving vehicle 100 in the vehicle dispatch state and an on-demand predefined route automated driving vehicle 100 in the vehicle dispatch state, the on-demand predefined route automated driving vehicle 100 in the vehicle dispatch state passes through the first junction 131a after the on-demand predefined route automated driving vehicle 100 in the running-to-destination state passes through the first junction 131a. Furthermore, for example, when the two on-demand predefined route automated driving vehicles 100 running toward the first junction 131a are both on-demand predefined route automated driving vehicles 100 in the in-advance vehicle dispatch state, the on-demand predefined route automated driving vehicle 100 in which the distance from the first junction 131a to the planned riding location is shorter than the distance in the other vehicle 100 passes through the first junction 131a after the other on-demand predefined route automated driving vehicle 100 in which the distance from the first junction 131a to the planned riding location is long passes through the first junction 131a. Furthermore, for example, when the two on-demand predefined route automated driving vehicles 100 running toward the first junction 131a are both on-demand predefined route automated driving vehicles 100 in the vehicle dispatch state, the on-demand predefined route automated driving vehicle 100 in which the distance from the first junction 131a to the planned riding location is shorter than the distance in the other vehicle 100 passes through the first junction 131a after the other on-demand predefined route automated driving vehicle 100 in which the distance from the first junction 131a to the planned riding location is long passes through the first junction 131a. Furthermore, for example, when the two on-demand predefined route automated driving vehicles 100 running toward the first junction 131a are both on-demand predefined route automated driving vehicles 100 in the running-to-destination state, the on-demand predefined route automated driving vehicle 100 in which the distance from the first junction 131a to the planned alighting location is shorter than the distance in the other vehicle 100 passes through the first junction 131a after the other on-demand predefined route automated driving vehicle 100 in which the distance from the first junction 131a to the planned alighting location is long passes through the first junction 131a. Furthermore, for example, when the two on-demand predefined route automated driving vehicles 100 running toward the first junction 131a are both on-demand predefined route automated driving vehicles 100 in the standby state, the on-demand predefined route automated driving vehicle 100 in which the distance from the first junction 131a to the current location is longer than the distance in the other vehicle 100 passes through the first junction 131a after the other on-demand predefined route automated driving vehicle 100 in which the distance from the first junction 131a to the current location is short passes through the first junction 131a. Furthermore, for example, when the two on-demand predefined route automated driving vehicles 100 running toward the first junction 131a are different in the remaining energy amount, the on-demand predefined route automated driving vehicle 100 with a larger remaining energy amount passes through the first junction 131a after the on-demand predefined route automated driving vehicle 100 with a smaller remaining energy amount passes through the first junction 131a.

The arbitration command signal instructs the two on-demand predefined route automated driving vehicles 100 running toward the first junction 131a so that the speed of the vehicle 100 passing through the first junction 131a second is lower than the speed of the vehicle 100 passing through the first junction 131a first.

The following will describe a specific example of a process of generating the arbitration command signal by the on-demand predefined route automated driving vehicle fleet controller 501, with reference to FIG. 10. As shown in FIG. 10, an on-demand predefined route automated driving vehicle 100D runs along the annular predefined route 131 toward the first junction 131a on the annular connected predefined route 130. An on-demand predefined route automated driving vehicle 100C runs along the connected predefined route 132 toward the first junction 131a on the annular connected predefined route 130. An on-demand predefined route automated driving vehicle 100D having received a vehicle dispatch command signal generated based on a use request from a user 701C runs in the vehicle dispatch state. The on-demand predefined route automated driving vehicle 100C has received an in-advance vehicle dispatch command signal and is running in the in-advance vehicle dispatch state. The on-demand predefined route automated driving vehicle fleet controller 501 generates an arbitration command signal for the on-demand predefined route automated driving vehicle 100C in the in-advance vehicle dispatch state so that the on-demand predefined route automated driving vehicle 100C in the in-advance vehicle dispatch state passes through the first junction 131a after the on-demand predefined route automated driving vehicle 100D in the vehicle dispatch state passes through the first junction 131a. The arbitration command signal is a signal by which the speed V4 of an on-demand predefined route automated driving vehicle 100C in the arbitration state is set so that the on-demand predefined route automated driving vehicle 100C in the in-advance vehicle dispatch state does not enter the first junction 131a while the on-demand predefined route automated driving vehicle 100D in the vehicle dispatch state is passing through the first junction 131a.

When the arbitration command signal generation process S110 is executed, the on-demand predefined route automated driving vehicle fleet controller 501 executes a sending process S108. The on-demand predefined route automated driving vehicle fleet controller 501 sends the generated arbitration command signal to an on-demand predefined route automated driving vehicle 100 which passes through the first junction 131a second among the two on-demand predefined route automated driving vehicles 100 running toward the first junction 131a (step S111). In the example shown in FIG. 10, the on-demand predefined route automated driving vehicle fleet controller 501 sends the generated arbitration command signal to the on-demand predefined route automated driving vehicle 100C in the in-advance vehicle dispatch state.

The management function 522 of the on-demand predefined route automated driving vehicle fleet controller 501 shown in FIG. 6 performs a process of controlling the running of all of on-demand predefined route automated driving vehicles 100 running along the annular connected predefined route 130, based on the acquired route information, vehicle location information, occupant existence information, anticipated riding location information, use request information, and energy information.

For example, when the planned running route of at least one of the on-demand predefined route automated driving vehicles 100 running along the annular connected predefined route 130 is changed by the vehicle dispatch function 520 and the arbitration function 521, the management function 522 of the on-demand predefined route automated driving vehicle fleet controller 501 executes the following process. The management function 522 of the on-demand predefined route automated driving vehicle fleet controller 501 performs a process of controlling the running of all of the on-demand predefined route automated driving vehicles 100 running along the annular connected predefined route 130, based on the changed planned running route of the on-demand predefined route automated driving vehicle 100.

Alternatively, for example, when a user alights from the on-demand predefined route automated driving vehicle 100 at the planned alighting location and the on-demand predefined route automated driving vehicle 100 becomes in the standby state, the management function 522 of the on-demand predefined route automated driving vehicle fleet controller 501 starts the vehicle to run and moves the vehicle to the connected predefined route 132. Alternatively, for example, when the vehicle reaches the planned riding location and an occupant rides on the vehicle but the destination has not been set, the management function 522 of the on-demand predefined route automated driving vehicle fleet controller 501 may control the vehicle to stop running. Alternatively, when the vehicle reaches the planned riding location and the occupant alights from the vehicle but the destination has not been set, the management function 522 of the on-demand predefined route automated driving vehicle fleet controller 501 may start the vehicle to run while avoiding routes of on-demand predefined route automated driving vehicles 100 different from that vehicle.

The processor 502 of the on-demand predefined route automated driving vehicle fleet controller 501 has a charging management function (not illustrated). The charging management function executes an energy supply process based on the energy information of plural on-demand predefined route automated driving vehicles 100 acquired by the on-demand predefined route automated driving vehicle fleet controller 501. In the energy supply process, when an on-demand predefined route automated driving vehicle 100 in which the remaining energy amount is equal to or smaller than a predetermined value is detected, the on-demand predefined route automated driving vehicle fleet controller 501 controls the running of that on-demand predefined route automated driving vehicle 100 in order to supply energy to the vehicle. To be more specific, the on-demand predefined route automated driving vehicle fleet controller 501 controls the on-demand predefined route automated driving vehicle 100 in which the remaining energy amount is equal to or smaller than the predetermined value to run toward a charging station.

In addition to the effects of the on-demand predefined route automated driving vehicle 100 of the above-described embodiment of the present teaching, the on-demand predefined route automated driving vehicle 100 of the specific example of the embodiment of the present teaching exerts the following effects.

The on-demand predefined route automated driving vehicle 100 is dispatched to the anticipated riding location information in advance, based on the anticipated riding location information which is generated based on at least one of the information related to a user, the information related to a destination, or the information related to environment. The annular connected predefined route 130 is a predefined route which is in a runnable area 140 and is determined in advance. The annular connected predefined route 130 is therefore limited within the runnable area 140 and is relatively small in size. For this reason, sets of information of users 701 in the vicinity of the annular connected predefined route 130 are limited to those in the runnable area 140, and hence such a relatively small number of sets of information can be collected easily. Sets of information of destinations in the vicinity of the annular connected predefined route 130 are limited to those in the runnable area 140, and hence such a relatively small number of sets of information can be collected easily. Sets of information of environment related to the annular connected predefined route are limited to those in the runnable area 140, and hence such a relatively small number of sets of information can be collected easily. Furthermore, because the annular connected predefined route 130 is provided within the runnable area 140, a location where a user 701 is likely to ride on a vehicle can be anticipated relatively easily.

On this account, when the on-demand predefined route automated driving vehicle 100 is dispatched in advance, the vehicles are controlled with better energy efficiency, as compared to a case where the on-demand predefined route automated driving vehicle 100 is not dispatched in advance and is dispatched after receiving a vehicle dispatch command signal. This makes it possible to further reduce the energy consumption of the on-demand predefined route automated driving vehicle 100 in a state of having not received a vehicle dispatch command signal. The energy storage amount of each vehicle is therefore reduced and the degree of freedom in designing the vehicles is further improved.

In addition to the above, it is possible to more accurately cause the on-demand predefined route automated driving vehicle 100 which has not received a vehicle dispatch command signal to be on standby at or around a location on the annular connected predefined route 130, where a user 701 is anticipated to ride on the vehicle. The waiting time of users 701 is therefore shortened.

On this account, with the on-demand predefined route automated driving vehicle 100 of the specific example, the waiting time of a user 701 who has made a use request is further shortened, and the degree of freedom in designing the vehicle is further improved as the energy storage amount is reduced.

Based on the anticipated riding location and the anticipated riding location use request time, the on-demand predefined route automated driving vehicle 100 is dispatched to the anticipated riding location before the anticipated riding location use time comes. The annular connected predefined route 130 is a predefined route which is in a runnable area 140 and is determined in advance. The annular connected predefined route 130 is therefore limited within the runnable area 140 and is relatively small in size. Because the annular connected predefined route 130 is provided within the runnable area 140, it is relatively easy to generate an anticipated riding location use request time at which a user is anticipated to make a use request to ride on a vehicle from an anticipated riding location.

For this reason, when the on-demand predefined route automated driving vehicle 100 is dispatched in advance based on the anticipated riding location and the anticipated riding location use request time, the vehicles are controlled with better energy efficiency, as compared to a case where the on-demand predefined route automated driving vehicle 100 is dispatched in advance based solely on the anticipated riding location. This makes it possible to further reduce the energy consumption of the on-demand predefined route automated driving vehicle 100 in a state of having not received a vehicle dispatch command signal. The energy storage amount of each vehicle is therefore reduced and the degree of freedom in designing the vehicles is further improved.

In addition to the above, it is possible to cause the on-demand predefined route automated driving vehicle 100 which has not received a vehicle dispatch command signal to be on standby at or around a location on the annular connected predefined route 130, where a user 701 is anticipated to ride on the vehicle, before a time at which the user 701 is anticipated to ride on the vehicle comes. The waiting time of users 701 is therefore shortened.

On this account, with the on-demand predefined route automated driving vehicle 100 of the specific example, the waiting time of a user who has made a use request is further shortened, and the degree of freedom in designing the vehicle is further improved as the energy storage amount is reduced.

An arbitration command signal is sent to the on-demand predefined route automated driving vehicle 100C in the following case, for example. For example, assume that an on-demand predefined route automated driving vehicle 100C is in the in-advance vehicle dispatch state whereas an on-demand predefined route automated driving vehicle 100A is in the vehicle dispatch state. When the on-demand predefined route automated driving vehicle 100A is running along the annular predefined route 131 toward the first junction 131a, the on-demand predefined route automated driving vehicle 100C running along the connected predefined route 132 toward the first junction 131a decelerates or stops based on a received arbitration command signal. In other words, when the on-demand predefined route automated driving vehicle 100A is running along the annular predefined route 131 toward the first junction 131a, the on-demand predefined route automated driving vehicle 100C running along the connected predefined route 132 toward the first junction 131a waits based on the arbitration command signal so that the vehicle 100C passes through the first junction 131a after the on-demand predefined route automated driving vehicle 100A passes through the first junction 131a. The on-demand predefined route automated driving vehicle 100A running along the annular predefined route 131 toward the first junction 131a passes through the first junction 131a before the on-demand predefined route automated driving vehicle 100C running along the connected predefined route 132 toward the first junction 131a passes through the first junction 131a.

On this account, when the on-demand predefined route automated driving vehicle 100A is running along the annular predefined route 131 toward the first junction 131a and the on-demand predefined route automated driving vehicle 100C is running along the connected predefined route 132 toward the first junction 131a, it is possible to cause these two on-demand predefined route automated driving vehicles 100A and 100C to smoothly pass through the first junction 131a. With this arrangement, the on-demand predefined route automated driving vehicles 100 are able to smoothly run even when the number of connected predefined routes connected to the annular connected predefined route 130 is increased. Furthermore, the number of on-demand predefined route automated driving vehicles 100 running along the annular connected predefined route 130 can be increased. The waiting time of users 701 is therefore shortened.

When the number of the on-demand predefined route automated driving vehicles 100 runnable on the annular connected predefined route 130 is increased, the distance from the current location of the on-demand predefined route automated driving vehicle 100 having no occupant and having not received a vehicle dispatch command signal to the planned riding location may be shortened. It is therefore possible to further reduce the energy consumption amount of each on-demand predefined route automated driving vehicle 100.

On this account, with the on-demand predefined route automated driving vehicle 100 of the specific example, the waiting time of a user 701 who has made a use request is further shortened, and the degree of freedom in designing the vehicle is further improved as the energy storage amount is further reduced.

The maximum number of occupants on the on-demand predefined route automated driving vehicle 100 is eight. As compared to a case where the maximum number of occupants is more than eight, the weight of the on-demand predefined route automated driving vehicle is small. As compared to a case where the maximum number of occupants is more than eight, the total weight of the on-demand predefined route automated driving vehicle with the occupants is small. It is therefore possible to improve the energy efficiency of each on-demand predefined route automated driving vehicle. In other words, it is possible to improve the degree of freedom in designing the vehicles by reducing the energy storage amount of each on-demand predefined route automated driving vehicle.

On this account, with the on-demand predefined route automated driving vehicle 100 of the specific example, the waiting time of a user 701 who has made a use request is shortened, and the degree of freedom in designing the vehicle is further improved as the energy storage amount is further reduced.

When the speed of the on-demand predefined route automated driving vehicle 100 running toward the anticipated riding location based on the in-advance vehicle dispatch command signal is controlled to be 40 km per hour or less, the air resistance of the on-demand predefined route automated driving vehicle 100 is small as compared to a case where the vehicle running toward the anticipated riding location based on the in-advance vehicle dispatch command signal is controlled so that the speed in the vehicle dispatch state is higher than 40 km per hour. It is therefore possible to reduce the energy consumption amount of each on-demand predefined route automated driving vehicle 100.

When the speed of the vehicle running toward the anticipated riding location based on the in-advance vehicle dispatch command signal is controlled to be 40 km per hour or less, the time of the running of the on-demand predefined route automated driving vehicle 100 from the current location to the anticipated riding location is long as compared to a case where the vehicle running toward the anticipated riding location based on the in-advance vehicle dispatch command signal is controlled so that the speed of the vehicle is higher than 40 km per hour. Meanwhile, the number of the on-demand predefined route automated driving vehicles 100 running along the annular connected predefined route 130 can be increased. It is therefore possible to dispatch an on-demand predefined route automated driving vehicle 100 whose current location is close to the anticipated riding location, in advance. The waiting time of users is therefore shortened.

On this account, with the on-demand predefined route automated driving vehicle 100 of the specific example, the waiting time of a user 701 who has made a use request is shortened, and the degree of freedom in designing the vehicle is further improved as the energy storage amount is further reduced.

The on-demand predefined route automated driving vehicle 100 is controlled so that the speed of the vehicle in the vehicle dispatch state is 20 km per hour. When the speed of the vehicle in the vehicle dispatch state is controlled to be 40 km per hour or less, the air resistance of the on-demand predefined route automated driving vehicle 100 is small as compared to a case where the speed in the vehicle dispatch state is higher than 40 km per hour. It is therefore possible to reduce the energy consumption amount of each on-demand predefined route automated driving vehicle 100.

When the speed in the vehicle dispatch state is controlled to 40 km per hour or less, the time required by the on-demand predefined route automated driving vehicle 100 to run from the current location to the planned riding location is long as compared to a case where the speed in the vehicle dispatch state is controlled to be higher than 40 km per hour. Meanwhile, the number of the on-demand predefined route automated driving vehicles 100 running along the annular connected predefined route 130 can be increased. It is therefore possible to dispatch an on-demand predefined route automated driving vehicle 100 whose current location is close to the planned riding location. The waiting time of users 701 is therefore shortened.

On this account, with the on-demand predefined route automated driving vehicle 100 of the specific example, the waiting time of a user 701 who has made a use request is shortened, and the degree of freedom in designing the vehicle is further improved as the energy storage amount is further reduced.

The on-demand predefined route automated driving vehicle fleet controller 501 selects a vehicle to be dispatched to the anticipated riding location in advance from vehicles having not received a vehicle dispatch command signal among the on-demand predefined route automated driving vehicles 100, based on the remaining energy amount of each of the on-demand predefined route automated driving vehicles 100. For example, an on-demand predefined route automated driving vehicle 100 which has a remaining energy amount sufficiently larger than the energy amount required to run from the current location to the anticipated riding location is selected as a vehicle to be dispatched to the anticipated riding location in advance by the on-demand predefined route automated driving vehicle fleet controller 501. In other words, an on-demand predefined route automated driving vehicle 100 having a large remaining energy amount is preferentially dispatched to the anticipated riding location in advance. The frequency of the supply of energy to the on-demand predefined route automated driving vehicles 100 is reduced. On this account, it is possible to improve the overall energy efficiency of the on-demand predefined route automated driving vehicles 100. It is therefore possible to improve the degree of freedom in designing the vehicles by reducing the energy storage amount of each on-demand predefined route automated driving vehicle 100.

On this account, with the on-demand predefined route automated driving vehicle 100 of the specific example, the waiting time of a user 701 who has made a use request is shortened, and the degree of freedom in designing the vehicle is further improved as the energy storage amount is further reduced.

The on-demand predefined route automated driving vehicle 100 sends information related to its remaining energy amount to the on-demand predefined route automated driving vehicle fleet controller 501. The on-demand predefined route automated driving vehicle fleet controller 501 selects a vehicle to be dispatched to the anticipated riding location in advance from vehicles having not received a vehicle dispatch command signal among the on-demand predefined route automated driving vehicles 100, based on a more accurate remaining energy amount of each of the on-demand predefined route automated driving vehicles 100 sent to the on-demand predefined route automated driving vehicle fleet controller 501. For example, an on-demand predefined route automated driving vehicle 100 which has a remaining energy amount sufficiently larger than the energy amount required to run from the current location to the anticipated riding location is further accurately selected as a vehicle to be dispatched to the anticipated riding location in advance by the on-demand predefined route automated driving vehicle fleet controller 501. In other words, an on-demand predefined route automated driving vehicle 100 having a large remaining energy amount is preferentially dispatched to the anticipated riding location in advance, further accurately. The frequency of the supply of energy to the on-demand predefined route automated driving vehicles 100 is therefore reduced further accurately. On this account, it is possible to further improve the overall energy efficiency of the on-demand predefined route automated driving vehicles 100. It is therefore possible to improve the degree of freedom in designing the vehicles by further reducing the energy storage amount of each on-demand predefined route automated driving vehicle 100.

On this account, with the on-demand predefined route automated driving vehicle 100 of the specific example, the waiting time of a user 701 who has made a use request is shortened, and the degree of freedom in designing the vehicle is further improved as the energy storage amount is further reduced.

The in-advance vehicle dispatch command signal is generated by the on-demand predefined route automated driving vehicle fleet controller 501 based on the route information, the vehicle location information, the occupant existence information, the anticipated riding location information, and the energy information. The anticipated riding location information includes an anticipated riding location and an anticipated alighting location. The anticipated alighting location is generated based on at least one of the information related to a user, the information related to a destination, or the information related to environment. The on-demand predefined route automated driving vehicle fleet controller 501 therefore dispatches, to the anticipated riding location in advance, an on-demand predefined route automated driving vehicle 100 which is selected based on the current locations, the anticipated riding location, the anticipated alighting location, and the remaining energy amounts of the on-demand predefined route automated driving vehicles 100. For example, the on-demand predefined route automated driving vehicle fleet controller 501 is able to dispatch, to the anticipated riding location in advance, an on-demand predefined route automated driving vehicle 100 having a remaining energy amount sufficient to run from the current location to the anticipated alighting location via the anticipated riding location. On this account, it is possible to improve the overall energy efficiency of the on-demand predefined route automated driving vehicles 100. It is therefore possible to improve the degree of freedom in designing the vehicles by reducing the energy storage amount of each on-demand predefined route automated driving vehicle 100.

On this account, with the on-demand predefined route automated driving vehicle 100 of the specific example, the waiting time of a user 701 who has made a use request is further shortened, and the degree of freedom in designing the vehicle is further improved as the energy storage amount is further reduced.

In addition to the effects of the on-demand predefined route automated driving vehicle fleet controller 501 of the above-described embodiment of the present teaching, the on-demand predefined route automated driving vehicle fleet controller 501 of the specific example of the embodiment of the present teaching exerts the following effects.

The on-demand predefined route automated driving vehicle 100 is dispatched to the anticipated riding location information in advance, based on the anticipated riding location information which is generated based on at least one of the information related to a user, the information related to a destination, or the information related to environment. The annular connected predefined route 130 is a predefined route which is in a runnable area 140 and is determined in advance. The annular connected predefined route 130 is therefore limited within the runnable area 140 and is relatively small in size. For this reason, sets of information of users 701 in the vicinity of the annular connected predefined route 130 are limited to those in the runnable area 140, and hence such a relatively small number of sets of information can be collected easily. Sets of information of destinations in the vicinity of the annular connected predefined route 130 are limited to those in the runnable area 140, and hence such a relatively small number of sets of information can be collected easily. Sets of information of environment related to the annular connected predefined route 130 are limited to those in the runnable area 140, and hence such a relatively small number of sets of information can be collected easily. Furthermore, because the annular connected predefined route 130 is provided within the runnable area, a location where a user is likely to ride on a vehicle can be anticipated relatively easily.

On this account, the on-demand predefined route automated driving vehicles 100 are controlled with better energy efficiency, as compared to a case where a vehicle moves after receiving a vehicle dispatch command signal. This makes it possible to further reduce the energy consumption of the on-demand predefined route automated driving vehicle 100 in a state of having not received a vehicle dispatch command signal. On this account, the running of the on-demand predefined route automated driving vehicle 100 is controlled so that the energy consumption is suppressed. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

In addition to the above, it is possible to more accurately cause the on-demand predefined route automated driving vehicle 100 which has no occupant and has not received a vehicle dispatch command signal to be on standby at or around a location on the annular connected predefined route 130, where a user 701 is anticipated to ride on the vehicle. The waiting time of users 701 is therefore shortened.

The on-demand predefined route automated driving vehicle fleet controller 501 of the specific example is therefore able to further suppress the processing load on the on-demand predefined route automated driving vehicle fleet controller 501 while further shortening the waiting time of the user 701 who has made the use request.

Based on the anticipated riding location information and the anticipated riding location use request time, the on-demand predefined route automated driving vehicle 100 is dispatched to the anticipated riding location in advance. The annular connected predefined route 130 is a predefined route which is in a runnable area 140 and is determined in advance. The annular connected predefined route 130 is therefore limited within the runnable area and is relatively small in size. Because the annular connected predefined route 130 is provided within the runnable area 140, it is relatively easy to generate an anticipated riding location use request time at which a user is anticipated to make a use request to ride on a vehicle from an anticipated riding location.

For this reason, when the on-demand predefined route automated driving vehicle 100 is dispatched in advance based on the anticipated riding location and the anticipated riding location use request time, the vehicles are controlled with better energy efficiency, as compared to a case where the on-demand predefined route automated driving vehicle 100 is dispatched in advance and is dispatched based solely on the anticipated riding location. This makes it possible to further reduce the energy consumption of the on-demand predefined route automated driving vehicle 100 in a state of having not received a vehicle dispatch command signal. On this account, the running of the on-demand predefined route automated driving vehicle 100 is controlled so that the energy consumption is suppressed. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

In addition to the above, it is possible to cause the on-demand predefined route automated driving vehicle 100 which has no occupant and has not received a vehicle dispatch command signal to be on standby at or around a location on the annular connected predefined route 130, where a user 701 is anticipated to ride on the vehicle, before a time at which the user 701 is anticipated to ride on the vehicle comes. The waiting time of users 701 is therefore shortened.

The on-demand predefined route automated driving vehicle fleet controller 501 of the specific example is therefore able to further suppress the processing load on the on-demand predefined route automated driving vehicle fleet controller 501 while further shortening the waiting time of the user 701 who has made the use request.

An arbitration command signal is sent to the on-demand predefined route automated driving vehicle 100C in the following case, for example. For example, assume that an on-demand predefined route automated driving vehicle 100C is in the in-advance vehicle dispatch state whereas an on-demand predefined route automated driving vehicle 100A is in the vehicle dispatch state. When the on-demand predefined route automated driving vehicle 100A is running along the annular predefined route 131 toward the first junction 131a, the on-demand predefined route automated driving vehicle 100C running along the connected predefined route 132 toward the first junction 131a decelerates or stops based on a received arbitration command signal. In other words, when the on-demand predefined route automated driving vehicle 100A is running along the annular predefined route 131 toward the first junction 131a, the on-demand predefined route automated driving vehicle 100C running along the connected predefined route 132 toward the first junction 131a waits based on the arbitration command signal so that the vehicle 100C passes through the first junction 131a after the on-demand predefined route automated driving vehicle 100A passes through the first junction 131a. The on-demand predefined route automated driving vehicle 100A running along the annular predefined route 131 toward the first junction 131a passes through the first junction 131a before the on-demand predefined route automated driving vehicle 100C running along the connected predefined route 132 toward the first junction 131a passes through the first junction 131a.

On this account, when the on-demand predefined route automated driving vehicle 100A is running along the annular predefined route 131 toward the first junction 131a and the on-demand predefined route automated driving vehicle 100C is running along the connected predefined route 132 toward the first junction 131a, it is possible to cause these two on-demand predefined route automated driving vehicles 100A and 100C to smoothly pass through the first junction 131a. With this arrangement, the on-demand predefined route automated driving vehicles 100 are able to smoothly run even when the number of connected predefined routes connected to the annular connected predefined route 130 is increased. Furthermore, the number of on-demand predefined route automated driving vehicles 100 running along the annular connected predefined route 130 can be increased. The waiting time of users 701 is therefore shortened.

When the number of the on-demand predefined route automated driving vehicles 100 runnable on the annular connected predefined route 130 is increased, the distance from a current location of the on-demand predefined route automated driving vehicle 100 having no occupant and having not received a vehicle dispatch command signal to the anticipated riding location may be shortened. On this account, the running of the on-demand predefined route automated driving vehicle 100 is controlled so that the energy consumption is suppressed. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

The on-demand predefined route automated driving vehicle fleet controller 501 of the specific example is therefore able to further suppress the processing load on the on-demand predefined route automated driving vehicle fleet controller 501 while further shortening the waiting time of the user 701 who has made the use request.

The maximum number of occupants on the on-demand predefined route automated driving vehicle 100 is four. As compared to a case where the maximum number of occupants is more than eight, the weight of the on-demand predefined route automated driving vehicle 100 is small. As compared to a case where the maximum number of occupants is more than eight, the total weight of the on-demand predefined route automated driving vehicle 100 with the occupants is small. It is therefore possible to improve the energy efficiency of each on-demand predefined route automated driving vehicle 100. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

The on-demand predefined route automated driving vehicle fleet controller 501 of the specific example is therefore able to further suppress the processing load on the on-demand predefined route automated driving vehicle fleet controller 501 while further shortening the waiting time of the user 701 who has made the use request.

When the speed of the on-demand predefined route automated driving vehicle 100 running toward the anticipated riding location based on the in-advance vehicle dispatch command signal is controlled to be 40 km per hour or less, the air resistance of the on-demand predefined route automated driving vehicle 100 is small as compared to a case where the vehicle running toward the anticipated riding location based on the in-advance vehicle dispatch command signal is controlled so that the speed is higher than 40 km per hour. It is therefore possible to reduce the energy consumption amount of each on-demand predefined route automated driving vehicle 100. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

When the speed of the vehicle running toward the anticipated riding location based on the in-advance vehicle dispatch command signal is controlled to be 40 km per hour or less, the time of the running of the on-demand predefined route automated driving vehicle 100 from the current location to the anticipated riding location is long as compared to a case where the vehicle running toward the anticipated riding location based on the in-advance vehicle dispatch command signal is controlled so that the speed in the vehicle dispatch state is higher than 40 km per hour. Meanwhile, the number of the on-demand predefined route automated driving vehicles 100 running along the annular connected predefined route 130 can be increased. It is therefore possible to dispatch in advance an on-demand predefined route automated driving vehicle 100 whose current location is close to the anticipated riding location. The waiting time of users is therefore shortened.

The on-demand predefined route automated driving vehicle fleet controller 501 of the specific example is therefore able to suppress the processing load on the on-demand predefined route automated driving vehicle fleet controller 501 while shortening the waiting time of the user who has made the use request.

The speed of the on-demand predefined route automated driving vehicle 100 in the vehicle dispatch state is 20 km per hour. When the speed of the vehicle in the vehicle dispatch state is controlled to be 40 km per hour or less, the air resistance of the on-demand predefined route automated driving vehicle 100 is small as compared to a case where the speed in the vehicle dispatch state is higher than 40 km per hour. It is therefore possible to reduce the energy consumption amount of each on-demand predefined route automated driving vehicle 100. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

When the speed in the vehicle dispatch state is controlled to 40 km per hour or less, the time required by the on-demand predefined route automated driving vehicle 100 to run from the current location to the planned riding location is long as compared to a case where the speed in the vehicle dispatch state is controlled to be higher than 40 km per hour. Meanwhile, the number of the on-demand predefined route automated driving vehicles 100 running along the annular connected predefined route 130 can be increased. It is therefore possible to dispatch an on-demand predefined route automated driving vehicle 100 whose current location is close to the planned riding location. The waiting time of users 701 is therefore shortened.

The on-demand predefined route automated driving vehicle fleet controller 501 of the specific example is therefore able to suppress the processing load on the on-demand predefined route automated driving vehicle fleet controller 501 while shortening the waiting time of the user 701 who has made the use request.

The on-demand predefined route automated driving vehicle fleet controller 501 selects a vehicle to be dispatched to the anticipated riding location in advance from vehicles having not received a vehicle dispatch command signal among the on-demand predefined route automated driving vehicles 100, based on the remaining energy amount of each of the on-demand predefined route automated driving vehicles 100. For example, an on-demand predefined route automated driving vehicle 100 which has a remaining energy amount sufficiently larger than the energy amount required to run from the current location to the anticipated riding location is selected as a vehicle to be dispatched to the anticipated riding location in advance by the on-demand predefined route automated driving vehicle fleet controller 501. In other words, an on-demand predefined route automated driving vehicle 100 having a large remaining energy amount is preferentially dispatched to the anticipated riding location in advance. The frequency of the supply of energy to the on-demand predefined route automated driving vehicles 100 is reduced. The processing load on the on-demand predefined route automated driving vehicle fleet controller 501 is therefore reduced.

The on-demand predefined route automated driving vehicle fleet controller 501 of the specific example is therefore able to suppress the processing load on the on-demand predefined route automated driving vehicle fleet controller 501 while shortening the waiting time of the user 701 who has made the use request.

Each of the on-demand predefined route automated driving vehicle 100 on the annular connected predefined route 130 sends information related to its remaining energy amount to the on-demand predefined route automated driving vehicle fleet controller 501. The on-demand predefined route automated driving vehicle fleet controller 501 selects a vehicle to be dispatched to the anticipated riding location in advance from vehicles having not received a vehicle dispatch command signal among the on-demand predefined route automated driving vehicles 100, based on a more accurate remaining energy amount of each of the on-demand predefined route automated driving vehicles 100 sent to the on-demand predefined route automated driving vehicle fleet controller 501. For example, an on-demand predefined route automated driving vehicle 100 which has a remaining energy amount sufficiently larger than the energy amount required to run from the current location to the anticipated riding location is further accurately selected as a vehicle to be dispatched to the anticipated riding location in advance by the on-demand predefined route automated driving vehicle fleet controller 501. In other words, an on-demand predefined route automated driving vehicle 100 having a large remaining energy amount is preferentially dispatched to the anticipated riding location in advance further accurately. The frequency of the supply of energy to the on-demand predefined route automated driving vehicles 100 is therefore reduced further accurately. The processing load on the on-demand predefined route automated driving vehicle fleet controller 501 is therefore further reduced.

The on-demand predefined route automated driving vehicle fleet controller 501 of the specific example is therefore able to suppress the processing load on the on-demand predefined route automated driving vehicle fleet controller 501 while shortening the waiting time of the user 701 who has made the use request.

The in-advance vehicle dispatch command signal is generated by the on-demand predefined route automated driving vehicle fleet controller 501 based on the route information, the vehicle location information, the occupant existence information, the anticipated riding location information, and the energy information. The anticipated riding location information includes an anticipated riding location and an anticipated alighting location. The anticipated alighting location is generated based on at least one of the information related to a user, the information related to a destination, or the information related to environment. The on-demand predefined route automated driving vehicle fleet controller 501 therefore dispatches, to the anticipated riding location in advance, an on-demand predefined route automated driving vehicle 100 which is selected based on the current locations, the anticipated riding location, the anticipated alighting location, and the remaining energy amounts of the on-demand predefined route automated driving vehicles 100. For example, the on-demand predefined route automated driving vehicle fleet controller 501 is able to dispatch, to the anticipated riding location in advance, an on-demand predefined route automated driving vehicle 100 having a remaining energy amount sufficient to run from the current location to the anticipated alighting location via the anticipated riding location. On this account, it is possible to improve the overall energy efficiency of the on-demand predefined route automated driving vehicles 100. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

The on-demand predefined route automated driving vehicle fleet controller 501 of the specific example is therefore able to suppress the processing load on the on-demand predefined route automated driving vehicle fleet controller 501 while shortening the waiting time of the user 701 who has made the use request.

(Modification of On-Demand Predefined Route Automated Driving Vehicle and On-Demand Predefined Route Automated Driving Vehicle Fleet Controller of Present Embodiment)

Figure 11:
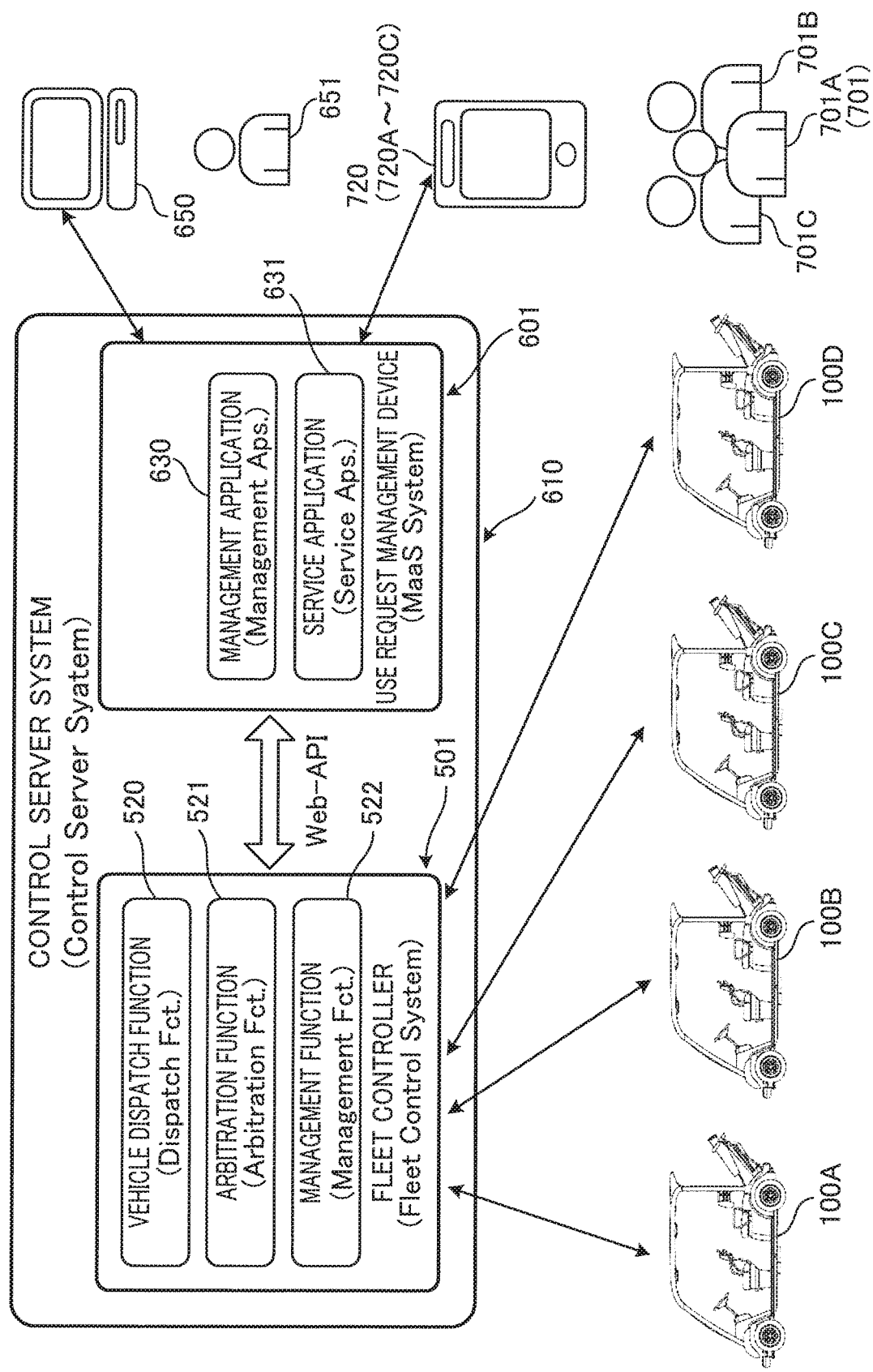
FIG. 11 shows arrangements of the on-demand predefined route automated driving vehicle fleet controller and a use request management device of the specific example.

The following will describe a modification of the on-demand predefined route automated driving vehicle and the on-demand predefined route automated driving vehicle fleet controller of the above-described embodiment of the present teaching, with reference to FIG. 11. In the descriptions below, items identical with those in the embodiment above of the present teaching and its specific example are not explained again. Basically, a modification of the embodiment of the present teaching encompasses all features of the embodiment of the present teaching described above. The following will describe arrangements which are different from those of the above-described specific example of the embodiment of the present teaching.

An on-demand predefined route automated driving vehicle fleet controller 501 is arranged to be able to send and receive information to and from a use request management device 601. The on-demand predefined route automated driving vehicle fleet controller 501 is also termed as a fleet control system. Meanwhile, the use request management device 601 is also termed as a MaaS system. The on-demand predefined route automated driving vehicle fleet controller 501 and the use request management device 601 are able to communicate with each other through an Web API (WEB Application Programming Interface). The use request management device 601 is arranged to be able to send and receive information to and from information terminals 720 (720A to 720C) held by users 701 (701A, 701B, and 701C). The on-demand predefined route automated driving vehicle fleet controller 501 and the use request management device 601 constitute a controller server system 610. The controller server system 610 is physically constituted by the on-demand predefined route automated driving vehicle fleet controller 501 and the use request management device 601 which are different devices.

In FIG. 11, one on-demand predefined route automated driving vehicle fleet controller 501 is arranged to be able to send and receive information to and from one use request management device 601. The disclosure, however, is not limited to this arrangement. One on-demand predefined route automated driving vehicle fleet controller 501 may be arranged to be able to send and receive information to and from plural use request management devices 601. Each of the use request management devices 601 may be arranged to be able to send and receive information to and from the information terminals 720 of the users 701.

The use request management device 601 includes a processor, a storage unit, and a transmitter-receiver which are not illustrated. The transmitter-receiver is arranged to be able to send and receive information to and from the on-demand predefined route automated driving vehicle fleet controller 501 and the information terminals 720. The transmitter-receiver is, for example, an antenna such as a dipole antenna. The use request management device 601 may be physically a single device or a combination of plural devices. When the use request management device 601 is physically a combination of plural devices, each device includes a calculation unit and a storage unit. The use request management device 601 is arranged to be able to send and receive information to and from an operation terminal 650. The operation terminal 650 is operated by an operator 651.

In the use request management device 601, a management application 630 and a service application 631 stored in a storage unit are executed by a processor.

The management application 630 is an application for managing transmission of information between the on-demand predefined route automated driving vehicle fleet controller 501 and the use request management device 601 and for providing information to the operation terminal 650. The management application 630 sends and receives information to and from a management function 522 of the on-demand predefined route automated driving vehicle fleet controller 501. The information acquired by the management application 630 can be optionally set by the operator 651 who operates the use request management device 601. The management application 630 is able to provide information to the operation terminal 650 in accordance with the use of the use request management device 601.

The service application 631 is an application for providing various services for users 701 through the information terminals 720. The management application 630 sends and receives information to and from a vehicle dispatch function 520 of the on-demand predefined route automated driving vehicle fleet controller 501. When receiving a use request input to the information terminal 720 from a user 701, the service application 631 sends use request information to the on-demand predefined route automated driving vehicle fleet controller 501. In this modification, information related to a use request of a user 701 shown in FIG. 8 is transmitted between the information terminal 720 and the use request management device 601. The use request management device 601 sends the information related to the use request from the user 701, which is sent from the information terminal 720, to the on-demand predefined route automated driving vehicle fleet controller 501, as use request information. The service application 631 is able to set information which can be input and provided from the operation terminal 650, in accordance with the use of the use request management device 601.

In the information acquisition process S101 shown in FIG. 7, the on-demand predefined route automated driving vehicle fleet controller 501 acquires anticipated riding location information generated by and sent from the use request management device 601.

In an information acquisition process S101 shown in FIG. 7, the on-demand predefined route automated driving vehicle fleet controller 501 acquires use request information from the use request management device 601.

In a vehicle dispatch command signal generation process S104 shown in FIG. 7, the on-demand predefined route automated driving vehicle fleet controller 501 generates a vehicle dispatch command signal which controls a vehicle selected from on-demand predefined route automated driving vehicles 100 to run toward a planned riding location of the user included in the use request received by the use request management device 601.

When receiving the vehicle dispatch command signal from the on-demand predefined route automated driving vehicle fleet controller 501, the vehicle-mounted controller 115 of the on-demand predefined route automated driving vehicle 100 performs control as described below. Based on the vehicle dispatch command signal, the vehicle-mounted controller 115 of the on-demand predefined route automated driving vehicle 100 controls the drive mechanism 112, the brake mechanism 113, and the traveling direction control mechanism 114 so that the vehicle runs toward the planned riding location of the user included in the use request received by the use request management device 601.

In addition to the effects of the on-demand predefined route automated driving vehicle 100 of the above-described embodiment of the present teaching and the effect of the on-demand predefined route automated driving vehicle 100 of the specific example of the embodiment, the on-demand predefined route automated driving vehicle 100 of the specific example of the embodiment of the present teaching exerts the following effects.

The use request from the user 701 is sent from the information terminal 720 held by the user 701 to the on-demand predefined route automated driving vehicle fleet controller 501, via at least one use request management device 601. The user 701 sends the use request from the information terminal 720 to the use request management device 601 which is arranged to be able to communicate with the on-demand predefined route automated driving vehicle fleet controller 501. Plural use request management devices 601 can be provided for one on-demand predefined route automated driving vehicle fleet controller 501. In other words, the on-demand predefined route automated driving vehicle fleet controller 501 is able to receive a use request of a user 701 from the information terminal 720 held by the user 701, via plural use request management devices 601. It is therefore possible to dispatch an on-demand predefined route automated driving vehicle 100 by one on-demand predefined route automated driving vehicle fleet controller 501 based on a use request from a user 701 received by the plural use request management devices 601. In other words, when one on-demand predefined route automated driving vehicle fleet controller 501 is provided for plural use request management devices 601, transmission of information between on-demand predefined route automated driving vehicle fleet controllers is unnecessary as compared to a case where an on-demand predefined route automated driving vehicle fleet controller is provided for each of use request management devices. It is therefore possible to further quickly dispatch an on-demand predefined route automated driving vehicle 100 by one on-demand predefined route automated driving vehicle fleet controller 501 based on a use request from a user 701 received by the plural use request management devices 601. The waiting time of users 701 is therefore shortened.

On this account, with the on-demand predefined route automated driving vehicle 100 of the modification, the waiting time of a user 701 who has made a use request is shortened, and the degree of freedom in designing the vehicle is improved as the energy storage amount is further reduced.

The on-demand predefined route automated driving vehicle 100 is dispatched to the anticipated riding location in advance, based on the anticipated riding location information which is generated based on at least one of the information related to a user, the information related to a destination, or the information related to environment, which are generated by the use request management device 601. The annular connected predefined route 130 is a predefined route which is in a runnable area 140 and is determined in advance. The annular connected predefined route 130 is therefore limited within the runnable area 140 and is relatively small in size. For this reason, at least one group of: sets information of users in the vicinity of the annular connected predefined route 130; sets of information related to destinations; and sets of information related to environment is limited to those in the runnable area 140, and hence such a relatively small number of sets of information can be collected easily. In addition to the above, the use request management device 601 is able to acquire information related to users, information related to destinations, and information related to environment, which reflect the use of vehicles of the users 701 around the annular connected predefined route 130. It is therefore possible to anticipate a location where a user 701 is likely to ride on a vehicle further easily.

On this account, the on-demand predefined route automated driving vehicles 100 are controlled with better energy efficiency, as compared to a case where a vehicle is dispatched after receiving a vehicle dispatch command signal. This makes it possible to further reduce the energy consumption of the on-demand predefined route automated driving vehicle 100 in a state of having not received a vehicle dispatch command signal. The energy storage amount of each vehicle is therefore reduced and the degree of freedom in designing the vehicles is further improved.

In addition to the above, it is possible to more accurately cause the on-demand predefined route automated driving vehicle 100 which has no occupant and has not received a vehicle dispatch command signal to be on standby at or around a location on the annular connected predefined route 130, where a user 701 is anticipated to ride on the vehicle. The waiting time of users 701 is therefore shortened.

On this account, with the on-demand predefined route automated driving vehicle 100 of the modification, the waiting time of a user 701 who has made a use request is further shortened, and the degree of freedom in designing the vehicle is further improved as the energy storage amount is reduced.

In addition to the effects of the on-demand predefined route automated driving vehicle fleet controller 501 of the above-described embodiment of the present teaching and the on-demand predefined route automated driving vehicle fleet controller 501 of the specific example of the embodiment, the on-demand predefined route automated driving vehicle fleet controller 501 of the modification of the embodiment of the present teaching exerts the following effects.

The use request from the user 701 is sent from the information terminal 720 held by the user 701 to the on-demand predefined route automated driving vehicle fleet controller 501, via at least one use request management device 601. The user 701 sends the use request from the information terminal 720 to the use request management device 601 which is arranged to be able to communicate with the on-demand predefined route automated driving vehicle fleet controller 501. Plural use request management devices 601 can be provided for one on-demand predefined route automated driving vehicle fleet controller 501. In other words, the on-demand predefined route automated driving vehicle fleet controller 501 is able to receive a use request of a user 701 from the information terminal 720 held by the user 701, via plural use request management devices 601. It is therefore possible to dispatch an on-demand predefined route automated driving vehicle 100 by one on-demand predefined route automated driving vehicle fleet controller 501 based on a use request from a user 701 received by the plural use request management devices 601. In other words, when one on-demand predefined route automated driving vehicle fleet controller 501 is provided for plural use request management devices 601, transmission of information between on-demand predefined route automated driving vehicle fleet controllers is unnecessary as compared to a case where an on-demand predefined route automated driving vehicle fleet controller is provided for each of use request management devices. It is therefore possible to further quickly dispatch an on-demand predefined route automated driving vehicle 100 by one on-demand predefined route automated driving vehicle fleet controller 501 based on a use request from a user 701 received by the plural use request management devices 601. The waiting time of users 701 is therefore shortened. The processing load on the on-demand predefined route automated driving vehicle fleet controller 501 is therefore reduced.

The on-demand predefined route automated driving vehicle fleet controller 501 of the modification is therefore able to suppress the processing load on the on-demand predefined route automated driving vehicle fleet controller 501 while shortening the waiting time of the user 701 who has made the use request.

The on-demand predefined route automated driving vehicle 100 is dispatched to the anticipated riding location information in advance, based on the anticipated riding location information which is generated based on at least one of the information related to a user, the information related to a destination, and the information related to environment, which are generated by the use request management device 601. The annular connected predefined route 130 is a predefined route which is in a runnable area 140 and is determined in advance. The annular connected predefined route 130 is therefore limited within the runnable area 140 and is relatively small in size. For this reason, at least one group of sets information of users in the vicinity of the annular connected predefined route 130, sets of information related to destinations, and sets of information related to environment are limited to those in the runnable area 140, and hence such a relatively small number of sets of information can be collected easily. In addition to the above, the use request management device 601 is able to acquire information related to users, information related to destinations, and information related to environment, which reflect the use of vehicles of the users around the annular connected predefined route 130. It is therefore possible to anticipate a location where a user 701 is likely to ride on a vehicle further easily.

On this account, the on-demand predefined route automated driving vehicles 100 are controlled with better energy efficiency, as compared to a case where a vehicle is dispatched after receiving a vehicle dispatch command signal. This makes it possible to further reduce the energy consumption of the on-demand predefined route automated driving vehicle 100 in a state of having not received a vehicle dispatch command signal. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

In addition to the above, it is possible to more accurately cause the on-demand predefined route automated driving vehicle 100 which has not received a vehicle dispatch command signal to be on standby at or around a location on the annular connected predefined route 130, where a user 701 is anticipated to ride on the vehicle. The waiting time of users 701 is therefore shortened.

The on-demand predefined route automated driving vehicle fleet controller 501 of the modification is therefore able to further suppress the processing load on the on-demand predefined route automated driving vehicle fleet controller 501 while further shortening the waiting time of the user 701 who has made the use request.

(Other Modifications of On-Demand Predefined Route Automated Driving Vehicle and On-Demand Predefined Route Automated Driving Vehicle Fleet Controller)

The present teaching is not limited to the above-described embodiment, the specific example of the embodiment and the modification, and various changes can be made within the scope of the claims. The following describes modifications of the embodiment of the present teaching.

<Modifications of Annular Connected Predefined Route>

Figure 12A:
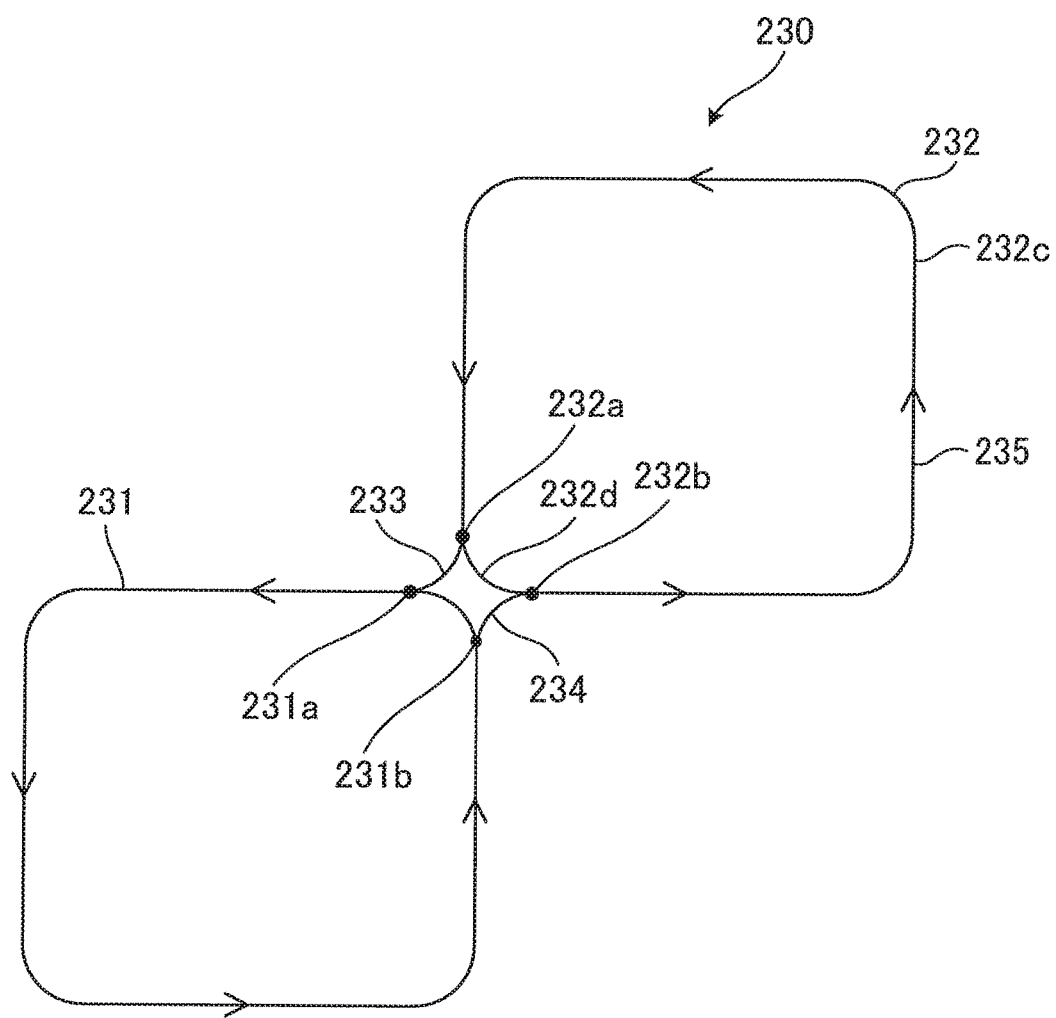
FIG. 12A is a schematic representation of an annular connected predefined route of a modification.

In the specific example of the embodiment, the annular connected predefined route 130 includes only the annular predefined route 131 and the connected predefined route 132 connected to the annular predefined route 131 so that vehicles are able to run across these routes. Alternatively, as shown in FIG. 12A, the annular connected predefined route of the present teaching may include a connected predefined route which is connected to a connected predefined route so that vehicles are able to run across these routes. Alternatively, the annular connected predefined route of the present teaching may include a connected predefined route which is connected to an annular predefined route so that vehicles cannot run across these routes. Alternatively, the annular connected predefined route of the present teaching may include an annular predefined route which is connected to an annular predefined route so that vehicles cannot run across these routes. Alternatively, the annular connected predefined route of the present teaching may include a connected predefined route which is connected to a connected predefined route so that vehicles cannot run across these routes. When a connected predefined route is connected to an annular predefined route so that vehicles cannot run across these routes, vehicles cannot run from the annular predefined route to the connected predefined route and cannot run from the connected predefined route to the annular predefined route. Alternatively, when a connected predefined route is connected to an annular predefined route so that vehicles cannot run across these routes, vehicles are able to run from the annular predefined route to the connected predefined route but cannot run from the connected predefined route to the annular predefined route. Alternatively, when a connected predefined route is connected to an annular predefined route so that vehicles cannot run across these routes, vehicles cannot run from the annular predefined route to the connected predefined route but are able to run from the connected predefined route to the annular predefined route.

An annular connected predefined route 230 shown in FIG. 12A includes a first annular predefined route 231, a second annular predefined route 232, a first connected predefined route 233, and a second connected predefined route 234. The annular connected predefined route 230 is a route along which vehicles are runnable in a direction indicated by arrows. The first connected predefined route 233 is connected to the first annular predefined route 231 and the second annular predefined route 232. The second connected predefined route 234 is connected to the first annular predefined route 231 and the second annular predefined route 232. The first connected predefined route 233 is connected to a first junction 231a of the first annular predefined route 231 and a third junction 232a of the second annular predefined route 232. The second connected predefined route 234 is connected to a second junction 231b of the first annular predefined route 231 and a fourth junction 232b of the second annular predefined route 232. The second annular predefined route 232 is constituted by a connected predefined route 232c and a connected predefined route 232d. The connected predefined route 232c and the connected predefined route 232d are bordered at the third junction 232a and the fourth junction 232b. The first connected predefined route 233, the second connected predefined route 234, and the connected predefined route 232c constitute a connected predefined route 235. The connected predefined route 235 is connected to the first annular predefined route 231 so that vehicles are able to run across the routes. The connected predefined route 232d is connected to the connected predefined route 235 so that vehicles are able to run across the routes. At the first junction 231a of the first annular predefined route 231, the first annular predefined route 231 and the connected predefined route 235 are merged. At the second junction 231b of the first annular predefined route 231, the first annular predefined route 231 and the connected predefined route 235 are branched.

Figure 12B:
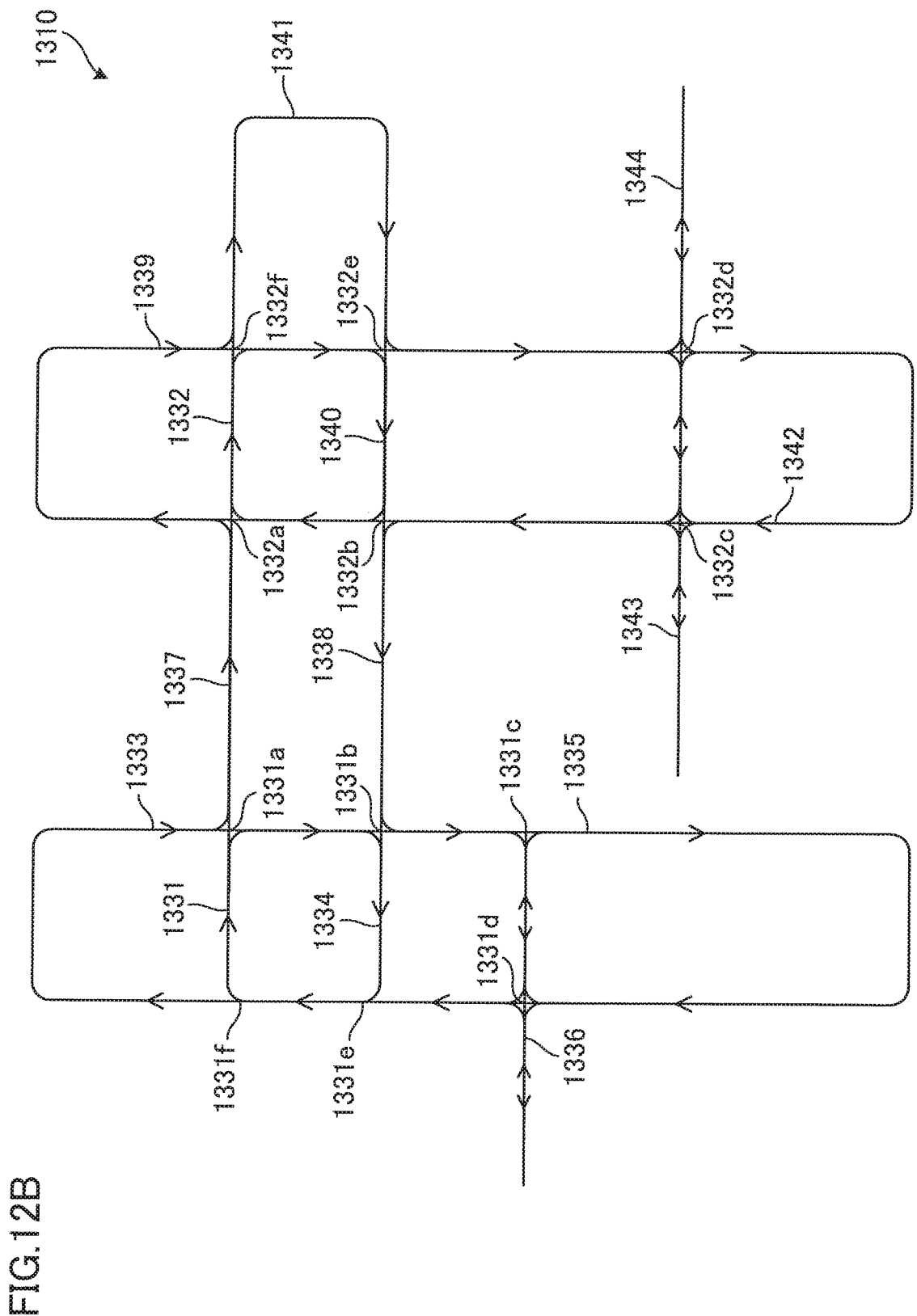
FIG. 12B is a schematic representation of an annular connected predefined route of a modification.
Figure 12C:
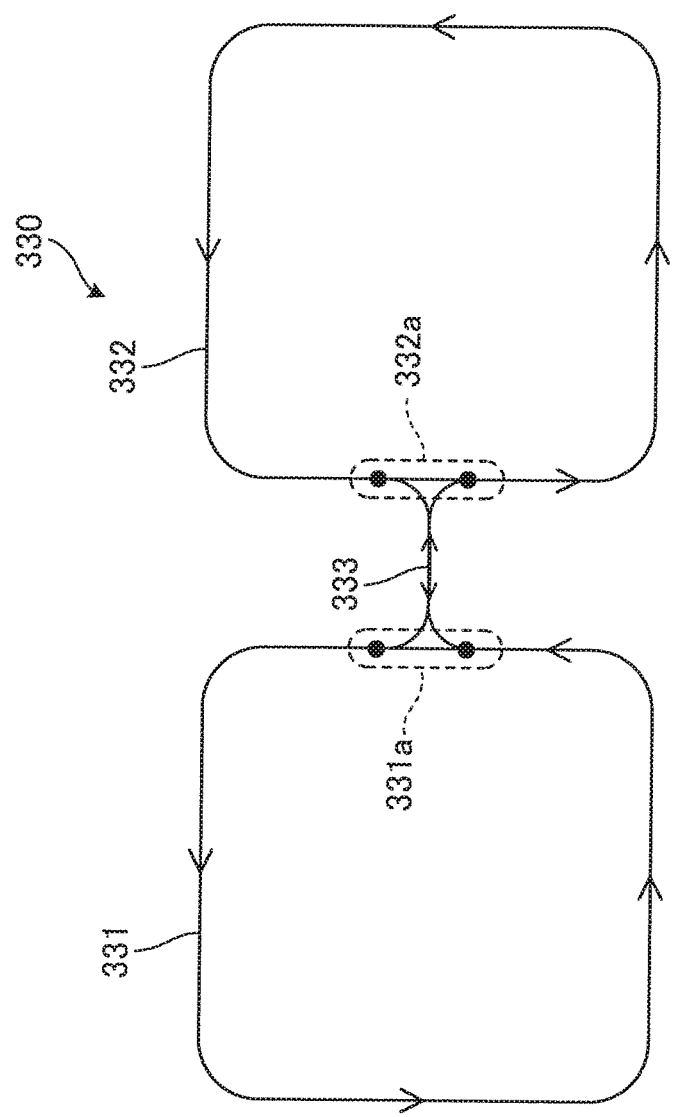
FIG. 12C is a schematic representation of an annular connected predefined route of a modification.

The annular connected predefined route of the present teaching may include one annular predefined route and plural connected predefined routes connected to the one annular predefined route so that vehicles are able to run across the routes. The annular connected predefined route of the present teaching may include plural annular predefined routes and at least one connected predefined route connected to the plural annular predefined routes so that vehicles are able to run across the routes. To be more specific, as shown in FIG. 12C, for example, the annular connected predefined route of the present teaching may include two annular predefined routes and one connected predefined route connected to the two annular predefined routes so that vehicles are able to run across the routes. As shown in FIG. 12B, for example, the annular connected predefined route of the present teaching may include plural annular predefined routes and plural connected predefined routes connected to the plural annular predefined routes so that vehicles are able to run across the routes. When the annular connected predefined route includes at least one connected predefined route connected to plural annular predefined routes so that vehicles are able to run across the routes, the number of the connected predefined routes connected to the one annular predefined route may be one, may be plural but smaller than the total number of the connected predefined routes, or may be identical with the total number of the connected predefined routes. When the annular connected predefined route includes at least one connected predefined route connected to plural annular predefined routes so that vehicles are able to run across the routes, the number of the annular predefined routes connected to the one connected predefined route may be one, may be plural but smaller than the total number of the annular predefined routes, or may be identical with the total number of the annular predefined routes. In the present teaching, one connected predefined route connected to one annular predefined route so that vehicles are able to run across the routes may be connected to two junctions on the annular predefined route as in the specific example of the embodiment, or may be connected to only one junction on the annular predefined route as shown in FIG. 12B, for example. In the present teaching, plural connected predefined routes connected to one annular predefined route so that vehicles are able run across the routes may be connected to one shared junction on the annular predefined route or may be connected to different junctions on the annular predefined route. In the present teaching, one connected predefined route which is connected to two annular predefined routes so that vehicles are able to run across the routes is, for example, as shown in FIG. 12C, connected to one junction on the first annular predefined route and one junction on the second annular predefined route.

As shown in FIG. 12C, an annular connected predefined route 330 includes a first annular predefined route 331, a second annular predefined route 332, and a connected predefined route 333. The annular connected predefined route 330 is a route along which vehicles are runnable in a direction indicated by arrows. The connected predefined route 333 is connected to both the first annular predefined route 331 and the second annular predefined route 332 so that vehicles are able to run across the vehicles. The connected predefined route 333 is connected to a junction 331a of the first annular predefined route 331 and a junction 332a of the second annular predefined route 332.

An annular connected predefined route 1310 shown in FIG. 12B includes an annular predefined route 1331, an annular predefined route 1332, and connected predefined routes 1333 to 1344. Each of the connected predefined routes 1333 to 1335 and 1336 to 1342 is a route along which vehicles are runnable in a direction indicated by arrows. Each of the connected predefined routes 1336 and 1343 is a route along which vehicles are runnable in both directions indicated by arrows. The connected predefined routes 1333 to 1338 are connected to the annular predefined route 1331. The connected predefined routes 1333 to 1335 are connected to the annular predefined route 1331 so that vehicles are able to run across the routes. The connected predefined routes 1337 to 1344 are connected to the annular predefined route 1332. The connected predefined routes 1339 to 1342 are connected to the annular predefined route 1332 so that vehicles are able to run across the routes. The annular predefined route 1331 and an annular predefined route 1332 are connected by the connected predefined route (first connected predefined route) 1337 and the connected predefined route (first connected predefined route) 1338 so that vehicles are able to run across the routes. Between a junction 1331c and a junction 1331d of the annular predefined route 1331, vehicles are able to run bi-directionally. Between a junction 1332c and a junction 1332d of the annular predefined route 1332, vehicles are able to run bi-directionally. The connected predefined route 1333 is branched from the annular predefined route 1331 at a junction 1331f and is merged with the annular predefined route 1331 at a junction 1331a. The connected predefined route 1334 is branched from the annular predefined route 1331 at a junction 1331b and is merged with the annular predefined route 1331 at a junction 1331e. The connected predefined route 1335 is branched from the annular predefined route 1331 at the junction 1331c and is merged with the annular predefined route 1331 at the junction 1331d. The connected predefined route 1336 is a route along which vehicles are able to run bi-directionally and is connected to the junction 1331d on the annular predefined route 1331 so that vehicles are able to run across the routes. The connected predefined route 1337 is branched from the annular predefined route 1331 at the junction 1331a and is merged with the annular predefined route 1332 at a junction 1332a. The connected predefined route 1338 is branched from the annular predefined route 1332 at a junction 1332b and is merged with the annular predefined route 1331 at the junction 1331b. The connected predefined route 1339 is branched from the annular predefined route 1332 at the junction 1332a and is merged with the annular predefined route 1332 at a junction 1332f. The connected predefined route 1340 is branched from the annular predefined route 1332 at a junction 1332e and is merged with the annular predefined route 1332 at the junction 1332b. The connected predefined route 1341 is branched from the annular predefined route 1332 at a junction 1332f and is merged with the annular predefined route 1332 at the junction 1332e. The connected predefined route 1342 is branched from the annular predefined route 1332 at the junction 1332d and is merged with the annular predefined route 1332 at the junction 1332c. The connected predefined route 1343 is a route along which vehicles are able to run bi-directionally and is connected to the junction 1332c on the annular predefined route 1332 so that vehicles are able to run across the routes. The connected predefined route 1344 is a route along which vehicles are able to run bi-directionally and is connected to the junction 1332d on the annular predefined route 1332 so that vehicles are able to run across the routes.

According to this arrangement, plural annular predefined routes are included in the annular connected predefined route 330, 1310 along which the on-demand predefined route automated driving vehicles 100 run. Furthermore, the number of on-demand predefined route automated driving vehicles 100 running along the annular connected predefined route 330, 1310 can be increased. The waiting time of users 701 is therefore shortened.

When the number of the on-demand predefined route automated driving vehicles 100 runnable on the annular connected predefined route is increased, the distance from the current location of the on-demand predefined route automated driving vehicle 100 to the anticipated riding location may be shortened. It is therefore possible to further reduce the energy consumption amount of each on-demand predefined route automated driving vehicle 100.

On this account, with the on-demand predefined route automated driving vehicle 100 of the present teaching, the waiting time of a user 701 who has made a use request is further shortened, and the degree of freedom in designing the vehicle is further improved as the energy storage amount is further reduced.

With the arrangement above, the annular connected predefined route 330, 1310 along which the on-demand predefined route automated driving vehicles 100 running under the control of the on-demand predefined route automated driving vehicle fleet controller 501 includes plural annular predefined routes. Furthermore, the number of on-demand predefined route automated driving vehicles 100 running along the annular connected predefined route 330, 1310 can be increased. The waiting time of users 701 is therefore shortened.

When the number of the on-demand predefined route automated driving vehicles 100 runnable on the annular connected predefined route is increased, the distance from the current location of the on-demand predefined route automated driving vehicle 100 to the anticipated riding location may be shortened. It is therefore possible to further reduce the energy consumption amount of each on-demand predefined route automated driving vehicle 100. In other words, the total energy consumption of the on-demand predefined route automated driving vehicles 100 is lowered. The frequency of the supply of energy to the on-demand predefined route automated driving vehicles 100 is reduced. The processing load on the on-demand predefined route automated driving vehicle fleet controller 501 is therefore reduced.

The on-demand predefined route automated driving vehicle fleet controller 501 of the present teaching is therefore able to suppress the processing load on the on-demand predefined route automated driving vehicle fleet controller 501 while further shortening the waiting time of the user 701 who has made the use request.

<Modification of Predefined Route Along which On-Demand Predefined Route Automated Driving Vehicle Runs>

In the embodiment and its specific example, the on-demand predefined route automated driving vehicle 100 runs along the predefined route 30, 130 in the runnable area. Alternatively, the on-demand predefined route automated driving vehicle of the present teaching may be able to run along a non-predefined route which is not a predefined route in the runnable area. In the present teaching, the on-demand predefined route automated driving vehicle of the present teaching may run along a non-predefined route in the runnable area when the automatic driving mode is switched to the manual driving mode.

<Modification of Wheels>

In the embodiment and its specific example, the on-demand predefined route automated driving vehicle 100 has four wheels 111. The number of the wheels of the on-demand predefined route automated driving vehicle of the present teaching is not limited to four, as long as the vehicle has plural wheels.

<Modification of Drive Mechanism>

In the specific example of the embodiment, the drive mechanism 112 is an electric motor. Alternatively, the drive mechanism of the present teaching may be an engine using gasoline, etc.

<Modification of Brake Mechanism>

In the specific example of the embodiment, the brake mechanism 113 is a disc brake device. Alternatively, the brake mechanism of the present teaching may be a mechanical brake which converts kinetic energy to thermal energy, such as a drum brake and an engine brake. The brake mechanism of the present teaching may be an electric brake which converts kinetic energy to electric energy, such as an electromagnetic brake and a regenerative brake having a generator with a motor function. The brake mechanism of the present teaching may be a combination of a mechanical brake and an electric brake. For example, the brake mechanism of the present teaching may be a combination of a regenerative brake using a driving motor and a disc brake device.

<Modification of Traveling Direction Control Mechanism>

In the specific example of the embodiment, the traveling direction control mechanism 114 is able to steer the two front wheels 111f. As the two front wheels 111f are steered, the traveling direction of the on-demand predefined route automated driving vehicle 100 is controlled. Alternatively, the traveling direction control mechanism of the present teaching may control the traveling direction of the on-demand predefined route automated driving vehicle by the drive mechanism and a control mechanism. To be more specific, the traveling direction control mechanism of the present teaching may control the traveling direction of the on-demand predefined route automated driving vehicle in such a manner that the drive mechanism and the control mechanism control wheels in a right portion of the on-demand predefined route automated driving vehicle and wheels in a left portion of the vehicle rotate at different rotation speeds.

<Modification of Method of Acquiring Current Location of Ego On-Demand Predefined Route Automated Driving Vehicle>

The on-demand predefined route automated driving vehicle 100 of the specific example acquires a current location of the vehicle 100 by using the on-demand predefined route automated driving vehicle location detector 120. In other words, the on-demand predefined route automated driving vehicle 100 of the specific example highly accurately detects a current location of the vehicle 100 by comparing a current location of the vehicle generated by the GNSS receiving unit 123 with an image of the road surface photographed by the camera 121. Alternatively, the on-demand predefined route automated driving vehicle of the present teaching may acquire a current location of the vehicle only by generating a current location by the GNSS receiving unit. Alternatively, the on-demand predefined route automated driving vehicle of the present teaching may include a wheel rotation detector and acquire a current location of the vehicle based on a measured running distance from a particular location on the annular connected predefined route. Alternatively, the on-demand predefined route automated driving vehicle of the present teaching may acquire a current location of the vehicle by using identification marks on the road surface of the annular connected predefined route. Alternatively, the on-demand predefined route automated driving vehicle of the present teaching may acquire a current location of the vehicle by using a LIDAR, an inertial measurement unit (IMU), a millimeter wave radar, a SONAR (Sound Navigation and Ranging), a TOF (Time Of Flight) distance image camera, an infrared sensor, a radio direction finder, a reflector, a terrestrial magnetic sensor, etc.

<Modification of Method of Automatically Running Vehicle along Predefined Route Regardless of Existence of Occupant>

The on-demand predefined route automated driving vehicle 100 of the specific example is automatically run along the predefined route 130 by the vehicle-mounted controller 115 based on an image of the road surface photographed by the camera 121 of the on-demand predefined route automated driving vehicle location detector 120 and a current location generated by the GNSS receiving unit 123. Alternatively, the on-demand predefined route automated driving vehicle of the present teaching may include a guide line detector which detects an electromagnetic guide line embedded in the predefined route 130. The vehicle may be automatically run along the predefined route regardless of the existence of an occupant therein, as the vehicle-mounted controller controls the traveling direction control mechanism so that the vehicle runs along the electromagnetic guide line based on a detection signal from the guide line detector. Alternatively, the vehicle-mounted controller of the on-demand predefined route automated driving vehicle of the present teaching may automatically run the on-demand predefined route automated driving vehicle along the predefined route regardless of the existence of an occupant in the vehicle, by using a LIDAR, an IMU, a GNSS receiving unit and map information, a millimeter wave radar, a SONOR, a TOF distance image camera, an infrared sensor, a LIDAR using LEDs (excluding a visible light camera), a radio direction finder, a reflector, a terrestrial magnetic sensor, etc.

<Modification of Information Acquired by On-Demand Predefined Route Automated Driving Vehicle Fleet Controller>

The on-demand predefined route automated driving vehicle fleet controller 501 of the specific example selects an on-demand predefined route automated driving vehicle 100 to be dispatched to the anticipated riding location in advance, based on the route information, the vehicle location information, the occupant existence information, the anticipated riding location information, and the energy information. Alternatively, the on-demand predefined route automated driving vehicle fleet controller of the present teaching may select an on-demand predefined route automated driving vehicle 100 to be dispatched to the anticipated riding location in advance, based on the route information, the vehicle location information, the occupant existence information, and the anticipated riding location information. Likewise, the on-demand predefined route automated driving vehicle fleet controller 501 of the specific example generates an in-advance vehicle dispatch command signal based on the route information, the vehicle location information, the occupant existence information, the anticipated riding location information, and the energy information. Alternatively, the on-demand predefined route automated driving vehicle fleet controller of the present teaching may generate an in-advance vehicle dispatch command signal based on the route information, the vehicle location information, the occupant existence information, and the anticipated riding location information.

The on-demand predefined route automated driving vehicle fleet controller 501 of the specific example selects an on-demand predefined route automated driving vehicle 100 to be dispatched to the planned riding location, based on the route information, the vehicle location information, the occupant existence information, the use request information, and the energy information. Alternatively, the on-demand predefined route automated driving vehicle fleet controller of the present teaching may select an on-demand predefined route automated driving vehicle 100 to be dispatched to the planned riding location, based on the route information, the vehicle location information, the occupant existence information, and the use request information. Likewise, the on-demand predefined route automated driving vehicle fleet controller 501 of the specific example generates a vehicle dispatch command signal based on the route information, the vehicle location information, the occupant existence information, the use request information, and the energy information. Alternatively, the on-demand predefined route automated driving vehicle fleet controller of the present teaching may generate a vehicle dispatch command signal based on the route information, the vehicle location information, the occupant existence information, and the use request information.

In the on-demand predefined route automated driving vehicle 100 and the on-demand predefined route automated driving vehicle fleet controller 501 of the specific example, the anticipated riding location information includes information of an anticipated riding location use request time and information of an anticipated alighting location. In the on-demand predefined route automated driving vehicle and the on-demand predefined route automated driving vehicle fleet controller of the present teaching, the anticipated riding location information may not include at least one of information of an anticipated riding location use request time or information of an anticipated alighting location.

<Modification of Method of Acquiring Occupant Existence Information in On-Demand Predefined Route Automated Driving Vehicle>

In the on-demand predefined route automated driving vehicle 100 of the specific example, the number of occupants seated on the seats 102 is detected by the seating detector provided at the seats 102. As the occupant existence information, the on-demand predefined route automated driving vehicle 100 sends the information related to the number of occupants seated on the seats 102 to the on-demand predefined route automated driving vehicle fleet controller 501. Alternatively, the on-demand predefined route automated driving vehicle 100 may include an onboard terminal to which an occupant is able to input the number of occupants. As an occupant inputs the number of occupants to the onboard terminal, the occupant existence information may be sent from the on-demand predefined route automated driving vehicle 100 to the on-demand predefined route automated driving vehicle fleet controller 501.

<Modification of Method of Acquiring Occupant Existence Information by On-Demand Predefined Route Automated Driving Vehicle Fleet Controller>

The on-demand predefined route automated driving vehicle fleet controller 501 of the specific example receives the occupant existence information related to the existence of occupants and the number of occupants from the plural on-demand predefined route automated driving vehicles 100 on the annular connected predefined route 130. Alternatively, the on-demand predefined route automated driving vehicle fleet controller 501 may generate the occupant existence information based on the running state of each of the on-demand predefined route automated driving vehicles 100. For example, the on-demand predefined route automated driving vehicle fleet controller determines that an on-demand predefined route automated driving vehicle running in the standby state or the vehicle dispatch state is a vehicle having no occupant. Furthermore, the on-demand predefined route automated driving vehicle fleet controller determines that an on-demand predefined route automated driving vehicle running in the running-to-destination state is a vehicle having an occupant. In this regard, the on-demand predefined route automated driving vehicle fleet controller determines that an on-demand predefined route automated driving vehicle which has not received a vehicle dispatch command signal is a vehicle in the standby state. In other words, the on-demand predefined route automated driving vehicle fleet controller determines that an on-demand predefined route automated driving vehicle which has received a vehicle dispatch command signal and has stopped at a planned alighting location is a vehicle in the standby state. The on-demand predefined route automated driving vehicle fleet controller determines that a vehicle which has received a vehicle dispatch command signal and is assumed not to reach a planned riding location yet based on the current location of the vehicle is a vehicle in the vehicle dispatch state. The on-demand predefined route automated driving vehicle fleet controller determines that a vehicle which has received a vehicle dispatch command signal and is assumed to be running toward a planned alighting location after reaching a planned riding location based on the current location of the vehicle is a vehicle in the vehicle dispatch state. The on-demand predefined route automated driving vehicle fleet controller determines that a vehicle which has received a vehicle dispatch command signal and is assumed to be running after reaching a planned riding location based on the current location of the vehicle is a vehicle in the vehicle dispatch state.

<Modification of Setting of Speed of On-Demand Predefined Route Automated Driving Vehicle>

The vehicle-mounted controller 115 of the on-demand predefined route automated driving vehicle 100 of the specific example controls the drive mechanism 112 and the brake mechanism 113 based on the speed corresponding to the running state of the on-demand predefined route automated driving vehicle 100, which is stored in the storage unit 152. Alternatively, the vehicle-mounted controller of the on-demand predefined route automated driving vehicle of the present teaching may control the drive mechanism and the brake mechanism based on a speed included in a command sent from the on-demand predefined route automated driving vehicle fleet controller.

<Modification of Information of Destination Candidates Input by User>

The on-demand predefined route automated driving vehicle fleet controller 501 of the specific example is arranged to be able to display information of destination candidates on the information terminal 720. Alternatively, when the on-demand predefined route automated driving vehicle fleet controller of the present teaching is able to send and receive information to and from the use request management device, the use request management device may display information of destination candidates on the information terminal.

<Modification of Command Signal Generated by On-Demand Predefined Route Automated Driving Vehicle Fleet Controller>

The on-demand predefined route automated driving vehicle fleet controller 501 of the specific example generates an arbitration command signal. Alternatively, the on-demand predefined route automated driving vehicle fleet controller of the present teaching may not generate an arbitration command signal.

<Modification of Arbitration Command Signal>

In the example shown in FIG. 10, the on-demand predefined route automated driving vehicle fleet controller 501 of the specific example generates an arbitration command signal to instruct the on-demand predefined route automated driving vehicle 100C running along the connected predefined route 132 such that the on-demand predefined route automated driving vehicle 100C running along the connected predefined route 132 passes through the first junction 131*a* after the on-demand predefined route automated driving vehicle 100A running along the annular predefined route 131 passes through the first junction 131*a*. Alternatively, the on-demand predefined route automated driving vehicle fleet controller of the present teaching may generate an arbitration command signal to instruct the on-demand predefined route automated driving vehicle running along the annular predefined route such that the on-demand predefined route automated driving vehicle running along the annular predefined route passes through the first junction 131*a* after the on-demand predefined route automated driving vehicle running along the connected predefined route passes through the first junction 131*a*. An arbitration command signal is generated for the on-demand predefined route automated driving vehicle running along the annular predefined route when, for example, on the annular connected predefined route 130 shown in FIG. 10, the on-demand predefined route automated driving vehicle 100C running along the connected predefined route 132 is in the vehicle dispatch state whereas the on-demand predefined route automated driving vehicle 100A running along the annular predefined route 131 is in the standby state.

<Modification of Autonomous Control>

Figure 13A:
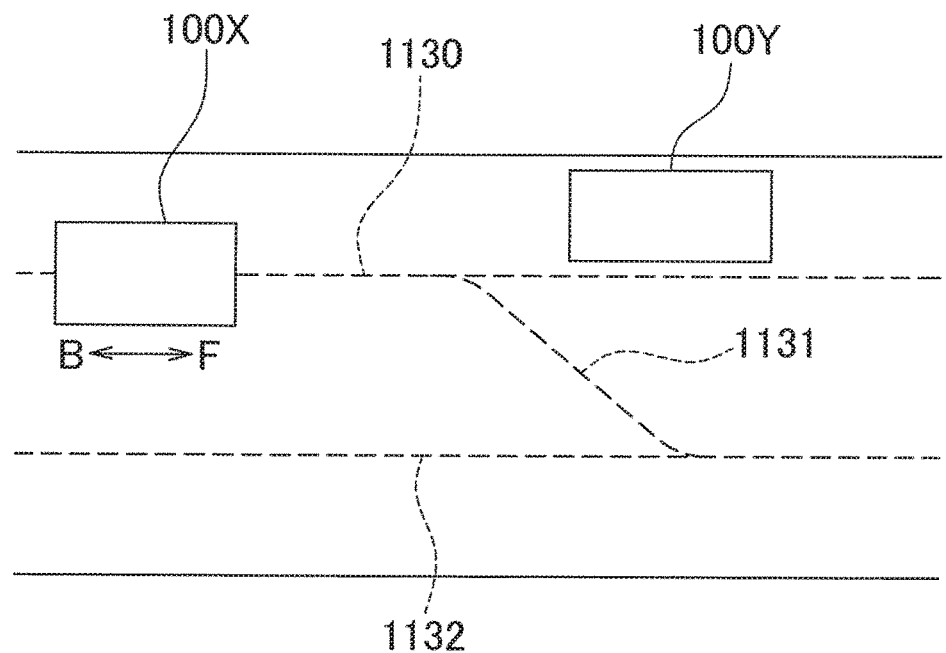
FIG. 13A is a schematic representation of an example of autonomous driving of an on-demand predefined route automated driving vehicle.
Figure 13B:
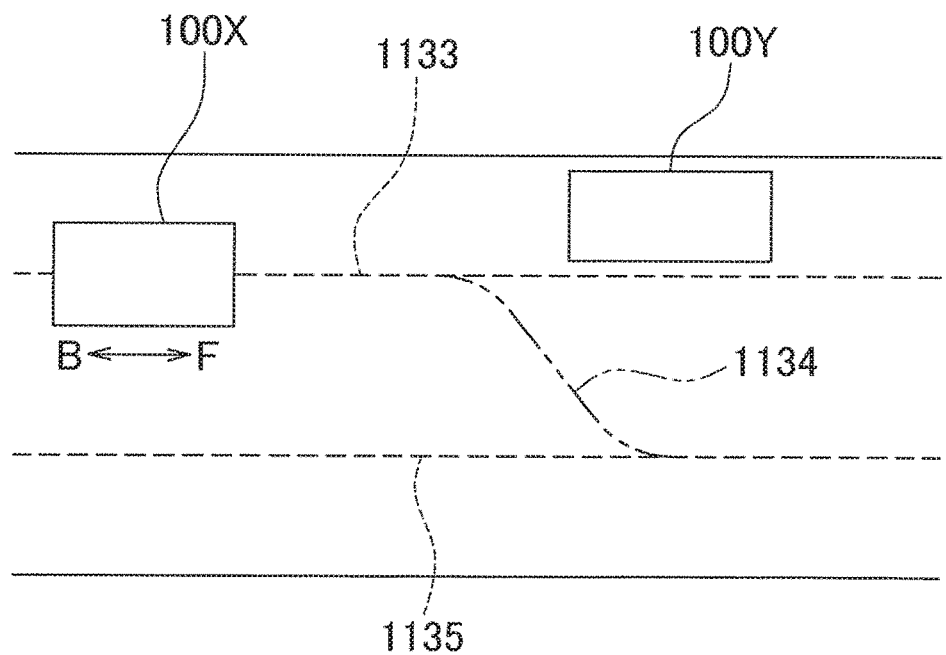
FIG. 13B is a schematic representation of an example of autonomous driving of an on-demand predefined route automated driving vehicle.
Figure 13C:
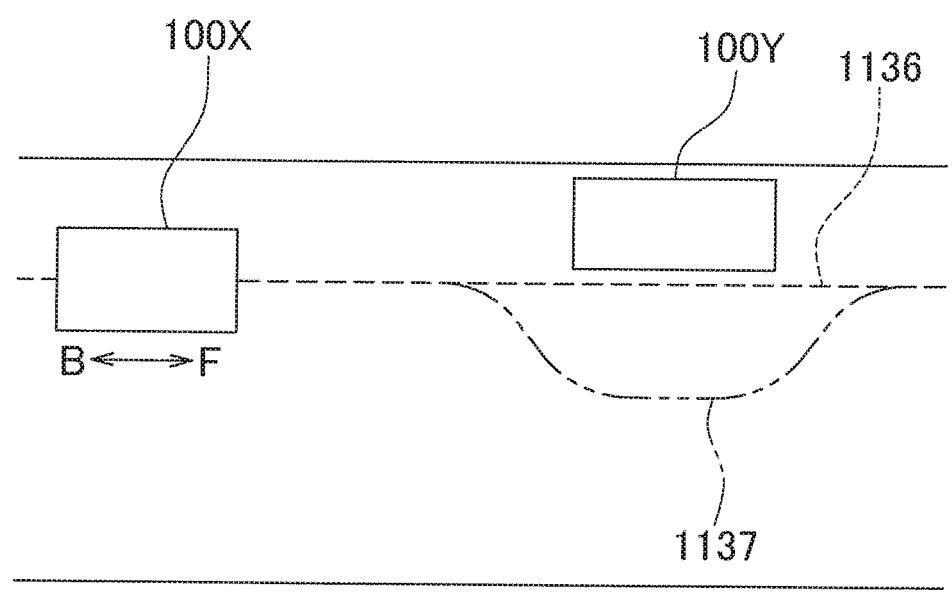
FIG. 13C is a schematic representation of an example of autonomous driving of an on-demand predefined route automated driving vehicle.

When a front obstacle detection signal is supplied from the front obstacle detector 118, the vehicle-mounted controller 115 of the on-demand predefined route automated driving vehicle 100 of the specific example controls the drive mechanism 112 and the brake mechanism 113 to stop the vehicle. Alternatively, when a front obstacle detection signal is supplied from the front obstacle detector, the vehicle-mounted controller of the on-demand predefined route automated driving vehicle of the present teaching may control the drive mechanism, the brake mechanism, and the traveling direction control mechanism to cause the on-demand predefined route automated driving vehicle to avoid an obstacle ahead of the vehicle. To be more specific, the vehicle-mounted controller 115 controls the running of the on-demand predefined route automated driving vehicle 100 as shown in FIG. 13A to FIG. 13C. The following will describe a specific example of the running of the on-demand predefined route automated driving vehicle 100 controlled by the vehicle-mounted controller 115, with reference to FIG. 13A, FIG. 13B, and FIG. 13C. The specific example shown in FIG. 13A to FIG. 13C assumes that an obstacle 100Y exists at a location forward of an on-demand predefined route automated driving vehicle 100X.

In FIG. 13A, a vehicle-mounted controller 115 of the on-demand predefined route automated driving vehicle 100X controls the traveling direction and speed of the on-demand predefined route automated driving vehicle 100X so that the on-demand predefined route automated driving vehicle 100X moves from an annular predefined route 1130 to an annular predefined route 1132 via a connected predefined route 1131. The origin of the connected predefined route 1131 is at the annular predefined route 1130. The origin of the connected predefined route 1131 is a junction between the annular predefined route 1130 and the connected predefined route 1131. The terminal of the connected predefined route 1131 is at the annular predefined route 1132. The terminal of the connected predefined route 1131 is a junction between the annular predefined route 1132 and the connected predefined route 1131. The vehicle-mounted controller 115 moves the on-demand predefined route automated driving vehicle 100X from the annular predefined route 1130 to the connected predefined route 1131 connected to the annular predefined route 1130. The vehicle-mounted controller 115 then moves the on-demand predefined route automated driving vehicle 100X from the connected predefined route 1131 to the annular predefined route 1132 connected to connected predefined route 1131. In other words, the vehicle-mounted controller 115 causes the on-demand predefined route automated driving vehicle 100X to run from the annular predefined route 1130 to the annular predefined route 1132 via the connected predefined route 1131.

In FIG. 13B, the vehicle-mounted controller 115 of the on-demand predefined route automated driving vehicle 100X may control the traveling direction and speed of the on-demand predefined route automated driving vehicle 100X so that the on-demand predefined route automated driving vehicle 100X moves from an annular predefined route 1133 to an annular predefined route 1135 via a non-predefined route 1134. The origin of the non-predefined route 1134 is at the annular predefined route 1133. The origin of the non-predefined route 1134 is a junction between the annular predefined route 1133 and the non-predefined route 1134. The non-predefined route 1134 is not a route determined in advance. The origin of the non-predefined route 1134 is set based on a front obstacle detection signal. The terminal of the non-predefined route 1134 is at the annular predefined route 1135. The terminal of the non-predefined route 1134 is a junction between the annular predefined route 1135 and the non-predefined route 1134. To be more specific, the vehicle-mounted controller 115 controls the traveling direction and speed of the on-demand predefined route automated driving vehicle 100X in the following manner. The vehicle-mounted controller 115 moves the on-demand predefined route automated driving vehicle 100X from the annular predefined route 1133 to the non-predefined route 1134 connected to the annular predefined route 1133. The vehicle-mounted controller 115 then moves the on-demand predefined route automated driving vehicle 100X from the non-predefined route 1134 to the annular predefined route 1135. In other words, the vehicle-mounted controller 115 causes the on-demand predefined route automated driving vehicle 100X to run from the annular predefined route 1133 to the annular predefined route 1135 via the non-predefined route 1134.

In FIG. 13C, the vehicle-mounted controller 115 of the on-demand predefined route automated driving vehicle 100X may control the traveling direction and speed of the on-demand predefined route automated driving vehicle 100X so that the on-demand predefined route automated driving vehicle 100X temporarily deviates from the annular predefined route 1136 and then returns to the annular predefined route 1136. The origin of a non-predefined route 1137 is at the annular predefined route 1136. The origin of the non-predefined route 1137 is a junction between the annular predefined route 1136 and the non-predefined route 1137. The non-predefined route 1137 is not a route determined in advance. The origin of the non-predefined route 1137 is set based on a front obstacle detection signal. The terminal of the non-predefined route 1137 is at the annular predefined route 1136. The terminal of the non-predefined route 1137 is a junction between the annular predefined route 1136 and the non-predefined route 1137. To be more specific, the vehicle-mounted controller 115 moves the on-demand predefined route automated driving vehicle 100X from the annular predefined route 1136 to the non-predefined route 1137 connected to the annular predefined route 1136. The vehicle-mounted controller 115 then moves the on-demand predefined route automated driving vehicle 100X from the non-predefined route 1137 to the annular predefined route 1136. In other words, the vehicle-mounted controller 115 controls the on-demand predefined route automated driving vehicle 100X so that the vehicle 100X temporarily deviates from the annular predefined route 1136 and then returns to the annular predefined route 1136.

When a front obstacle detection signal is supplied from the front obstacle detector 118, the vehicle-mounted controller 115 of the on-demand predefined route automated driving vehicle 100X described above controls the drive mechanism 112, the brake mechanism 113, and the traveling direction control mechanism 114 to cause the on-demand predefined route automated driving vehicle 100X to avoid an obstacle 100Y ahead of the vehicle, as shown in FIG. 13A to FIG. 13C. Alternatively, when receiving a front obstacle detection signal from the on-demand predefined route automated driving vehicle, the on-demand predefined route automated driving vehicle fleet controller of the present teaching may send a control command signal by which the on-demand predefined route automated driving vehicle is controlled as shown in FIG. 13A to FIG. 13C, for example, to the on-demand predefined route automated driving vehicle.

<Modification of Vehicle for Which On-Demand Predefined Route Automated Driving Vehicle Is Applied>

The on-demand predefined route automated driving vehicles of the embodiment and the specific example are golf carts which are able to run automatically. Alternatively, the on-demand predefined route automated driving vehicle of the present teaching may be a small self-driving bus or a small self-driving motor-driven vehicle.

<Modification of Maximum Number of Occupants>

The maximum number of occupants on the on-demand predefined route automated driving vehicle of the specific example is four. In this regard, the maximum number of occupants on the on-demand predefined route automated driving vehicle of the present teaching may be different from four, as long as the number is eight or less.

<Modification of Information Terminal>

The information terminal 720 of the specific example is held by a user. Alternatively, in the present teaching, the information terminal may be provided at a location where an occupant gets on or off from an on-demand predefined route automated driving vehicle.

REFERENCE SIGNS LIST

30 predefined route, annular connected predefined route
31 annular predefined route
32 connected predefined route
100, 100A, 100B, 100C, 100D, 100X on-demand predefined route automated driving vehicle
111 wheel
112 drive mechanism
113 brake mechanism
114 traveling direction control mechanism
115 vehicle-mounted controller
130 predefined route, annular connected predefined route
131 annular predefined route, first annular predefined route
131a first junction
132 connected predefined route, first connected predefined route
230 predefined route, annular connected predefined route
231 annular predefined route
231a first junction
231b second junction
232 connected predefined route
232a third junction
232b fourth junction
501 on-demand predefined route automated driving vehicle fleet controller
502 processor
601 use request management device
701, 701A, 701B, 701C user
720, 720A, 720B, 720C information terminal
1130, 1132, 1133, 1135, 1136 annular predefined route
1131 connected predefined route
1310 predefined route, annular connected predefined route
1331, 1332 annular predefined route
1333 to 1344 connected predefined routes

What is claimed is:

1. An on-demand predefined route automated driving vehicle comprising:
    wheels;
    a drive mechanism including at least one of an engine, a motor, or a hybrid system of an engine and a motor, the drive mechanism being configured to apply driving force for running the vehicle to at least one of the wheels;
    a brake mechanism including at least one of a disc brake, a drum brake, an engine brake or a regenerative brake, the brake mechanism being configured to apply braking force for decelerating the vehicle to at least one of the wheels;
    a traveling direction control mechanism including at least one of a steering wheel or a device configured to control a rotation speed of the wheels, the traveling direction control mechanism being configured to control a traveling direction of at least one of the wheels when the vehicle runs; and
    a vehicle-mounted controller including a processor, (a) the vehicle-mounted controller being configured to be able to send and receive information to and from an on-demand predefined route automated driving vehicle fleet controller and (b) the vehicle-mounted controller controlling the drive mechanism, the brake mechanism, and the traveling direction control mechanism to cause the vehicle to run toward a planned riding location such that the vehicle automatically runs along a predefined route which is determined in advance and in a runnable area in which only the on-demand predefined route automated driving vehicle is allowed to run and vehicles other than the on-demand predefined route automated driving vehicle are supposed not to run, and the vehicle is dispatched to the planned riding location, when the vehicle-mounted controller receives a vehicle dispatch command signal generated by the on-demand predefined route automated driving vehicle fleet controller to which a use request is sent,
    the predefined route in which only the on-demand predefined route automated driving vehicle is allowed to run being an annular connected predefined route including at least one annular predefined route along which on-demand predefined route automated driving vehicles are allowed to regularly circulate and at least one connected predefined route which is connected to the at least one annular predefined route so that vehicles are able to run across these routes, the annular connected predefined route being a one-way route for the on-demand predefined route automated driving vehicle, the at least one annular predefined route including a first annular predefined route, and the at least one connected predefined route including a first connected predetermined route connected to the first annular predefined route at a first junction and a second junction,
    the vehicle-mounted controller
        sending, to the on-demand predefined route automated driving vehicle fleet controller, information of a current location of the on-demand predefined route automated driving vehicle on the annular connected predefined route, and
        when the on-demand predefined route automated driving vehicle is selected, by the on-demand predefined route automated driving vehicle fleet controller, as a vehicle which is dispatched in advance at an anticipated riding location from among vehicles which do not have an occupant and have not received the vehicle dispatch command signal among the plurality of on-demand predefined route automated driving vehicles, based on:

(A) route information related to the annular connected predefined route;
(B) vehicle location information which relates to current locations of the plurality of on-demand predefined route automated driving vehicles on the annular connected predefined route, including the information of the current location of the on-demand predefined route automated driving vehicle having been sent;
(C) occupant existence information which relates to existence of an occupant on each of the plurality of on-demand predefined route automated driving vehicles on the annular connected predefined route; and
(D) anticipated riding location information which relates to the anticipated riding location which is a specific location in a vicinity of the annular predefined route or the connected predefined route on the annular connected predefined route, is a location where a predetermined number or more of users are anticipated to be gathered, and is a location which is anticipated to be the planned riding location, receiving an in-advance vehicle dispatch command signal generated by the on-demand predefined route automated driving vehicle fleet controller based on the route information, the vehicle location information, the occupant existence information, and the anticipated riding location information, the drive mechanism, the brake mechanism, and the traveling direction control mechanism being controlled so that the on-demand predefined route automated driving vehicle runs toward the anticipated riding location based on the in-advance vehicle dispatch command signal, wherein, when the drive mechanism, the brake mechanism, and the traveling direction control mechanism are not controlled in regard to existence of an obstacle in a vehicle forward direction of the on-demand predefined route automated driving vehicle, and either the on-demand predefined route automated driving vehicle is running on the first annular predefined route toward the first junction and there is a second on-demand predefined route automated driving vehicle running on the first connected predefined route toward the first junction or the on-demand predefined route automated driving vehicle is running on the first connected predefined route toward the first junction and there is a second on-demand predefined route automated driving vehicle running on the first annular predefined route toward the first junction, an arbitration command signal which is generated by the on-demand predefined route automated driving vehicle fleet controller based on the route information, the vehicle location information, the occupant existence information, and the anticipated riding location information and instructs the on-demand predefined route automated driving vehicle to pass through the first junction after the second on-demand predefined route automated driving vehicle fleet controller passes through the first junction is received, and the drive mechanism, the brake mechanism, and the traveling direction control mechanism are controlled so that speed of the on-demand predefined route automated driving vehicle running toward the first junction based on the arbitration command signal is lower than speed of the second on-demand predefined route automated driving vehicle running toward the first junction, and wherein the anticipated riding location information is generated based on at least one of: information related to a user, including a past use history of the user and a current location of the user; information related to a destination, including a destination in past use of the on-demand predefined route automated driving vehicle by the user; or information related to environment of the annular connected predefined route.

2. The on-demand predefined route automated driving vehicle according to claim 1, wherein
the anticipated riding location information includes information of an anticipated riding location use request time at which the use request is anticipated at the anticipated riding location, the anticipated riding location being set as the planned riding location in the use request, and
based on the in-advance vehicle dispatch command signal, the vehicle-mounted controller controls the drive mechanism, the brake mechanism, and the traveling direction control mechanism so that the on-demand predefined route automated driving vehicle waits at the anticipated riding location at the anticipated riding location use request time.

3. The on-demand predefined route automated driving vehicle according to claim 1, wherein a maximum number of occupants on the vehicle is no more than eight.

4. The on-demand predefined route automated driving vehicle according to claim 1, wherein the vehicle-mounted controller controls the drive mechanism, the brake mechanism, and the traveling direction control mechanism so that speed of running toward the anticipated riding location based on the in-advance vehicle dispatch command signal is 40 km per hour or less.

5. The on-demand predefined route automated driving vehicle according to claim 1, wherein
when the on-demand predefined route automated driving vehicle is selected as a vehicle to be dispatched to the anticipated riding location information in advance from vehicles which have not received the vehicle dispatch command signal among the plurality of on-demand predefined route automated driving vehicles by the on-demand predefined route automated driving vehicle fleet controller, based on (A) the route information, (B) the vehicle location information, (C) the occupant existence information, (D) the anticipated riding location information, and (E) energy information which is related to a remaining energy amount of each of the plurality of on-demand predefined route automated driving vehicles on the annular connected predefined route, the vehicle-mounted controller receives the in-advance vehicle dispatch command signal generated by the on-demand predefined route automated driving vehicle fleet controller, the in-advance vehicle dispatch command signal being based on the route information, the vehicle location information, the occupant existence information, the anticipated riding location information, and the energy information.

6. The on-demand predefined route automated driving vehicle according to claim 5, wherein the vehicle-mounted controller sends information related to the remaining energy amount of the on-demand predefined route automated driving vehicle to the on-demand predefined route automated driving vehicle fleet controller.

7. The on-demand predefined route automated driving vehicle according to claim 5, wherein the anticipated riding location information includes information related to an anticipated alighting location which is anticipated to become a planned alighting location for alighting from the vehicle.

8. The on-demand predefined route automated driving vehicle according to claim 1, wherein the at least one annular predefined route includes a first annular predefined route and a second annular predefined route, and the at least one connected predefined route includes at least one first connected predefined route, and the first annular predefined route and the second annular predefined route are connected to each other through the at least one first connected predefined route so that a vehicle is able to run across the first annular predefined route, the second annular predefined route, and the at least one first connected predefined route.

* * * * *